United States Patent
Sano et al.

(10) Patent No.: US 6,418,107 B1
(45) Date of Patent: Jul. 9, 2002

(54) OPTICAL HEAD DEVICE, INCLINATION DETECTION APPARATUS USING THE SAME, AND OPTICAL INFORMATION PROCESSING APPARATUS USING THE SAME

(75) Inventors: Kousei Sano, Neyagawa; Shin-ichi Kadowaki, Hirakata; Hiroaki Yamamoto, Hyogo-ken; Ken'ichi Kasazumi, Takatsuki; Seiji Nishino, Osaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 98 days.

(21) Appl. No.: 09/641,813

(22) Filed: Aug. 17, 2000

Related U.S. Application Data

(62) Division of application No. 08/877,363, filed on Jun. 17, 1997.

(30) Foreign Application Priority Data

| | | |
|---|---|---|
| Jun. 18, 1996 | (JP) | 8-156546 |
| Jun. 20, 1996 | (JP) | 8-159368 |
| Jun. 21, 1996 | (JP) | 8-161331 |

(51) Int. Cl.$^7$ ................................................. G11B 7/00
(52) U.S. Cl. ........................... 369/109.02; 369/112.03; 369/112.07
(58) Field of Search ........................... 369/109.01, 103, 369/109.02, 112.03, 112.04, 112.1, 112.07, 112.12, 44.23

(56) References Cited

U.S. PATENT DOCUMENTS

| | | |
|---|---|---|
| 3,530,258 A | 9/1970 | Gregg et al. |
| 4,881,215 A | 11/1989 | Horie |
| 4,949,331 A | 8/1990 | Maeda et al. |
| 5,247,498 A | 9/1993 | Takekoshi et al. |
| 5,302,834 A | 4/1994 | Murao |
| 5,412,637 A | 5/1995 | Kagami et al. |
| 5,442,615 A | 8/1995 | Ohsato et al. |
| 5,475,667 A | 12/1995 | Kamimura et al. |

(List continued on next page.)

FOREIGN PATENT DOCUMENTS

| | | |
|---|---|---|
| JP | 5298731 | 11/1993 |
| JP | 6180854 | 6/1994 |

*Primary Examiner*—Nabil Hindi
(74) *Attorney, Agent, or Firm*—Renner, Otto, Boisselle & Sklar, LLP

(57) ABSTRACT

An optical head device includes a light source for emitting at least one of a coherent beam and a quasi-monochromatic beam; a collection optical system for collecting the beam to an information memory medium having a track which has at least one mark and at least one space; a light detector having a plurality of detection areas for receiving the beam reflected by the information memory medium and outputting a signal in accordance with a light amount of the beam received; and a tracking error signal generator for receiving the signals output from the light detector and generating a tracking error signal based on the signals. The tracking error signal generator reduces a difference between a first signal amplitude and a second signal amplitude. The first signal amplitude is an absolute value of a difference between first and second signal levels. The second signal amplitude is an absolute value of a difference between the first and third signal levels. The first signal level is a value of the tracking error signal obtained when the beam emitted by the light source is radiated to a center of the track. The second and third signal levels are, respectively, a maximum value and a minimum value of the tracking error signal obtained when the information memory medium is scanned by the beam emitted by the light source in a direction perpendicular to the track.

2 Claims, 46 Drawing Sheets

U.S. PATENT DOCUMENTS

| | | |
|---|---|---|
| 5,508,995 A | 4/1996 | Moriya et al. |
| 5,546,367 A | 8/1996 | Yoshimura et al. |
| 5,638,352 A * | 6/1997 | Yang .......................... 369/112 |
| 5,657,303 A | 8/1997 | Namoto et al. |
| 5,754,512 A | 5/1998 | Komma et al. |
| 5,777,962 A | 7/1998 | Gardner et al. |
| 5,805,543 A | 9/1998 | Takamine et al. |
| 5,808,985 A | 9/1998 | Gerber |
| 5,828,637 A | 10/1998 | Kim |
| 5,872,767 A | 2/1999 | Nagai et al. |
| 5,898,654 A | 4/1999 | Shimada et al. |
| 5,910,936 A | 6/1999 | Marino |
| 6,078,554 A | 6/2000 | Ootake et al. |

* cited by examiner

Minus first-order diffraction light 108b

Plus first-order diffraction light 108c

Output from adder section 891
when position Ⓐ is scanned

Output from operation section 872
when position Ⓐ is scanned

Output from adder section 891
when position Ⓑ is scanned

Output from operation section 872
when position Ⓑ is scanned

OPTICAL HEAD DEVICE, INCLINATION DETECTION APPARATUS USING THE SAME, AND OPTICAL INFORMATION PROCESSING APPARATUS USING THE SAME

This is a division of copending application Ser. No. 08/877,363, filed Jun. 17, 1997.

BACKGROUND OF THE INVENTION

1. Field of the Invention

The present invention relates to an optical head device for recording information to, or reproducing or erasing information from, an information memory medium, for example, an optical disk or optical card. The present invention also relates to an optical information processing apparatus, and an inclination angle detection apparatus for detecting an angle made by a beam collected by a light collection system in an optical information processing apparatus and an information memory medium.

2. Description of the Related Art

Optical memory technologies which use optical disks or optical cards as high density, large capacity memory media are used in progressively wider fields, for example, in digital audio disks, video disks, document file disks and data files. By such optical memory technologies, information is recorded to, or reproduced from, an optical disk with sufficiently high precision and satisfactory reliability through a light beam which is focused to have a microscopic diameter. The performance of a recording and reproduction apparatus using the optical memory technologies significantly relies on the optical system.

Exemplary basic functions of the optical head device, which is a main part of the optical system, are rough classified into:

(1) light collection in order to form a smallest possible light spot only limited by the diffraction;
(2) focusing and tracking control of the optical system, and reproduction of information signals; and
(3) erasing and writing of information signals by collected light.

These functions are realized by a combination of various optical systems and a light detector of a photoelectric conversion system.

As a first conventional example comparative to the present invention, a conventional optical head device will be described with reference to FIG. 42. FIG. 42 is a schematic view of an optical system of the conventional optical head device. In the optical head device shown in FIG. 42, focusing is performed by the non-point aberration method and tracking is performed by the push-pull method and the phase contrasting method.

The optical head device shown in FIG. 42 operates in the following manner.

Light emitted by a semiconductor laser 101 as a light source is reflected by a plane-parallel beam splitter 102 and collimated by a collimator lens 103, which is included in a light collection system. The light is then collected by an objective lens 104 which is also included in the light collection system, and collected on an information layer 108 of an optical disk 105, which is an information memory medium. An actuator 107 moves the objective lens 104 and a holding device 106 in accordance with fluctuations or decentration of the optical disk 105.

The light is then diffracted and reflected by the information layer 108 of the optical disk 105 to be reflected light 108a. The reflected light 108a is converged by the collimator lens 103. The reflected light 108a is then provided with an non-point aberration when passing through the plane-parallel beam splitter 102. The light provided with the non-point aberration is received by a light detector 150. The above-described elements in the optical system shown in FIG. 42 are arranged so that, when a focal point F0 of the light from the objective lens 104 is on the information layer 108, a light detecting surface of the light detector 150 is in the least circle of confusion of the converged light provided with the non-point aberration.

FIG. 43A shows a pattern of a light detection area of the light detector 150 and the shape of a cross section of the reflected light 108a detected by the light detector 150. The light detector 150 includes four light detection areas 251 through 254. Signals obtained in accordance with the amount of light received by the light detection areas 251 through 254 are referred to herein as s1 through s4. Although an operation circuit for generating a tracking error signal is not shown, a tracking error signal TE1 is generated according to expression (1).

$$TE1=(s1+s4)-(s2+s3) \qquad (1)$$

By the phase contrasting method, a tracking error signal TE2 is obtained by comparing the phase of a sum signal of s1 and s3 and the phase of a sum signal of s2 and s4.

A focusing error FE signal by the non-point aberration method is generated according to expression (2).

$$FE=(s1+s3)-(s2+s4) \qquad (2)$$

When the information layer 108 of the optical disk 105 is distanced from the objective lens 104 so as to be beyond the focal point F0 of the light from the objective lens 104, the cross section of the reflected light 108a detected by the light detector 150 is as shown in FIG. 43B. When the information layer 108 of the optical disk 105 approaches the objective lens 104 so as to be between the objective lens 104 and the focal point F0 of the light from the objective lens 104, the cross section of the reflected light 108a detected b the light detector 150 is as shown in FIG. 43C.

An RF signal, which is an information reproduction signal, is a sum of the signals s1 through s4 obtained from all the light detection areas and thus is generated according to expression (3).

$$RF=s1+s2+s3+s4 \qquad (3)$$

The conventional optical head device described above have the following problems.

(1) The tracking error signal is generated by a differential signal which indicates the difference between the signals respectively obtained from the two light detection areas defined by simply equally dividing the light detection surface (aperture) of the light detector 150 into two by a central line of the aperture. In such a structure, the light is incident off the track or tracking is not stably controlled when an aberration occurs due to an inclination of the objective lens 104 and/or the optical disk 105 (tilt), or when the objective lens moves in a direction perpendicular to the tracks with respect to the optical axis in accordance with the decentration of the optical disk 105.

(2) When the focal point of the light from the objective lens 104 scans the position off the track in which the information to be reproduced is stored, if a reproduction signal is generated by a signal indicating the difference between the signals respectively obtained from the two light detection areas defined by simply equally dividing the aperture of the light detector 150 into two by a central line of the aperture, a sufficient margin with respect to the disturbance cannot be secured.

Regarding an inclination angle detection apparatus for detecting an inclination of a beam collected by a light collection system in an optical information processing apparatus with respect to the information memory device, various structures have been proposed in order to accurately read information from, and write information to, the information memory device.

As a second conventional example comparative to the present invention, a conventional inclination detection apparatus will be described with reference to FIG. 44. FIG. 44 is a schematic view of an inclination detection apparatus. The inclination detection apparatus shown in FIG. 44 operates in the following manner.

A linearly polarized scattering beam 70 emitted from a semiconductor laser 101 as a light source is collimated by a collimator lens 103 and then is incident on a polarizing beam splitter 130. Next, the beam 70 is transmitted through the polarizing beam splitter 130 and then through a ¼-wave plate 122 to be converted into a circularly polarized beam. The circularly polarized beam is collected on an optical disk 105 as an information memory medium by an objective lens 104.

FIG. 45 shows a structure of the optical disk 105. In FIG. 45, Gn−1, Gn, Gn+1, . . . each represent a guide groove. Information is stored in the guide grooves as a mark or a space. Accordingly, tracks Tn−1, Tn, Tn+1, . . . for storing information correspond to the guide grooves Gn−1, Gn, Gn+1, . . . Also in FIG. 45, Gp represents a space between two adjacent guiding grooves (i.e., cycle of the grooves), and tp represents a space between two adjacent tracks (i.e., cycle of the tracks). The values of Gp and tp are equal to each other.

The beam 70 which is reflected and diffracted by the optical disk 105 is again transmitted through the objective lens 104 and then through the ¼-wave plate 122 to be converted into a linearly polarized beam which runs in a direction perpendicular to the direction of the light emitted from the semiconductor laser 101. The beam 70 is then entirely reflected by the polarizing beam splitter 130 and converted into a converged beam (still indicated by reference numeral 70) by a detection lens 133. The converged beam 70 is transmitted to the planar polarizing plate 134 and received by a light detector 158. The beam 70 is provided with a non-point aberration for focusing error detection when passing through the planar polarizing plate 14. The beam 70 received by the light detector 158 is converted into an electric signal in accordance with the light amount thereof.

In this specification, in the case where the optical disk is a ROM disk, a mark indicates a pit, and a space indicates a plane part. In the case where the optical disk indicates a phase-change memory medium, a mark indicates an amorphous portion and a space indicates a crystal portion, or a mark indicates a crystal portion and a space indicates an amorphous portion. In the case where the optical disk is a magnetic memory medium, a mark indicates an upward magnetization and a space indicates a downward magnetization, or a mark indicates a downward magnetization and a space indicates an upward magnetization. Alternatively, in the case where the optical disk is a magnetic memory medium, a mark may indicate a rightward magnetization and a space may indicate a leftward magnetization, or a mark may indicate a leftward magnetization and a space may indicate a rightward magnetization. In the case where the optical disk is a write-once disk such as a CD-R, a mark indicates a dye burned area and a space indicates a non dye burned area.

The focusing error signal and the tracking error signal are each added to the actuator 107. The position of the objective lens 104 is adjusted so that the beam 70 emitted by the light source 101 is focused at a desired position on the optical disk 105. The methods for generating a focusing error signal and a tracking error signal are well known and thus will not be described here.

FIG. 46 shows a signal processing section 703 including the light detector 158. The electric signal from the light detector 158 is input to the signal processing section 703. As shown in FIG. 46, the light detector 158 includes four light detection sections 158A, 158B, 158C and 158D. The signals from the light detection sections 158A through 158D are respectively current/voltage converted by current/voltage converters 855 through 858. The signals from the current/voltage converters 855 through 858 are sent to an operation section 871 for a differential operation. The signal from the operation section 871 is output from a terminal 814. The signal from the terminal 814 is an inclination detection signal.

In the case where an inclination is detected by the above-described conventional inclination detection apparatus utilizing that eclipse of the beam 70 reflected by the optical disk 105 occurs by the aperture diaphragm of the objective lens 104, the detection sensitivity reduces as the numerical aperture of the objective lens 104 increases. Recently, a structure has been proposed in which the numerical aperture of the light collection system is 0.6 and the thickness of the information memory medium is 0.6 mm in order to increase the information which can be stored in one information memory medium. In such a structure, a mere about 0.5 degree change in the angle made by the beam collected by the objective lens and the information memory medium significantly changes the jitter characteristics of the information read from the information memory medium. In the case where an inclination servo for compensating for the change in the angle made by the beam collected by the objective lens is introduced, the inclination detection apparatus needs to detect the inclination with an error of 0.5 degrees or less. However, in the conventional inclination detection apparatus, when the numerical aperture of the objective lens is 0.6, even if the inclination is actually, for example, 0.5 degrees, the inclination detection signal changes only by about 2%. Thus, it is difficult to precisely detect the inclination of 0.5 degrees or less.

As a third example comparative to the present invention, another conventional optical head device will be described with reference to FIG. 47.

A linearly polarized scattering beam 70 emitted by a semiconductor laser 101 as a light source is collimated by a collimator lens 103 and then is incident on a polarizing beam splitter 130. The beam 70 is transmitted through the polarizing beam splitter 130 and then through a ¼-wave plate 122 to be converted into a circularly polarized beam. The circularly polarized beam is collected on an optical disk 105 by an objective lens 104. The beam 70 reflected and diffracted by the optical disk 105 is again transmitted through the objective lens 104 and then through the ¼-wave plate 122 to be converted into a linearly polarized beam which travels in a direction perpendicular to the direction of the light emitted from the semiconductor laser 101. The beam 70 is then entirely reflected by the polarizing beam splitter 130 and converted into a converged beam (still indicated by reference numeral 70) by a detection lens 133. The converged beam 70 is transmitted to the planar polarizing plate 134 and received by a light detector 158. The beam 70 is provided with a non-point aberration for focusing error detection when passing through the planar polarizing plate 134. The beam 70 received by the light detector 158 is converted into an electric signal in accordance with the light amount thereof.

FIG. 48 shows a signal processing section 705 including the light detector 158. The electric signal from the light detector 158 is input to the signal processing section 705. As shown in FIG. 48, the light detector 158 includes four light detection sections 158A, 158B, 158C and 158D. The signals from the light detection sections 158A through 158D are respectively current/voltage converted by current/voltage converters 851 through 854. The signals from the current/voltage converters 851 and 854 are added together by an addition section 891, the signals from the current/voltage converters 852 and 853 are added together by an addition section 892, the signals from the current/voltage converters 851 and 853 are added together by an addition section 893, and the signals from the current/voltage converters 852 and 854 are added together by an addition section 894. The signals from the adding sections 891 and 892 are sent to an operation section 871 for a differential operation, and the signals from the adding sections 893 and 894 are sent to an operation section 872 for a differential operation. The signal from the operation section 871 is output from a terminal 811, and the signal from the operation section 872 is output from a terminal 812. The signal output from the terminal 811 is a tracking error signal, and the signal output from the terminal 812 is a focusing error signal. The focusing error signal is generated by a well known method referred to as the "non-point aberration method", and the tracking error signal is generated by a well known method referred to as the "push-pull" method. The focusing error signal and the tracking error signal are respectively added to an actuator 107 for focusing control and another actuator 107 for tracking control. The position of the objective lens 104 is adjusted so that the beam 70 from the semiconductor laser 101 is focused at a desirable position on the optical disk 105.

FIG. 49 shows a structure of the optical disk 105 (FIG. 47). In FIG. 49, Gn−1, Gn, Gn+1, . . . each represent a guide groove for allowing tracking error signal detection. Information is stored in and between the guide grooves as a mark or a space. Where a space between two adjacent guiding grooves is Gp and a space between two adjacent tracks is tp, Gp=2·tp.

In the optical head device described as the third example, the following conditions, for example, are adopted in order to store a great amount of information in the optical disk 105. The wavelength λ of the beam 70 from the semiconductor laser 101 as the light source is 650 nm, the numerical aperture NA of the objective lens 104 is 0.6, the thickness t of the optical disk 105 is 0.6 mm, the distance Gp between centers of two adjacent guiding grooves is 1.48 μm, and the distance tp between centers of two adjacent tracks is 0.74 μm. When the angle made by the beam 70 collected by the objective lens 104 and the optical disk 105 is a proper angle, the tracking error signal zero-crosses when the center of the guiding groove is irradiated by the beam 70 collected by the objective lens 104. However, when the angle made by the beam 70 collected by the objective lens 104 and the optical disk 105 is not a proper angle, the tracking error signal does not zero-cross when the center of the guiding groove is irradiated by the beam 70 collected by the objective lens 104. At this point, the tracking error signal is hardly offset but is phase-shifted. Such a phase shift can be a cause of an off-track. For example, when the phase shift is about 0.5 degrees, a 0.1 μm off-track is caused. When the off-track is caused, the information stored in the optical disk cannot be accurately read or erased.

SUMMARY OF THE INVENTION

According to one aspect of the invention, an optical head device includes a light source for emitting at least one of a coherent beam and a quasi-monochromatic beam; a collection optical system for collecting the beam emitted by the light source to an information memory medium having a track which has at least one mark and at least one space; a light detector having a plurality of detection areas for receiving the beam reflected by the information memory medium and outputting a signal in accordance with a light amount of the beam received; and a tracking error signal generator for receiving the signals output from the light detector and generating a tracking error signal based on the signals. The tracking error signal generator reduces a difference between a first signal amplitude and a second signal amplitude. The first signal amplitude is an absolute value of a difference between a first signal level and a second signal level. The second signal amplitude is an absolute value of a difference between the first signal level and a third signal level. The first signal level is a value of the tracking error signal obtained when the beam emitted by the light source is radiated to a center of the track. The second signal level is a maximum value of the tracking error signal obtained when the information memory medium is scanned by the beam emitted by the light source in a direction perpendicular to the track. The third signal level is a minimum value of the tracking error signal obtained when the information memory medium is scanned by the beam emitted by the light source in a direction perpendicular to the track.

According to another aspect of the invention, an optical head device includes a light source for emitting at least one of a coherent beam and a quasi-monochromatic beam; a collection optical system for collecting the beam emitted by the light source to an information memory medium having at least one track, at least one mark and at least one space; a light detector having a plurality of detection areas for receiving the beam reflected by the information memory medium and outputting a signal in accordance with a light amount of the beam received; a tracking error signal generator for receiving the signals output from the light detector and generating a tracking error signal based on the signals. The tracking error generator subtracts, from the tracking error signal, a component of the signal obtained from an overlapping area. In the case where an aperture of the collection optical system is a circle having a radius of 1, the overlapping area is an area where two circles overlap, the circles each having a radius of 1 and being centered around a point which is $\lambda/(NA \cdot Gp)$ away, in a direction perpendicular to the track, from a center of the aperture, where λ is the wavelength of the beam emitted by the light source, NA is the numerical aperture of the collection optical system, Gp is the distance between centers of two adjacent tracks of the information memory medium, and $\lambda/(NA \cdot Gp) < 1$.

According to still another aspect of the invention, an optical head device includes a light source for emitting at least one of a coherent beam and a quasi-monochromatic beam; a collection optical system for collecting the beam emitted by the light source to an information memory medium having at least one track, at least one mark and at least one space; a light detector having a plurality of detection areas for receiving the beam reflected by the information memory medium and outputting a signal in accordance with a light amount of the beam received; a tracking error signal generator for receiving the signals output from the light detector and generating a tracking error signal based on the signals; and a light division element for dividing an overlapping area of the reflected beam and the vicinity thereof so as to be received by the light detector. The vicinity of the overlapping area refers to an area which is distanced from the overlapping area by a prescribed distance. In the case where an aperture of the collection optical system is a circle having a radius of 1, the overlapping area is an area where two circles overlap, the circles each having a radius of 1 and being centered around a point which is $\lambda/(NA \cdot Gp)$ away, in a direction perpendicular to the track, from a center of the aperture, where $\lambda$ is the wavelength of the beam emitted by the light source, NA is the numerical aperture of the collection optical system, Gp is the distance between centers of two adjacent tracks of the information memory medium, and $\lambda/(NA \cdot Gp)<1$.

In one embodiment of the invention, the tracking error signal generator generates a tracking error signal using a signal obtained from the detection area which receives a beam in an area excluding the overlapping area, the beam being included in the reflected beam.

In one embodiment of the invention, the light division element includes at least two division lines which are substantially parallel to the tracks. The at least two division lines are arranged so as to sandwich the overlapping area of the reflected beam therebetween, and the tracking error signal generator generates a tracking error signal based on an operation of a signal obtained from the detection area which receives a beam incident on an area outside the at least two division lines, the beam being included in the reflected beam.

In one embodiment of the invention, the tracking error signal generator corrects a tracking error signal using a signal obtained from the detection area which receives a beam in the overlapping area and the vicinity thereof, the beam being included in the reflected beam.

In one embodiment of the invention, the light division element includes division lines in the number of N which are substantially parallel to the tangent to the tracks, wherein N is an odd integer of 3 or more. The two of the division lines are arranged so as to sandwich the overlapping area of the reflected beam therebetween. The remaining division lines are arranged between the two of the division lines. The tracking error signal generator generates a tracking error signal using signals obtained from the detection area which receives a beam incident on a first area and a second area which are outside the two of the division lines and exclude the overlapping area, the beam being included in the reflected beam. The tracking error signal generator further generates a correction signal by alternately inverting the polarity of signals obtained from the detection area which receives a beam incident on an even number of areas sandwiched between the two of the division lines, the beam being included in the reflected beam, and then adding together the signals obtained from the detection area. The tracking error signal generator then adds the tracking error signal and the correction signal or subtracts the correction signal from the tracking error signal.

In one embodiment of the invention, the light division element includes division lines in the number of N which are substantially parallel to the tangent to the tracks, wherein N is an odd integer of 3 or more. The two of the division lines are arranged so as to sandwich the overlapping area therebetween. The remaining division lines are arranged between the two of the division lines. The tracking error signal generator generates a correction signal by multiplying a value of each of the signals with a prescribed value, the signals being obtained from the detection area which receives a beam incident on an even number of areas sandwiched between the two of the division lines, the beam being included in the reflected beam, and then alternately inverting the polarity of the resultant signals, and adding together those signals. The tracking error signal generator then adds the tracking error signal and the correction signal or subtracts the correction signal from the tracking error signal.

In one embodiment of the invention, the light division element is a holographic element.

In one embodiment of the invention, the light division element is integral with a collection optical system.

In one embodiment of the invention, the light division element is a division line of the light detector.

According to still another aspect of the invention, an optical head device includes a light source for emitting at least one of a coherent beam and a quasi-monochromatic beam; a collection optical system for collecting the beam emitted by the light source to an information memory medium having at least one track, at least one mark and at least one space; a light detector having a plurality of detection areas for receiving the beam reflected by the information memory medium and outputting a signal in accordance with a light amount of the beam received; a tracking error signal generator for receiving the signals output from the light detector and generating a tracking error signal based on the signals; and a light reduction element provided on a beam path for reducing the light transmittance of the overlapping area and the vicinity thereof. In the case where an aperture of the collection optical system is a circle having a radius of 1, the overlapping area is an area where two circles overlap, the circles each having a radius of 1 and being centered around a point which is $\lambda/(NA \cdot Gp)$ away, in a direction perpendicular to the track, from a center of the aperture, where $\lambda$ is the wavelength of the beam emitted by the light source, NA is the numerical aperture of the collection optical system, Gp is the distance between centers of two adjacent tracks of the information memory medium, and $\lambda/(NA \cdot Gp)<1$.

In one embodiment of the invention, the light reduction element is integral with the collection optical system.

In one embodiment of the invention, the light reduction element is a holographic element.

According to still another aspect of the invention, an optical head device includes a light source for emitting at least one of a coherent beam and a quasi-monochromatic beam; an optical element for receiving the beam emitted by the light source and dividing the beam into first beam and a second beam an effective numerical aperture of the collection optical system with respect to the first beam being different from an effective numerical aperture of the collection optical system with respect to the second beam; a collection optical system for receiving the first beam and the second beam and converging the first and second beams into a microscopic spot on an information memory medium; a beam branching element for receiving the beam diffracted and/or reflected by the information memory medium and branching the beam; a light detector for receiving the branched beam and outputting a signal in accordance with a light amount of the beam received; a signal processing section for receiving the signal from the light detector and performing an operation of the signal; a driving section for determining relative positions of the collection optical system and the information memory medium based on the signal output from the signal processing section; and a tracking error signal generator for generating a tracking error signal using the first or second beam with respect to which the effective numerical aperture of the collection optical system is smaller.

In one embodiment of the invention, the information memory medium includes marks or prescribed grooves for realizing detection of the tracking error signal, where Gp is the cycle of the marks or grooves, and NA is the numerical aperture of the collection optical system, the first beam has a wavelength $\lambda$ represented by $Gp>\lambda/NA$, and the second beam has a wavelength $\lambda$ represented by $Gp<\lambda/NA$, and the tracking error signal generator generates a tracking error signal based on the second beam. In this specification, the cycle of the grooves refers to the distance between the center of one groove and the center of a groove adjacent thereto.

In one embodiment of the invention, an optical axis of the first beam is substantially coincident with an optical axis of the second beam.

In one embodiment of the invention, the optical element is a polarization filter.

In one embodiment of the invention, the optical element is integral with the collection optical system.

According to still another aspect of the invention, an inclination detection apparatus includes a light source for emitting at least one of a coherent beam and a quasi-monochromatic beam; a collection optical system for receiving the beam emitted by the light source and converging the beam into a microscopic spot on an information memory medium; a beam branching element for receiving the beam diffracted and/or reflected by the information memory medium and branching the beam; a light detector for receiving the branched beam and outputting a signal in accordance with a light amount of the beam received; a signal processing section for receiving the signal from the light detector and performing an operation of the signal; and a driving section for performing focusing control and tracking control to determine relative positions of the collection optical system and the information memory medium. The light detector includes a plurality of detection areas. The information memory medium has a first pattern area including a mark and a space and a second pattern area including prescribed grooves. The first pattern area and the second pattern area are alternately arranged on the information memory medium. The signal processing section detects an angle made by the beam collected by the collection optical system and the information memory medium, using a signal obtained by the light detector when one of the first pattern area and the second pattern area is irradiated by the beam collected by the collection optical system.

In one embodiment of the invention, in the case where the mark and the space in the first pattern area are irradiated by the beam collected by the collection optical system, tracking control is performed using the signal obtained by the light detector. In the case where the second pattern area is irradiated by the beam collected by the collection optical system, the angle made by the beam collected by the collection optical system and the information memory medium is detected using a signal obtained by the light detector.

In one embodiment of the invention, in the case where the second pattern area is irradiated by the beam collected by the collection optical system, tracking control is performed using the signal obtained by the light detector. In the case where the first pattern area is irradiated by the beam collected by the collection optical system, the angle made by the beam collected by the collection optical system and the information memory medium is detected using a signal obtained by the light detector.

In one embodiment of the invention, in the case where the mark and the space of the first pattern area are irradiated by the beam collected by the collection optical system, the angle made by the beam collected by the collection optical system and the information memory medium is detected using a signal obtained by the light detector.

In one embodiment of the invention, the inclination detection apparatus has the relationship of $NA>\lambda/Gp$ where Gp is the cycle of marks in the first pattern area or the cycle of the grooves in the second pattern area, $\lambda$ is the wavelength of the beam emitted by the light source, and NA is the numerical aperture of a part of the collection optical system facing the information memory medium.

According to still another aspect of the invention, an optical information processing apparatus includes a light source for emitting at least one of a coherent beam and a quasi-monochromatic beam; a collection optical system for receiving the beam emitted by the light source and converging the beam into a microscopic spot on an information memory medium; a beam branching element for receiving the beam diffracted and/or reflected by the information memory medium and branching the beam; a light detector for receiving the branched beam and outputting a signal in accordance with a light amount of the beam received; a signal processing section for receiving the signal from the light detector and performing an operation of the signal; a first driving section for performing focusing control and tracking control to determine relative positions of the collection optical system and the information memory medium; and a second driving section for changing the angle made by the beam collected by the collection optical system and the information memory medium. The light detector includes a plurality of detection areas. The information memory medium has patterns or prescribed grooves for generating a tracking error signal. $NA>\lambda/Gp$ where Gp is the cycle of patterns or grooves, $\lambda$ is the wavelength of the beam emitted by the light source, and NA is the numerical aperture of a part of the collection optical system facing the information memory medium.

According to still another aspect of the invention, an optical information prossing apparatus includes a light source for emitting at least one of a coherent beam and a quasi-monochromatic beam; a collection optical system for receiving the beam emitted by the light source and converging the beam into a microscopic spot on an information memory medium; a beam branching element for receiving the beam diffracted and/or reflected by the information memory medium and branching the beam; a light detector for receiving the branched beam and outputting a signal in accordance with a light amount of the beam received; a signal processing section for receiving the signal from the light detector and performing an operation of the signal; a first driving section for performing focusing control and tracking control to determine relative positions of the collection optical system and the information memory medium; and a second driving section for changing the angle made by the beam collected by the collection optical system and the information memory medium. The light detector includes a plurality of detection areas. The information memory medium has a first pattern area including a mark and a space and a second pattern area including prescribed grooves. The first pattern area and the second pattern area are alternately arranged on the information memory medium. The signal processing section detects an angle made by the beam collected by the collection optical system and the information memory medium, using a signal obtained by the light detector, and also generates a signal for driving the second driving section, when one of the first pattern area and the second pattern area is irradiated by the beam collected by the collection optical system.

In one embodiment of the invention, in the case where the mark in the first pattern area is irradiated by the beam collected by the collection optical system, tracking control is performed using the signal obtained by the light detector. In the case where the second pattern area is irradiated by the beam collected by the collection optical system, the angle made by the beam collected by the collection optical system and the information memory medium is detected using a signal obtained by the light detector.

In one embodiment of the invention, in the case where the second pattern area is irradiated by the beam collected by the collection optical system, tracking control is performed using the signal obtained by the light detector. In the case where the first pattern area is irradiated by the beam collected by the collection optical system, the angle made by the beam collected by the collection optical system and the information memory medium is detected using a signal obtained by the light detector.

In one embodiment of the invention, in the case where the mark and the space of the first pattern area are irradiated by the beam collected by the collection optical system, the angle made by the beam collected by the collection optical system and the information memory medium is detected using a signal obtained by the light detector.

In one embodiment of the invention, the optical information prossing apparatus has the relationship of $NA>\lambda/Gp$ where Gp is the cycle of marks in the first pattern area or the cycle of the grooves in the second pattern area, $\lambda$ is the wavelength of the beam emitted by the light source, and NA is the numerical aperture of a part of the collection optical system facing the information memory medium.

According to still another aspect of the invention, an optical head device includes a light source for emitting at least one of a coherent beam and a quasi-monochromatic beam; a collection optical system for collecting the beam emitted by the light source to an information memory medium having a track which has at least one mark and at least one space selectively arranged; a light detector for receiving the beam reflected by the information memory medium and outputting a signal in accordance with a light amount of the beam received; a light division element for dividing the beam reflected by the information memory medium so as to be received by the light detector; an information reproduction signal generator for generating an information reproduction signal for reproducing information stored in the track, based on a signal indicating the difference between the beams incident on a first area and a second area defined by a division line of the light division element; and a changing element for changing a region included in the first area, a region included in the second area, or a region included in both the first area and the second area in accordance with the positional relationship between the light collection point of the light from the collection optical system and the track.

In one embodiment of the invention, in the case where the beam has a substantially circular cross section having a radius of 1 on the light division element, the light division element is divided into three areas by a first division line which is substantially parallel to the tangent to the track and is distanced from the center of the substantially circular cross section by a prescribed distance d, and a second division line which is substantially parallel to the tangent to the track and is distanced from the center of the substantially circular cross section by the prescribed distance d in an opposite direction to the first division line; the area which is outside the first division line and thus excludes the center of the substantially circular cross section may be defined as area A, the area sandwiched by the first division line and the second division line may be defined as area B, and the area which is outside the second division line and thus excludes the center of the substantially circular cross section may be defined as area C. When the light collection point from the collection optical system is at a first position on the information memory medium which is distanced in one direction from the track by a prescribed distance, the information reproduction signal generator generates an information reproduction signal for reproducing information stored in the information memory medium, with the area A being the first area and a sum of the areas B and C being the second area. When the light collection point from the collection optical system is at a second position on the information memory medium which is distanced from the track by the prescribed distance in an opposite direction to the first position, the information reproduction signal generator generates an information reproduction signal for reproducing information stored in the track, with a sum of the areas A and B being the first area and the area C being the second area.

In one embodiment of the invention, where the beam has a substantially circular cross section having a radius of 1 on the light division element, the light division element is divided into four areas by a first division line which is substantially parallel to the tangent to the track and is distanced from the center of the substantially circular cross section by a prescribed distance d, a second division line which is substantially parallel to the tangent to the track and is distanced from the center of the substantially circular cross section by the prescribed distance d in an opposite direction to the first division line, and a third division line which is substantially parallel to the tangent to the track and runs through the center of the substantially circular cross section; the area which is outside the first division line and thus excludes the center of the substantially circular cross section may be defined as area A, the area sandwiched by the first division line and the third division line may be defined as area B, the area sandwiched by the third division line and the second division line may be defined as area C, and the area which is outside the second division line and thus excludes the center of the substantially circular cross section may be defined as area D. When the light collection point from the collection optical system is at a first position on the information memory medium which is distanced in one direction from the track by a prescribed distance, the information reproduction signal generator generates an information reproduction signal for reproducing information stored in the information memory medium, with the area A being the first area and the area C and D being the second area. When the light collection point from the collection optical system is at a second position on the information memory medium which is distanced from the track by the prescribed distance in an opposite direction to the first position, the information reproduction signal generator generates an information reproduction signal for reproducing information stored in the track, with the areas A and B being the first area and the area D being the second area.

According to still another aspect of the invention, an optical head device includes a light source for emitting at least one of a coherent beam and a quasi-monochromatic beam; a collection optical system for collecting the beam emitted by the light source to an information memory medium having a track which has at least one mark and at least one space selectively arranged; a light detector having a plurality of detection areas for receiving the beam reflected by the information memory medium and outputting a signal in accordance with a light amount of the beam received; a light division element for dividing the beam reflected by the information memory medium so as to be received by the light detector; and an information reproduction signal generator for generating an information reproduction signal for reproducing information stored in the track, based on a signal indicating the difference between the beams incident on a first area and a second area defined by a division line of the light division element. In the case where the beam has a substantially circular cross section having a radius of 1 on the light division element, the light division element is divided into three areas by a first division line which is substantially parallel to the tangent to the track and is distanced from the center of the substantially circular cross section by a prescribed distance d, and a second division line which is substantially parallel to the tangent to the track and is distanced from the center of the substantially circular cross section by the prescribed distance d in an opposite direction to the first division line, one of the areas excluding the center of the substantially circular cross section may be defined as the first area, and another area excluding the center of the substantially circular cross section may be defined as the second area. When the light collection point from the collection optical system is at a position on the information memory medium which is distanced from the track by a prescribed distance, the information reproduction signal generator generates an information reproduction signal for reproducing information stored in the track.

According to still another aspect of the invention, an optical head device includes a light source for emitting one of a coherent beam or a quasi-monochromatic beam; a collection optical system for collecting the beam emitted by the light source to an information memory medium having a track which has at least one mark and at least one space selectively arranged; a light detector having a plurality of detection areas for receiving the beam reflected by the information memory medium and outputting a signal in accordance with a light amount of the beam received; a light division element for dividing the beam reflected by the information memory medium so as to be received by the light detector; and an information reproduction signal generator for generating an information reproduction signal for reproducing information stored in the track, based on a signal indicating the difference between the beams incident on a first area and a second area defined by a division line of the light division element. In the case where the beam has a substantially circular cross section having a radius of 1 on the light division element, the light division element is divided into four areas by a first division line which is substantially parallel to the tangent to the track and is distanced from the center of the substantially circular cross section by a prescribed distance d, a second division line which is substantially parallel to the tangent to the track and is distanced from the center of the substantially circular cross section by the prescribed distance d in an opposite direction to the first division line, and a third division line which is substantially parallel to the tangent to the track and runs through the center of the substantially circular cross section, a sum of the area which is outside the first division line and thus excludes the center of the substantially circular cross section and the area sandwiched by the third division line and the second division line may be defined as the first area, and a sum of the area sandwiched by the first division line and the third division line and the area which is outside the second division line and thus excludes the center of the substantially circular cross section may be defined as a second area. When the light collection point from the collection optical system is at a position on the information memory medium which is distanced from the track by a prescribed distance, the information reproduction signal generator generates an information reproduction signal for reproducing information stored in the track.

In one embodiment of the invention, in the case where the beam has a substantially circular cross section having a radius of 1 on the light division element, the distance d between the center of the substantially circular cross section and each of the first division line and the second division line is 0.1 or more and 0.3 or less.

According to still another aspect of the invention, an optical head device includes a light source for emitting at least one of a coherent beam and a quasi-monochromatic beam; a collection optical system for collecting the beam emitted by the light source to an information memory medium having tracks having a mark and a space selectively arranged or tracks having prescribed grooves; a light detector having a plurality of detection areas for receiving the beam reflected by the information memory medium and outputting a signal in accordance with a light amount of the beam received; a tracking error signal generator for receiving the signals from the light detector and generating a tracking error signal based on the signals received; and a light division element for dividing the beam reflected by the information memory medium so as to be received by the light detector. Where $\lambda$ is the wavelength of the beam emitted by the light source, NA is the numerical aperture of the collection optical system, Gp is the distance between centers of two adjacent tracks of the information memory medium, $\lambda/(NA \cdot Gp)/\geq 1$, and the beam has a substantially circular cross section having a radius of 1 on the light division element. The light division element has at least five division lines which are substantially parallel to the tangent to the tracks. Where the division line running through the center of the substantially circular cross section is a first division line, two division lines which are distanced from the first division line by a distance of about 0.1 in two opposite directions are a second division line and a third division line, and two division lines which are distanced from two ends of the cross section by a distance of about 0.1 are a fourth division line and a fifth division line. The tracking error signal generator generates the tracking error signal by alternately inverting the polarity of the signals obtained in accordance with the beams incident on six areas defined by the five division lines and adding together those signals.

According to still another aspect of the invention, an optical head device includes a light source for emitting at least one of a coherent beam and a quasi-monochromatic beam; a collection optical system for collecting the beam emitted by the light source to an information memory medium having tracks having a mark and a space selectively arranged or tracks having prescribed grooves; a light detector having a plurality of detection areas for receiving the beam reflected by the information memory medium and outputting a signal in accordance with a light amount of the beam received; a tracking error signal generator for receiving the signals from the light detector and generating a tracking error signal based on the signals received; and a light division element for dividing the beam reflected by the information memory medium so as to be received by the light detector. Where λ is the wavelength of the beam emitted by the light source, NA is the numerical aperture of the collection optical system, Gp is the distance between centers of two adjacent tracks of the information memory medium, $\lambda/(NA \cdot Gp) \geq 1$, and an aperture of the collection optical system is a circle having a radius of 1. The light division element has division lines in the number of N which are substantially parallel to the tangent to the tracks, where N is an odd integer of 3 or more. The two of the division lines are positioned within a width of about 0.6 from the center of the aperture of the collection optical system. The remaining division lines are positioned between the two division lines at an equal interval. The tracking error signal generator generates the tracking error signal using signals obtained from the areas which are outside the two division lines and thus exclude the center of the substantially circular cross section. The tracking error signal generator generates a correction signal by alternately inverting the polarity of signals obtained from an even number of areas sandwiched by the two division lines and adding together those signals. The tracking error signal generator adds the tracking error signal and the correction signal or subtracts the correction signal from the tracking error signal.

In one embodiment of the invention, the line division element is a diffraction element.

In one embodiment of the invention, the line division element is a division line of the light detector.

According to still another aspect of the invention, an optical head device includes a light source for emitting at least one of a coherent beam and a quasi-monochromatic beam; a collection optical system for collecting the beam emitted by the light source to an information memory medium having tracks having a mark and a space selectively arranged or tracks having prescribed grooves; a diffraction element for receiving a beam diffracted by the information memory medium and generating a diffraction beam; and a light detector having a plurality of detection areas for receiving the beam diffracted by the diffraction element and outputting a signal in accordance with a light amount of the beam received. The diffraction element includes a plurality of areas. A diffraction beam of a desired order generated by an area group A included in the plurality of areas form a first spherical wave. A diffraction beam of a desired order generated by an area group B included in the plurality of areas but excluded from the area group A form a second spherical wave, which has a light collection point farther than the light collection point of the first spherical wave with respect to the diffraction element. A focusing error signal generator is provided for generating a focusing error signal based on the difference between the cross sections of the first spherical wave and the second spherical wave on the light detector. The diffraction element has at least one division line perpendicular to the tangent to the tracks. Either one of portions sandwiching the at least one division line is included in the area group A and the other portion is included in the area group B.

According to still another aspect of the invention, an optical head device includes a light source for emitting at least one of a coherent beam and a quasi-monochromatic beam; a collection optical system for collecting the beam emitted by the light source to an information memory medium having tracks having a mark and a space selectively arranged or tracks having prescribed grooves; a diffraction element for receiving a beam diffracted by the information memory medium and generating a diffraction beam; and a light detector having a plurality of detection areas for receiving the beam diffracted by the diffraction element and outputting a signal in accordance with a light amount of the beam received. The diffraction element includes a plurality of areas. A diffraction beam of a desired order generated by an area group A included in the plurality of areas form a first spherical wave. A diffraction beam of a desired order generated by an area group B included in the plurality of areas but excluded from the area group A form a second spherical wave, which has a light collection point farther than the light collection point of the first spherical wave with respect to the diffraction element. A focusing error signal generator is provided for generating a focusing error signal based on the difference between the cross sections of the first spherical wave and the second spherical wave on the light detector. The diffraction element has a diffraction area which is larger than the area corresponding to an aperture of the collection optical system. The diffraction element has a first division line and a second division line interposing the aperture, the first division line and the second division line being parallel to the tangent to the tracks and in contact with an outer periphery of the aperture. Either one of portions sandwiching the first division line or the second division line is included in the area group A and the other portion is included in the area group B.

In one embodiment of the invention, the diffraction element is integral with the collection optical system.

According to still another aspect of the invention, a method for processing optical information includes the steps of emitting at least one of a coherent beam and a quasi-monochromatic beam; collecting the beam emitted by the light source to an information memory medium having at least one track, at least one mark and at least one space; receiving the beam reflected by the information memory medium by a plurality of detection areas and outputting a signal in accordance with a light amount of the beam received; and receiving the signals output from the plurality of detection areas and generating a tracking error signal based on the signals. The step of generating a tracking error signal includes the step of subtracting a component of the signal obtained from an overlapping area from the tracking error signal. In the case where an aperture of a collection optical system for collecting the beam is a circle having a radius of 1, the overlapping area is an area where two circles overlap, the circles each having a radius of 1 and being centered around a point which is $\lambda/(NA \cdot Gp)$ away, in a direction perpendicular to the track, from a center of the aperture of the collection optical system, and where λ is the wavelength of the emitted beam, NA is the numerical aperture of the collection optical system, and Gp is the distance between centers of two adjacent tracks of the information memory medium, $\lambda/(NA \cdot Gp) < 1$.

According to still another aspect of the invention, a method for processing optical information includes the steps of emitting at least one of a coherent beam and a quasi-monochromatic beam; receiving the beam emitted by the light source and dividing the beam into a first beam and a second beam; receiving the first beam and the second beam and collecting the first beam and the second beam into a microscopic spot on an information memory medium, an effective numerical aperture of the collection optical system for collecting the beams with respect to the first beam being different from an effective numerical aperture of the collection optical system with respect to the second beam; receiving the beam diffracted and/or reflected by the information memory medium and branching the beam; receiving the branched beam and outputting a signal in accordance with a light amount of the beam received; receiving the output signal and performing an operation of the signal; determining relative positions of the collection optical system and the information memory medium based on the signal obtained as a result of the operation; and generating a tracking error signal using the first or second beam with respect to which the effective numerical aperture of the collection optical system is smaller.

According to still another aspect of the invention, a method for processing optical information includes the steps of emitting at least one of a coherent beam and a quasi-monochromatic beam; receiving the beam emitted by the light source and converging the beam into a microscopic spot on an information memory medium; receiving the beam diffracted and/or reflected by the information memory medium and branching the beam; receiving the branched beam by a plurality of detection areas and outputting a signal in accordance with a light amount of the beam received; receiving the output signal and performing an operation of the signal; performing focusing control and tracking control to determine relative positions of a collection optical system for converging the beam and the information memory medium; and changing the angle made by the beam converged by the collection optical system and the information memory medium. The information memory medium has patterns or prescribed grooves for generating a tracking error signal, and $NA > \lambda/Gp$ where Gp is the cycle of the patterns or grooves, $\lambda$ is the wavelength of the emitted beam, and NA is the numerical aperture of a part of the converging system facing the information memory medium.

According to still another aspect of the invention, a method for processing optical information includes the steps of emitting at least one of a coherent beam and a quasi-monochromatic beam; collecting the beam emitted by the light source to an information memory medium having a track having a mark and a space selectively arranged; receiving the beam reflected by the information memory medium by a plurality of detection areas and outputting a signal in accordance with a light amount of the beam received; dividing the light reflected by the information memory medium; generating an information reproduction signal for reproducing information stored in the track based on a signal indicating the difference between a signal obtained in accordance with the beams incident on a first area and a second area obtained as a result of dividing the light; and changing a region included in the first area, a region included in the second area, or a region included in both the first area and the second area, in accordance with the positional relationship between the light collection point of the light from a collection optical system for collecting the beam and the track.

According to still another aspect of the invention, a method for processing optical information includes the steps of emitting at least one of a coherent beam and a quasi-monochromatic beam; collecting the beam emitted by the light source to an information memory medium having tracks having a mark and a space selectively arranged or tracks having prescribed grooves; receiving the beam reflected by the information memory medium by a detection area and outputting a signal in accordance with a light amount of the beam received; receiving the output signal and generating a tracking error signal based on the signal received; and dividing the light reflected by the information memory medium. Where $\lambda$ is the wavelength of the emitted beam, NA is the numerical aperture of a collection optical system for collecting the beam, Gp is the distance between centers of two adjacent tracks of the information memory medium, $\lambda/(NA \cdot Gp) \geq 1$, and the beam has a substantially circular cross section having a radius of 1, the light division element has at least five division lines which are substantially parallel to the tangent to the tracks; the division line running through the center of the substantially circular cross section may be defined as a first division line, two division lines which are distanced from the first division line by a distance of about 0.1 in two opposite directions may be defined as a second division line and a third division line, and two division lines which are distanced from two ends of the cross section by a distance of about 0.1 may be defined as a fourth division line and a fifth division line. The method further includes the step of generating the tracking error signal by alternately inverting the polarity of the signals obtained in accordance with the beams incident on six areas defined by the five division lines and adding together those signals.

According to still another aspect of the invention, a method for processing optical information includes the steps of emitting at least one of a coherent beam and a quasi-monochromatic beam; collecting the beam emitted by the light source to an information memory medium having tracks having a mark and a space selectively arranged or tracks having prescribed grooves; receiving the beam reflected by the information memory medium by a plurality of areas and generating a diffraction beam; receiving the diffracted beam by a plurality of detection areas and outputting a signal in accordance with a light amount of the beam received; and generating a focusing error signal based on the difference between the size of the cross section of a first spherical wave and the size of the cross section of a second spherical wave. The first spherical wave corresponds to a diffraction beam of a desired order generated by an area group A included in the plurality of areas. The second spherical wave corresponds to a diffraction beam of a desired order generated by an area group B included in the plurality of areas but excluded from the area group A. Either one of portions sandwiching the at least one division line is included in the area group A and the other portion is included in the area group B.

Thus, the invention described herein makes possible the advantages of (1) providing an optical head device having stable servo characteristics and thus realizes stable formation of marks at appropriate positions on or in the vicinity of the tracks for information recording, and also realizes correct information reproduction and stable information recording and erasure with a sufficiently low error ratio; (2) providing an inclination detection apparatus for detecting an inclination of 0.5 degrees or less with high precision; and (3) an optical information processing apparatus for realizing stable information recording to and reproduction from an information memory medium which is significantly curved.

These and other advantages of the present invention will become apparent to those skilled in the art upon reading and understanding the following detailed description with reference to the accompanying figures.

DESCRIPTION OF THE PREFERRED EMBODIMENTS

Figure 1:
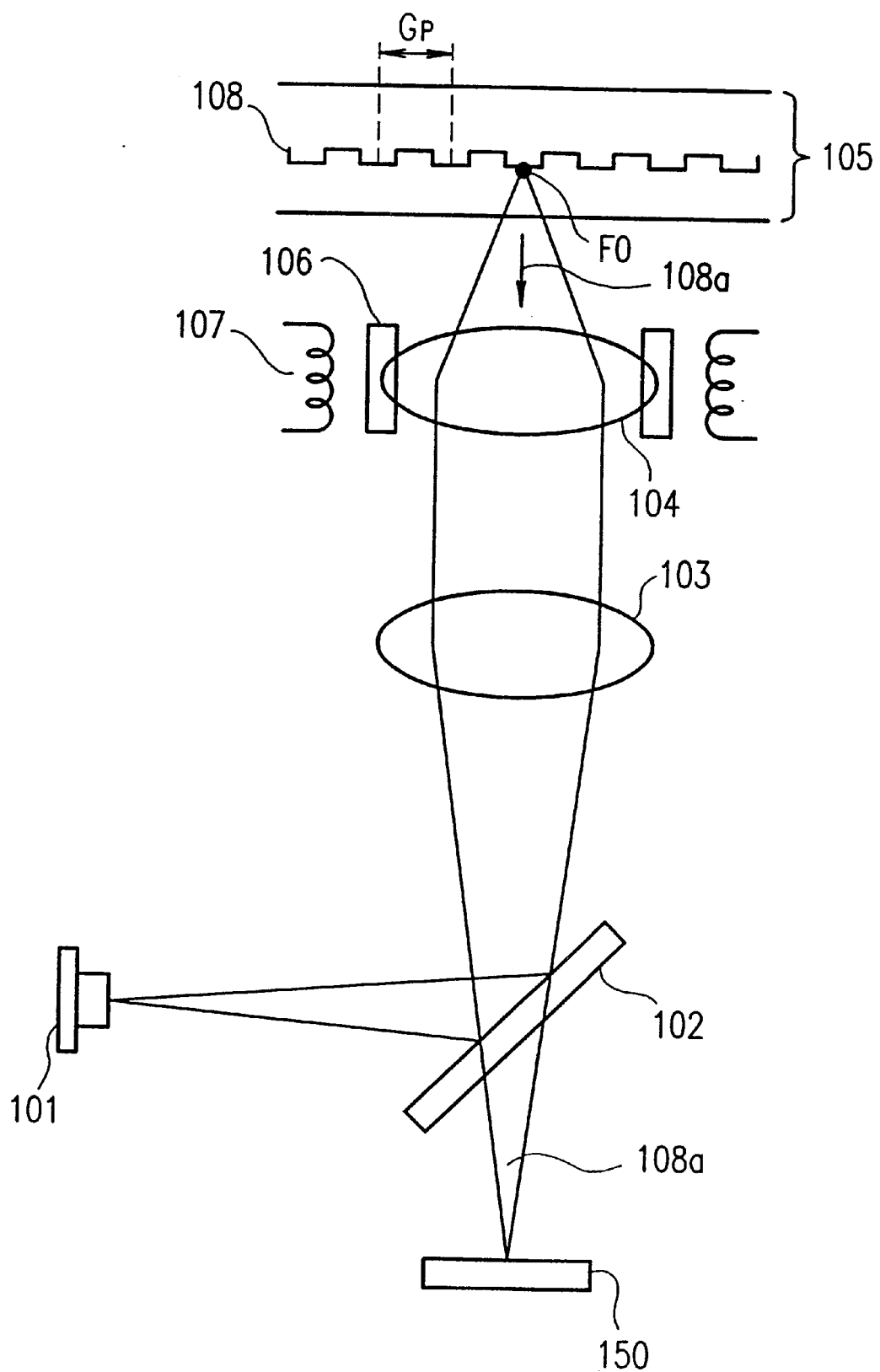
FIG. 1 is a schematic view of an optical system of an optical head device according to the present invention.

Hereinafter, the present invention will be described by way of examples with reference to the attached drawings. In the following examples, identical reference numerals indicate elements having identical functions, respectively.

EXAMPLE 1

An optical head device according to a first example of the present invention will be described with reference to FIGS. 1 through 3.

FIG. 1 is a schematic view of an optical system of the optical head device. The optical head device operates in the following manner.

Light emitted by a semiconductor laser 101 (used as a light source) is reflected by a plane-parallel beam splitter 102 and then collimated by a collimator lens 103, which is a part of the optical system. The light is collected by an objective lens 104, which is also a part of the optical system, and then focused on an information layer 108 of an optical disk 105 employed as an information memory medium. An actuator 107 moves the objective lens 104 and a holding device 106 for holding the objective lens 104 in accordance with the fluctuation or decentration of the optical disk 105.

The light is then diffracted and/or reflected by the information layer 108 of the optical disk 105 to light 108a, which is transmitted back through the objective lens 104 to be collimated. The collimated light 108a is then converged by the collimator lens 103. The converged light 108a is provided with a non-point aberration when passing through the plane-parallel beam splitter 102. The light after passing through the plane-parallel beam splitter 102 will be referred to as light 108a. The converged light 108a provided with the nonpoint aberration is detected by a light detector 150. The optical system is arranged so that, when the focal point F0 of the light from the objective lens 104 is on the information layer 108 of the optical disk 105, the detection surface of the light detector 150 is at the least circle of confusion of the converged light 108a.

The optical disk 105 serving as the information memory medium includes a plurality of grooves. As shown in FIG. 1, the distance between the center of one of such grooves and the center of an adjacent groove is indicated by Gp. Information can be stored (1) either on the bottom of the groove or between the grooves, or (2) both on the bottom of the groove and between the grooves. Further in this specification, the numerical aperture of the objective lens 104 is indicated by NA, and the wavelength of the light emitted by the semiconductor laser 101 is indicated by λ.

In the first example, the optical head device which fulfills the conditions represented by expression (4) will be described.

$$\lambda/(NA \cdot Gp) < 1 \qquad (4)$$

Figure 2:
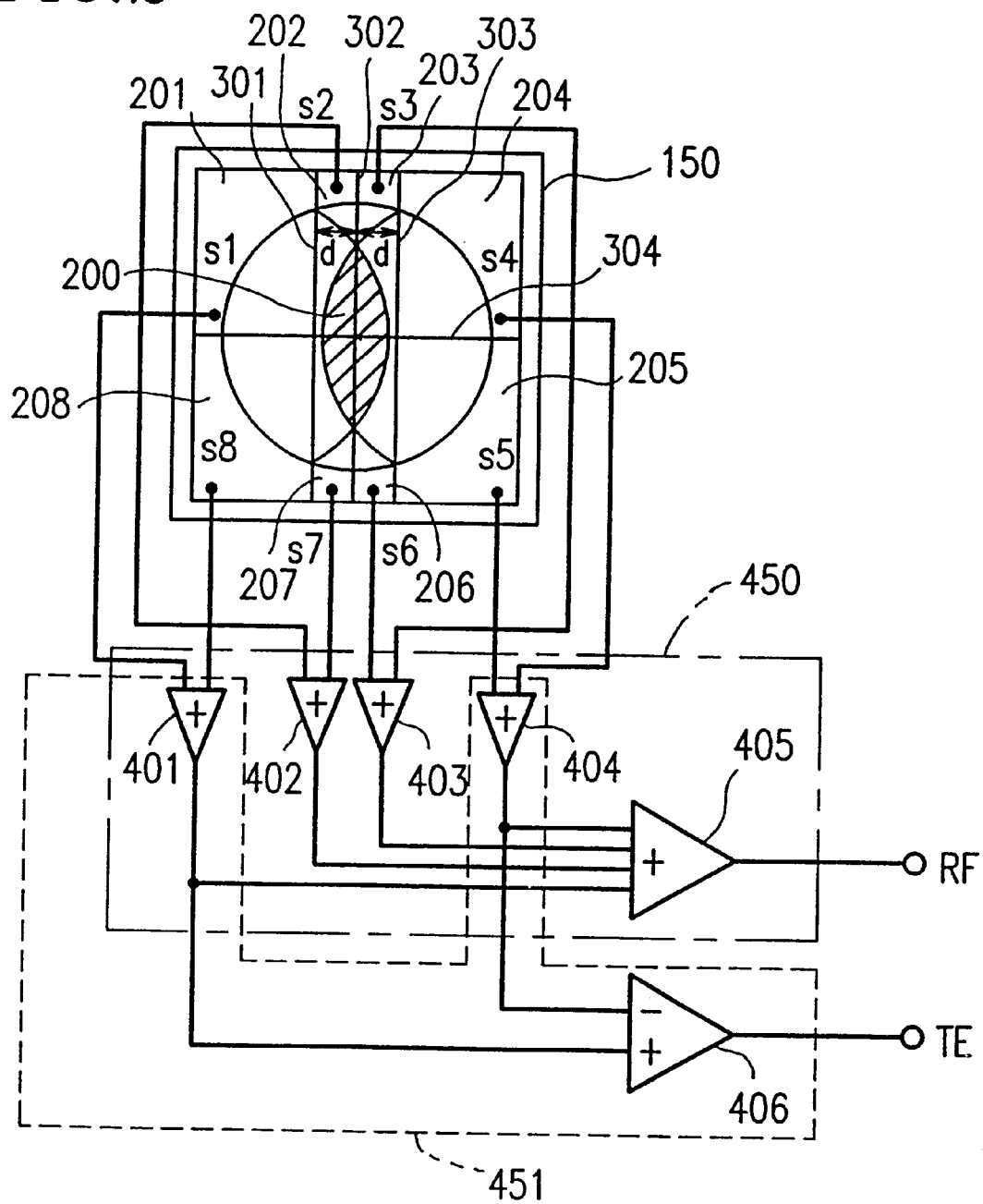
FIG. 2 shows detection areas of a light detector of the optical head device shown in FIG. 1, and a configuration of a circuit acting as an information reproduction signal generator and a tracking error signal generator.

FIG. 2 shows detection areas 201 through 208 of the light detector 150, an information reproduction signal generator 450, and a tracking error signal generator 451.

The light detector 150 is divided into detection areas 201 through 208 by division lines 301 through 304. Under the conditions represented by expression (4), plus first-order diffraction light and minus first-order diffraction light overlap each other at least partially. In FIG. 2, the overlapping area 200 is indicated by hatching. The maximum value W of the width in the radial direction of the overlapping area 200 is:

$$W = 2 \times (1 - \lambda/(NA \times Gp)) \qquad (5)$$

where the aperture of the optical system as shown in FIG. 1 has a radius of 1.

The division lines 301 through 303 are parallel to the tangent to the grooves of the optical disk 105 (FIG. 1). The division line 304 is perpendicular to the tangent to the grooves of the optical disk 105. The direction of the tangent to the grooves of the optical disk 105 is the direction in which the grooves are optically projected on the light detector 150.

In the case where the non-point aberration method is used for detecting a focusing error signal, when a non-point aberration is provided using a direction which is 45 degrees with respect to the grooves of the optical disk 105 as the axis, the direction in which the grooves are projected on the light detector 150 rotates by 90 degrees. Accordingly, even when the actual division line is perpendicular to the tangent to the grooves of the optical disk 105, such a division line is represented as being "parallel to the tangent to the grooves" in this specification, as long as such a division line is parallel to the tangent to the grooves projected on the light detector 150.

The division line 302 passes through the center of the light which is projected on the light detector 150 through the aperture of the objective lens 104 (FIG. 1). The division lines 301 and 303 are disposed so as to sandwich the overlapping area 200. Distance d between the division lines 301 and 302 and distance d between the division lines 302 and 303 is each set to be equal to W/2. By such an arrangement, as shown in FIG. 2, the overlapping area 200 of the plus first-order diffraction light and the minus first-order diffraction light obtained by the optical disk 105 is included within the detection areas 202, 203, 206 and 207 of the light detector 150. Signals which are obtained in accordance with the amount of light detected by the detection areas 201 through 208 are respectively indicated by s1 through s8.

A focusing error signal FE is obtained by expression (6).

$$FE=(s1+s2+s5+s6)-(s3+s4+s7+s8) \quad (6)$$

In FIG. 2, an operation circuit for obtaining the focusing error signal FE is not shown.

Hereinafter, the information reproduction signal generator 450 for generating an RF signal, which is an information reproduction signal, will be described. The information reproduction signal generator 450 includes adders 401 through 405. The RF signal is obtained based on the sum of the signals obtained from all the detection areas 201 through 208. As shown in FIG. 2, the adder 401 outputs the sum of "signal s1+signal s8", the adder 402 outputs the sum of "signal s2+signal s7", the adder 403 outputs the sum of "signal s3+signal s6", and the adder 404 outputs the sum of "signal s4+signal s5".

The adder 405 receives the outputs from the adders 401 through 404 and outputs the sum of the four outputs. The output from the adder 405, which is the RF signal, can be represented by expression (7).

$$RF=s1+s2+s3+s4+s5+s6+s7+s8 \quad (7)$$

Hereinafter, the tracking error signal generator 451 will be described. As shown in FIG. 2, the tracking error signal generator 451 includes the adders 401 and 404, and a differential operation circuit 406. The differential operation circuit 406 receives the outputs from the adders 401 and 404, and outputs the difference between the two outputs. The output from the differential operation circuit 406, i.e., a tracking error signal TE1, can be represented by expression (8).

$$TE1=(s1+s8)-(s4+s5) \quad (8)$$

The conventional optical head devices have the following drawbacks in tracking control when a tilt occurs (i.e., the optical disk 105 tilts with respect to the radial direction). The radial direction is the direction perpendicular to the tangent to the grooves of the optical disk 105.

When the tilt occurs, the reflected light which is detected is offset in the direction of the tilt. When a tilt of the disk of θ occurs, the reflected light is offset by 2θ. For example, where the numerical aperture NA is 0.6, the angle θ of tilt is 0.8 degrees, and the aperture is a substantial circle having a radius of 1, sin 2θ/NA=0.047. The reflected light which is detected is offset by 0.047 in the direction of the tilt.

Where TE0 is a value of the tracking error signal which is obtained when the focal point F0 of the light from the objective lens 104 is at the center of the groove, TEmax is the maximum value of the tracking error signal which is obtained when the light has crossed the groove, and TEmin is the minimum value of the tracking error signal which is obtained when the light has crossed the groove; the difference between |TEmax−TE0| (difference between the absolute values of TEmax and TE0) and |TEmin−TE0| (difference between the absolute values of TEmin and TE0) is increased.

Figure 3:
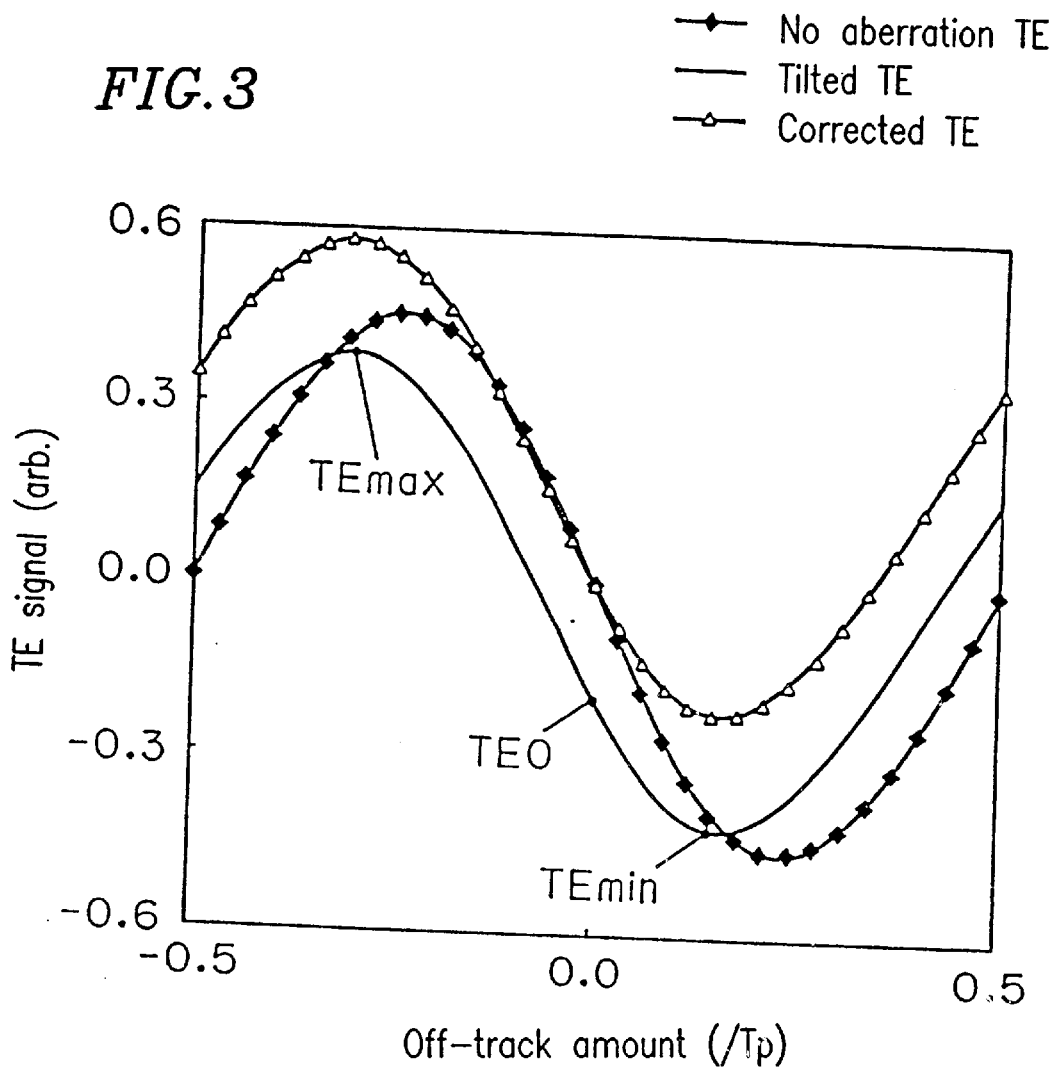
FIG. 3 is a graph illustrating the tracking error signal vs. off-track amount relationship of the optical head device shown in FIG. 2.

FIG. 3 is a graph illustrating the tracking error signal vs. off-track amount relationship. The off-track amount is the distance of the focal point F0 from the center of the track.

The curve having black squares represents the tracking error signal obtained when no aberration is provided. The solid line curve represents the tracking error signal obtained when a tilt occurs. The solid line curve has the TEmax of 0.38, the TEmin of −0.42, and the TE0 of −0.20.

$$|TE\text{max}-TE0|=0.58,$$

and $$|TE\text{min}-TE0|=0.22.$$

The difference between |TEmax−TE0| and |TEmin−TE0| is significant.

When tracking control is performed in such a state, the focal point F0 of the light from the objective lens 104 (FIG. 1) is off the center of the track, and thus information cannot be accurately recorded or reproduced.

In order to position the focal point F0 at the center of the track, an offset voltage is applied to the tracking error signal as described below.

In FIG. 3, the curve having white triangles represents the tracking error signal which is obtained by correcting the off-track amount to zero. An offset voltage is applied so that the center of the track matches the zero-cross point of the tracking error signal. At this point, the upper amplitude of the tracking error signal from 0 level and the lower amplitude thereof from 0 are asymmetrical with each other.

When the upper amplitude and the lower amplitude becomes excessively asymmetrical, the tracking control becomes unstable, which prevents accurate recording and reproduction of information.

As described above, in the conventional optical head devices, when the difference between |TEmax−TE0| and |TEmin−TE0| becomes excessive, the off-track amount becomes excessively large. Even if an offset voltage is applied in order to reduce the off-track amount, the upper amplitude and the lower amplitude of the tracking error signal becomes excessively asymmetric, as represented by the excessive degree of asymmetry of the upper and lower amplitudes which is obtained when the off-track amount is corrected to zero.

Comparison of the degrees of asymmetry of the tracking error signal in the first example and a conventional optical head device will be described.

Where the numerical aperture NA of the objective lens 104 is 0.6, the wavelength λ of the light is 0.66 $\mu$m, the distance Gp between the centers of two adjacent grooves of the optical disk 105 (FIG. 1) is 1.48 $\mu$m, and the radius of the aperture is 1, the plus first-order diffraction light and the minus first-order diffraction light have an overlapping area having a width W of 0.51.

The case where the thickness of the optical disk 105 is 0.6 mm and a tilt of 0.4 degrees occurs in the radial direction will be described.

In the conventional optical head device, the off-track amount is about 0.07 $\mu$m with respect to the center of the track. Application of an offset voltage so as to realize the off-track amount of zero, the upper and lower amplitudes of the tracking error signal is asymmetrical with each other by 31%.

The degree of asymmetry of the tracking error signal is defined by (A+B)/(A−B) where A is the maximum value of the upper amplitude of the tracking error signal and B is the minimum value of the lower amplitude thereof.

In the optical head device shown in FIG. 2, the off-track amount of the light with respect to the center of the track can be restricted to as small as about 0.045 μm when the radial tilt of 0.4 degrees occurs, by obtaining the tracking error signal TE1 only from outside the overlapping area of the plus first-order diffraction light and the minus first-order diffraction light. The degree of asymmetry of the tracking error signal when the off-track amount is corrected to zero is 19%, which is ⅔ of the degree of asymmetry in the conventional optical head device.

In the conventional optical head device, when the object lens 104 shifts, the detection spot moves on the light detector 150. When the off-track amount is corrected to zero, the degree of asymmetry of the upper and lower amplitudes becomes excessive. For example, when the object lens 104 shifts by 150 μm, the degree of asymmetry is 16% when the off-track amount is corrected to zero.

In the optical head device shown in FIG. 2, when the object lens 104 shifts by 150 μm, the degree of asymmetry can be restricted as low as 3% when the off-track amount is corrected to zero.

As described above, in the optical head device shown in FIG. 2, even if the optical disk 105 tilts, stable tracking control can be performed while maintaining the off-track amount small. Thus, the optical head device shown in FIG. 2 realizes recording and reproduction of information with a sufficiently low error ratio.

Figure 4:
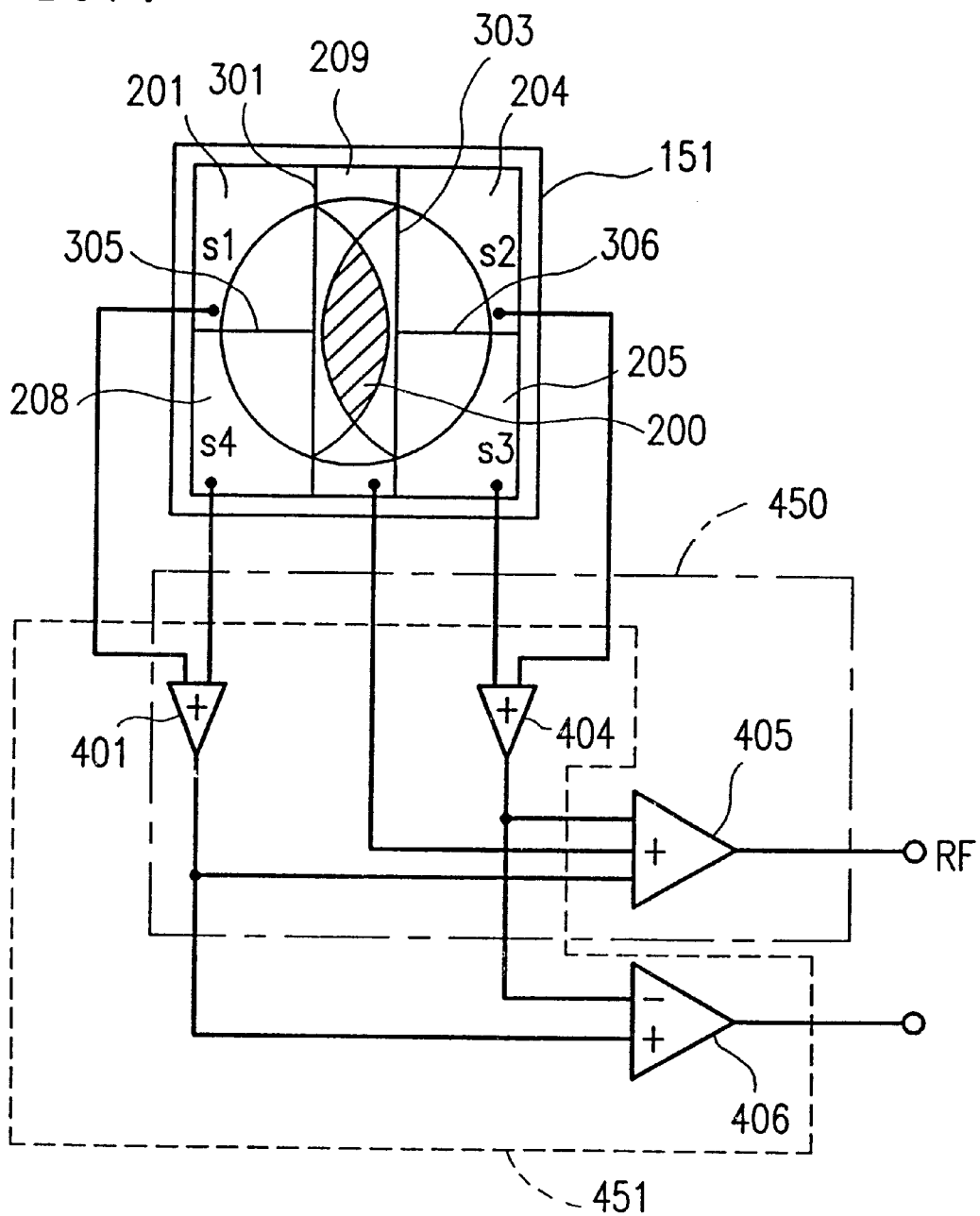
FIG. 4 shows a light detector usable in the optical head device shown in FIG. 1 having different detection areas from the light detector shown in FIG. 2, and a configuration of a circuit acting as an information reproduction signal generator and a tracking error signal generator.

With reference to FIG. 4, another optical head device having an identical effect with that of the optical head device shown in FIG. 2 will be described.

FIG. 4 shows a light detector 151 having detection areas 201, 204, 205, 208 and 209, an information reproduction signal generator 450, and a tracking error signal generator 451 of the optical head device shown in FIG. 2. The optical head device shown in FIG. 4 is different from the optical head device shown in FIG. 2 in that the light detector 151 is used instead of the light detector 150. The arrangement of the optical system is identical as that of the optical head device shown in FIG. 2.

The light detector 151 is divided into detection areas 201, 204, 205, 208 and 209 by division lines 301, 303, 305 and 306. The division lines 301 and 303 are disposed so as to sandwich an overlapping area of plus first-order diffraction light and minus first-order diffraction light, and the light corresponding to the overlapping area 200 is incident on the detection area 209 defined by the division lines 301 and 303.

The detection areas 201, 204, 205, 208 and 209 respectively generate signals s1, s2, s3, s4 and s5 in accordance with the amount of light received.

Hereinafter, the information reproduction signal generator 450 will be described. As shown in FIG. 4, the information reproduction signal generator 450 includes adders 401, 404 and 405. An RF signal, which is an information reproduction signal, is obtained based on the sum of the signals obtained from all the detection areas 201, 204, 205, 208 and 209. As shown in FIG. 4, the adder 401 outputs the sum of "signal s1+signal s4", and the adder 404 outputs the sum of "signal s2+signal s3". The adder 405 receives the outputs from the adders 401 and 404 and the signal s5 from the detection area 209, and outputs the sum of the three outputs. The output from the adder 405, which is the RF signal, can be represented by expression (9).

$$RF = s1+s2+s3+s4+s5 \quad (9)$$

Hereinafter, the tracking error signal generator 451 will be described. As shown in FIG. 4, the tracking error signal generator 451 includes the adders 401 and 404, and a differential operation circuit 406. The differential operation circuit 406 receives the outputs from the adders 401 and 404, and outputs the difference between the two outputs. The output from the differential operation circuit 406, i.e., a tracking error signal TE1, can be represented by expression (10).

$$TE1 = (s1+s4)-(s2+s3) \quad (10)$$

In the optical head device shown in FIG. 4, the identical effect as that of the optical head device shown in FIG. 2 can be obtained with a smaller number of detection areas and head amplifiers.

Figure 5:
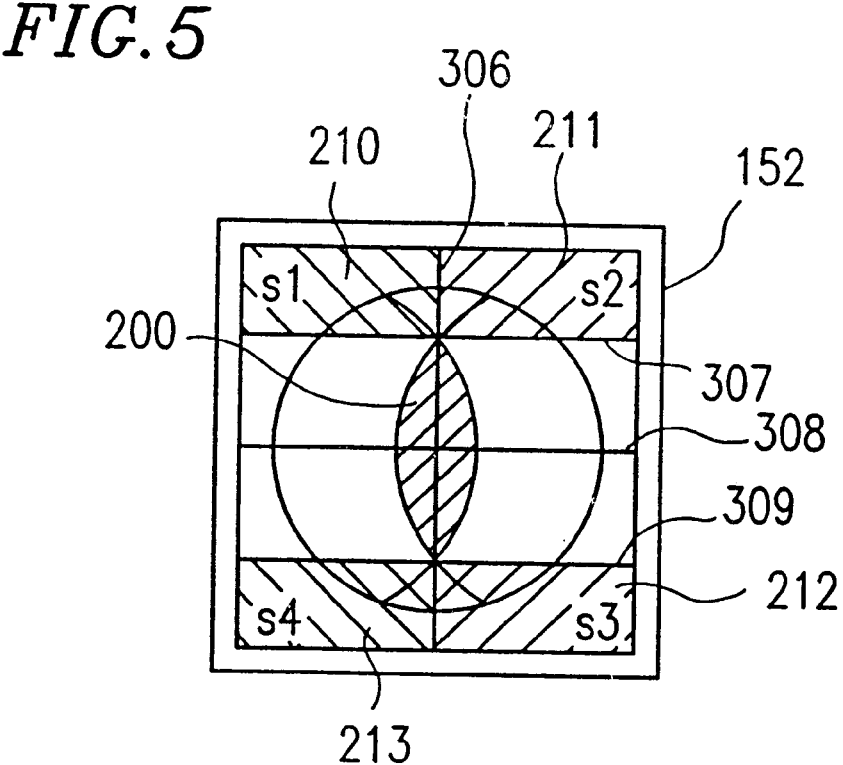
FIG. 5 shows a light detector usable in the optical head device shown in FIG. 1 having different detection areas from the light detector shown in FIG. 2.

With reference to FIG. 5, still another optical head device having the identical effect with that of the optical head device shown in FIG. 2 will be described.

FIG. 5 shows a light detector 152 having eight detection areas defined by division lines 306 through 309. The division lines 307 and 309 which are perpendicular to the tangent to the grooves of the optical disk are disposed so as to sandwich an overlapping area 200 of plus first-order diffraction light and minus first-order diffraction light. Detection areas 210 through 213 which are outside the division lines 307 and 309 and do not include the center of the aperture respectively generate signals s1, s2, s3, and s4 in accordance with the amount of light received.

The tracking error signal TE1 can be obtained by expression (11).

$$TE1 = (s1+s4)-(s2+s3) \quad (11)$$

In such a structure, the diffraction light can be received except for the major part of the overlapping area 200 of the plus first-order diffraction light and the minus first-order diffraction light. Accordingly, the characteristics of the tracking error signal can be improved as satisfactorily as the optical head devices shown in FIGS. 2 and 4. Thus, the optical head device partially shown in FIG. 5 performs stable tracking control with a relatively small off-track amount, and thus realizes recording and reproduction of information with a sufficiently low error ratio.

Figure 6:
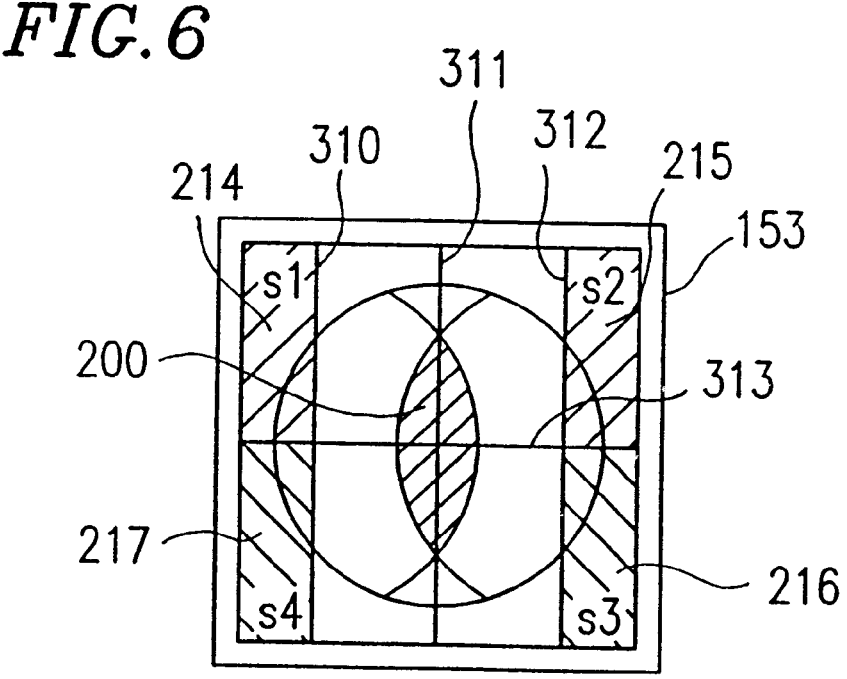
FIG. 6 shows a light detector usable in the optical head device shown in FIG. 1 having different detection areas from the light detector shown in FIG. 2.

With reference to FIG. 6, still another optical head device having the identical effect with that of the optical head device shown in FIG. 2 will be described.

FIG. 6 shows a light detector 153 having eight detection areas defined by division lines 310 through 313. The division lines 310 and 312 which are parallel to the tangent to the grooves of the optical disk are disposed near the periphery of the cross section of the light 108a (FIG. 1) on the light detector 153. Detection areas 214 through 217 which are outside the division lines 310 and 312 and do not include the center of the circle A respectively generate signals s1, s2, s3, and s4 in accordance with the amount of light received.

The tracking error signal TE1 can also be obtained by expression (11).

In such a structure, the diffraction light can be received from the areas sufficiently far from the overlapping area 200 of the plus first-order diffraction light and the minus first-order diffraction light. Accordingly, the characteristics of the tracking error signal can be improved as satisfactorily as the optical head devices shown in FIGS. 2 and 4. Thus, the optical head device partially shown in FIG. 6 performs stable tracking control with a relatively small off-track amount, and thus realizes recording and reproduction of information with a sufficiently low error ratio.

In FIGS. 2, 4, 5 and 6, the division lines are straight. Since the overlapping area 200 of the plus first-order diffraction light and the minus first-order diffraction light is enclosed by a curve, the division lines may be curved lines in accordance with the overlapping area 200.

EXAMPLE 2

In a second example according to the present invention, a tracking error signal is corrected based on a signal obtained from the overlapping area of the plus first-order diffraction light and the minus first-order diffraction light which are obtained by the grooves of the optical disk 105 (FIG. 1). In the second example also, the conditions represented by expression (4) described above are fulfilled.

The structure and operation of an optical head device in the second example are substantially the same as those of the optical system shown in FIG. 1, and thus detailed description thereof will be omitted.

Figure 7:
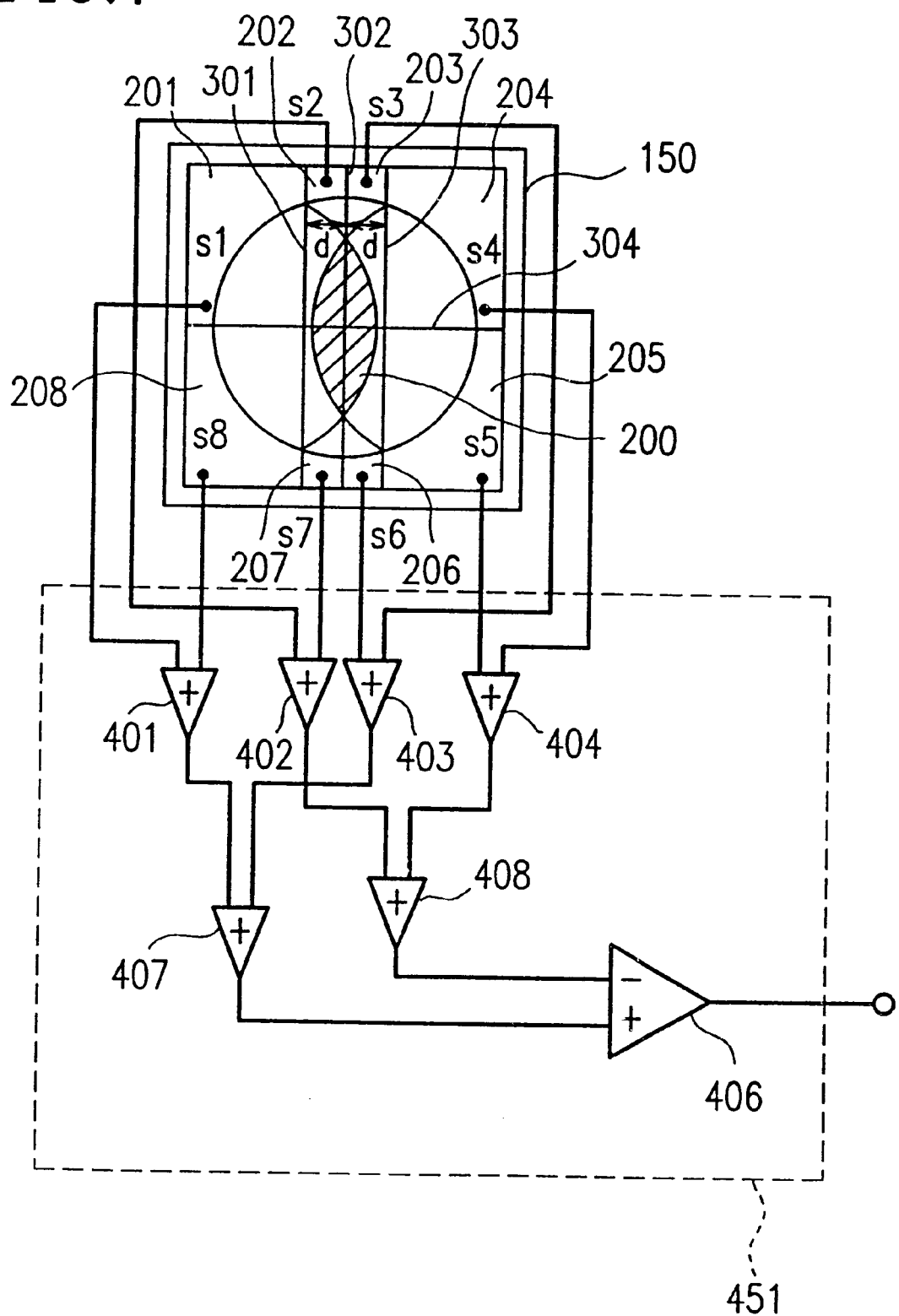
FIG. 7 shows a light detector usable in the optical head device shown in FIG. 1 having different detection areas from the light detector shown in FIG. 2, and a configuration of a circuit acting as a tracking. error signal generator.

FIG. 7 shows a light detector 150 including detection areas 201 through 208, and a tracking error signal generator 451 of an optical head device according to the second example of the present invention.

The light detector 150 is divided into the eight detection areas 201 through 208 by division lines 301 through 304. The division lines are disposed in the same manner as shown in FIG. 2. The detection areas 201 through 208 respectively generate signals s1 through s8 in accordance with the amount of light received. The method for generating the focusing error signal FE and the information reproduction signal are the same as described in the first example with reference to FIG. 2 and will not be described in the second example.

As shown in FIG. 7, the tracking error signal generator 451 includes adders 401 through 404, 407 and 408, and a differential operation circuit 406. As shown in FIG. 7, the adder 401 outputs the sum of "signal s1+signal s8", the adder 402 outputs the sum of "signal s2+signal s7", the adder 403 outputs the sum of "signal s3+signal s6", and the adder 404 outputs the sum of "signal s4+signal s5". The adder 407 receives the outputs from the adders 401 and 403 and outputs the sum of the two outputs. The adder 408 receives the outputs from the adders 402 and 404 and outputs the sum of the two outputs. The differential operation circuit 406 receives the outputs from the adders 407 and 408, and outputs the difference between the two outputs.

The output from the differential operation circuit 406, i.e., a tracking error signal, can be represented by expression (12).

$$TE1 = (s1+s3+s6+s8) - (s2+s4+s5+s7) \quad (12)$$

The method of processing a signal generated by the detection areas which receive the light corresponding to the overlapping area 200 of the plus first-order diffraction light and the minus first-order diffraction light, which is carried out by the structure of FIG. 7, is different from the usual push-pull method. In the structure of FIG. 7, the tracking error signal is corrected by inverting at least one of the signals generated by the detection areas which receive the light corresponding to the overlapping area 200 and then adding together the inverted signal and the other signals.

In the optical head device shown in FIG. 7, when a tilt of 0.4 degrees occurs in the radial direction, the degree of asymmetry of the upper and lower amplitudes of the signal with respect to zero is 14% even when the off-track amount is corrected to zero. This degree of asymmetry is about ½ of the degree obtained in the conventional optical head device. The structure and method for correcting the tracking error signal described with reference to FIG. 7 is specifically advantageous for restricting the asymmetry against a radial tilt.

As described above, the optical head device shown in FIG. 7 performs stable tracking control with a relatively small off-track amount even if a tilt of the optical disk 105 (FIG. 1) occurs, and thus realizes recording and reproduction of information with a sufficiently low error ratio.

Figure 8:
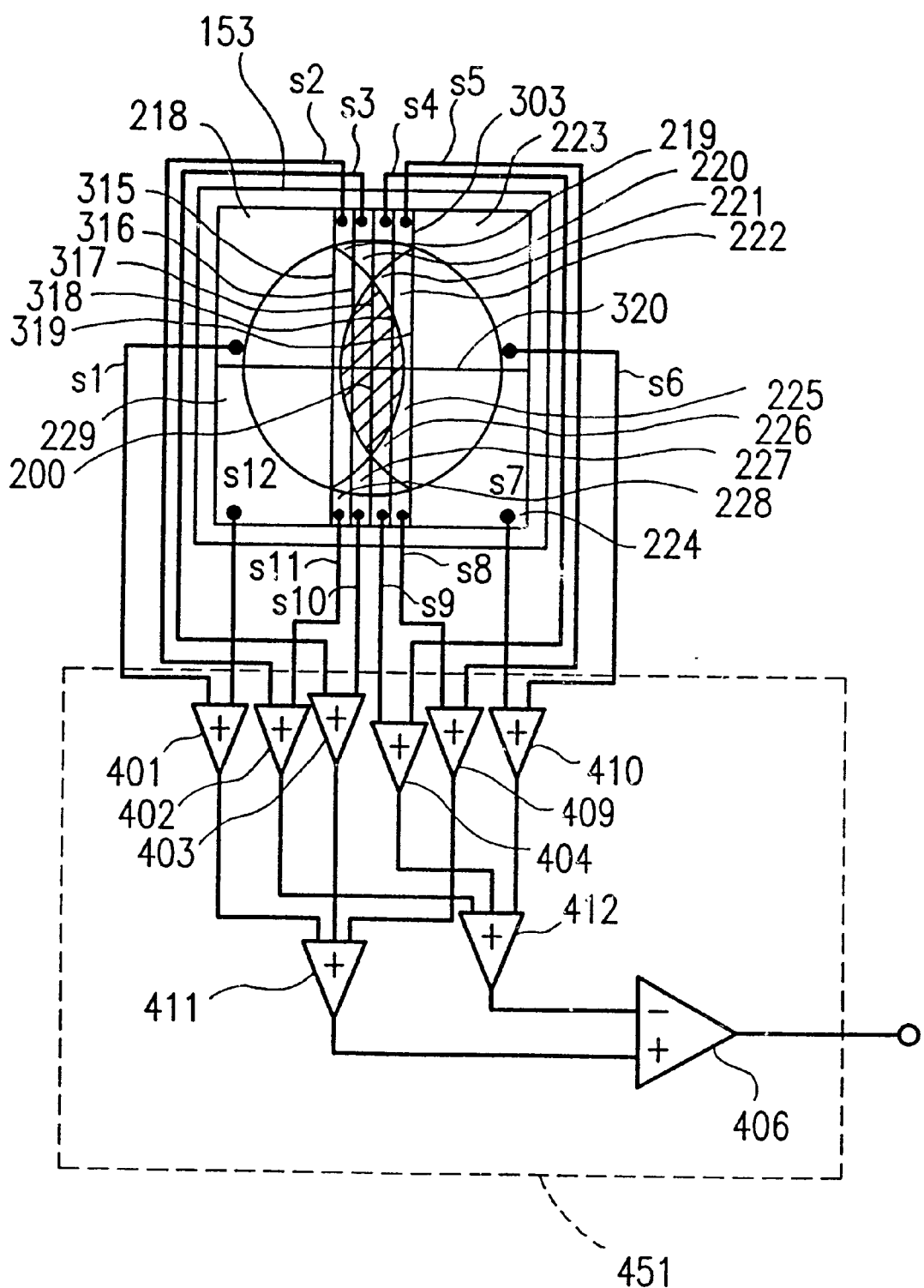
FIG. 8 shows a light detector usable in the optical head device shown in FIG. 1 having different detection areas from the light detector shown in FIG. 2, and a configuration of a circuit acting as a tracking error signal generator.

With reference to FIG. 8, another optical head device having the identical effect with that of the optical head device shown in FIG. 7 will be described.

FIG. 8 shows a light detector 153 including 12 detection areas 218 through 229 defined by division lines 315 through 320, and a tracking error signal generator 451.

The division lines 315 and 319 are parallel to the tangent to the grooves of the optical disk 105 (FIG. 1) and disposed so as to interpose an overlapping area 200 of the plus first-order diffraction light and the minus first-order diffraction light obtained by the grooves of the optical disk 105. The distance between the division lines 315 and 319 is approximately the same as W in expression (5) described above with reference to FIG. 2. The division lines 316 through 318 are disposed equally spaced between the division lines 315 and 319. The detection areas 218 through 229 respectively generate signals s1 through s12 in accordance with the amount of light received.

As shown in FIG. 8, the tracking error signal generator 451 includes adders 401 through 404 and 409 through 412, and a differential operation circuit 406.

As shown in FIG. 8, the adder 401 outputs the sum of "signal s1+signal s12", the adder 402 outputs the sum of "signal s2+signal s11", the adder 403 outputs the sum of "signal s3+signal s10", the adder 404 outputs the sum of "signal s4+signal s9", the adder 409 outputs the sum of "signal s5+signal s8", and the adder 410 outputs the sum of "signal s6+signal s7". The adder 411 receives the outputs from the adders 401, 403, and 409 and outputs the sum of the three outputs. The adder 412 receives the outputs from the adders 402, 404 and 410 and outputs the sum of the three outputs. The differential operation circuit 406 receives the outputs from the adders 411 and 412, and outputs the difference between the two outputs.

The output from the differential operation circuit 406, i.e., a tracking error signal, can be represented by expression (13).

$$TE1 = (s1+s3+s5+s8+s10+s12) - (s2+s4+s6+s7+s9+11) \quad (13)$$

In the optical head device shown in FIG. 8, even when a tilt of 0.4 degrees occurs in the radial direction, the off-track amount is merely 0.042 µm.

When the off-track amount is corrected to zero, the degree of asymmetry of the upper and lower amplitudes of the tracking error signal with respect to zero is 18%, whereas the degree of asymmetry in the conventional optical head device is 31%. As can be understood from this, the optical head device shown in FIG. 8 provides a smaller degree of asymmetry than in the conventional optical head device even when the off-track amount is corrected to zero.

When the objective lens shifts by 150 µm, the degree of asymmetry in the optical head device shown in FIG. 8 is 8% when the off-track amount is corrected to zero, whereas the degree of asymmetry in the conventional optical head device is 16%. As is apparent from this, the optical head device shown in FIG. 8 reduces the asymmetry of the tracking error signal to about half compared to the conventional optical head device.

As described above, the optical head device shown in FIG. 8 performs stable tracking control with a relatively small off-track amount even if a tilt of the optical disk 105 occurs, and thus realizes recording and reproduction of information with a sufficiently low error ratio.

In the second example, the overlapping area 200 of the plus first-order diffraction light and the minus first-order diffraction light is divided into four in the direction perpendicular to the tangent to the grooves of the optical disk 105. The overlapping area 200 may be divided into a greater number of areas, in which case, the same effect can be obtained.

The division line 320 which is perpendicular to the tangent to the grooves of the optical disk is provided in consideration of the non-point aberration method used for focusing the light. In the case where the division line 320 is not provided, the adders 401 through 404, 409 and 410 are not necessary. In such a case, the same effect can be obtained.

EXAMPLE 3

In a third example according to the present invention, a tracking error signal is corrected by generating a correction signal corresponding to disturbance from a signal obtained from the overlapping area of the plus first-order diffraction light and the minus first-order diffraction light which are obtained by the grooves of the optical disk 105 (FIG. 1). In the third example also, the conditions represented by expression (4) described above are fulfilled.

The structure and operation of an optical head device in the third example are substantially the same as those of the optical system shown in FIG. 1, and thus detailed description thereof will be omitted.

Figure 9:
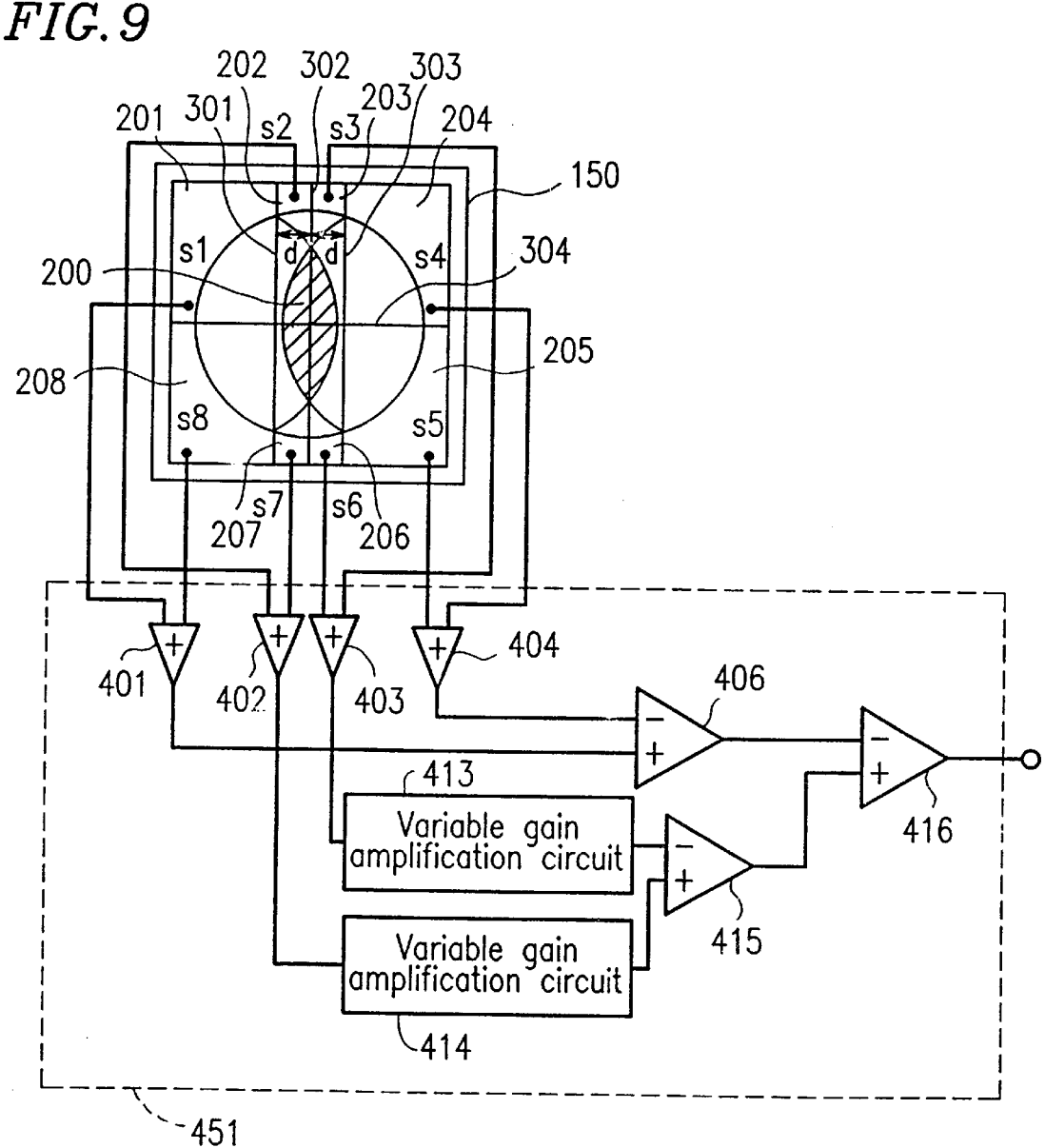
FIG. 9 shows a light detector usable in the optical head device shown in FIG. 1 having different detection areas from the light detector shown in FIG. 2, and a configuration of a circuit acting as a tracking error signal generator.

FIG. 9 shows a light detector 150 including detection areas 201 through 208, and a tracking error signal generator 451 of an optical head device according to the third example of the present invention.

The light detector 150 is divided into the eight detection areas 201 through 208 by division lines 301 through 304. The division lines are disposed in the same manner as shown in FIG. 2. The detection areas 201 through 208 respectively generate signals s1 through s8 in accordance with the amount of light received.

The method for generating the focusing error signal FE and the information reproduction signal are the same as described in the first example with reference to FIG. 2 and will not be described in the third example.

As shown in FIG. 9, the tracking error signal generator 451 includes adders 401 through 404, variable gain amplification circuits 413 and 414, and differential operation circuits 406, 415 and 416.

The variable gain amplification circuit 414 receives an output from the adder 402 and outputs a signal obtained by multiplying the output from the adder 402 by α1, (α1 being a prescribed value). The variable gain amplification circuit 413 receives an output from the adder 403 and outputs a signal obtained by multiplying the output from the adder 403 by α2, (α2 being a prescribed value).

The differential operation circuit 406 receives outputs from the adders 401 and 404 and outputs a signal obtained by subtracting the output of the adder 404 from the output of the adder 401.

The differential operation circuit 415 receives the outputs from the variable gain amplification circuits 413 and 414, and outputs their difference.

The differential operation circuit 416 receives the outputs from their differential operation circuits 406 and 415, and outputs their difference.

The output from the differential operation circuit 416 (i.e., a tracking error signal) can be represented by expression (14).

$$TE1=(s1+s8)-(s4+s5)-\{\alpha 1\cdot(s2+s7)-\alpha 2\cdot(s3+s6)\} \qquad (14)$$

The gain α1 of the variable gain amplification circuit 414 and gain α2 of the variable gain amplification circuit 413 are determined in consideration of the amount and polarity of the radial tilt and the amount and polarity of the shift of the objective lens. By changing the gains α1 and α2, the difference between |TEmax−TE0| and |TEmin−TE0| can be reduced. In other words, the correction amount can be reduced by adjusting the gains. The optical head device shown in FIG. 9 according to the third example is more advantageous over the optical head devices of the second example with respect to improving the amount of correction.

As described above, the optical head device shown in FIG. 9 provides stable tracking control with relatively small off-track error even if a tilt of the optical disk 105 (FIG. 1) occurs, and thus realizes recording and reproduction of information with a substantially low error ratio.

In the third example, the overlapping area 200 of the plus first-order diffraction light and the minus first-order diffraction light is divided into two in the direction perpendicular to the tangent to the grooves of the optical disk 105. The overlapping area 200 may be divided into a greater number of areas, in which case, the same effect can be obtained.

EXAMPLE 4

Figure 10A:
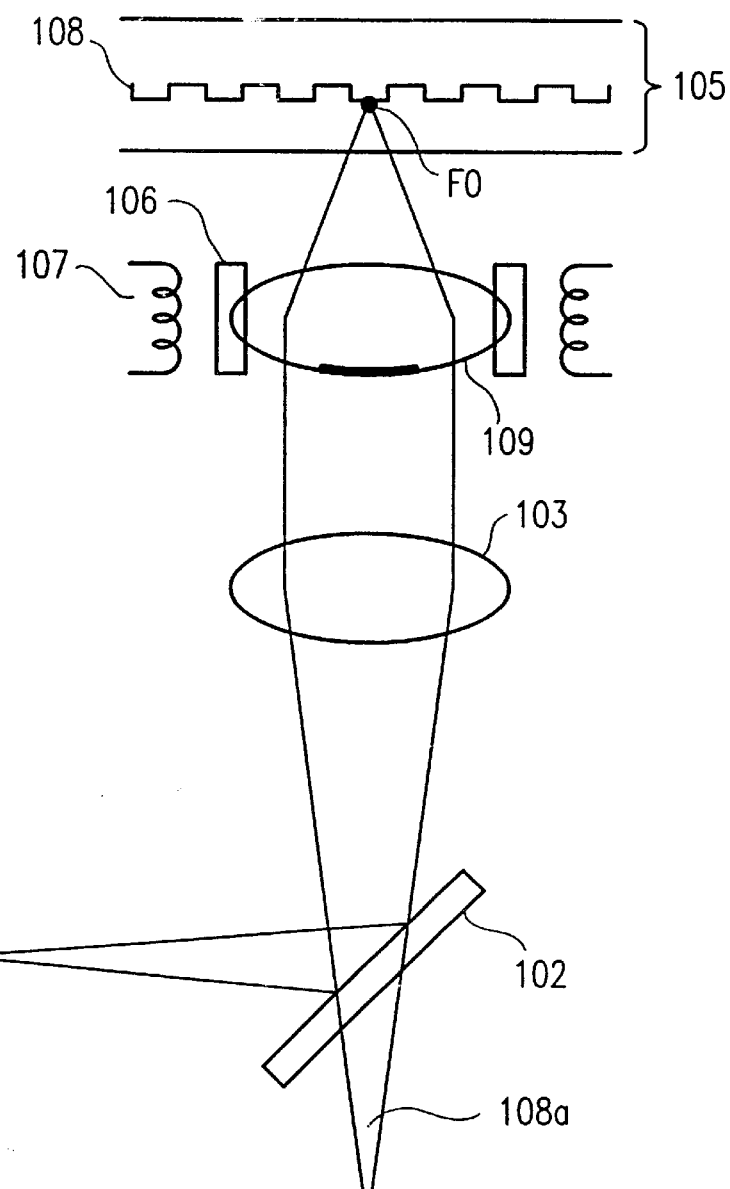
FIG. 10A is a schematic view of an optical system, using a light reducing element, of an optical head device according to the present invention.

In a fourth example according to the present invention, characteristics of a tracking error signal are improved by reducing the optical transmission of an area including an overlapping area of the plus first-order diffraction light and the minus first-order diffraction light which are obtained by the grooves of the optical disk 105 (FIG. 10A). In the fourth example, the conditions represented by expression (4) described above also are fulfilled.

FIG. 10A is a schematic view of an optical system of an optical head device according to the fourth example of the present invention. The optical system in FIG. 10A is identical with that of the optical system shown in FIG. 1 except with respect to the objective lens 109. Accordingly, a detailed description of the optical system except for the objective lens 109 will be omitted.

Figure 10B:
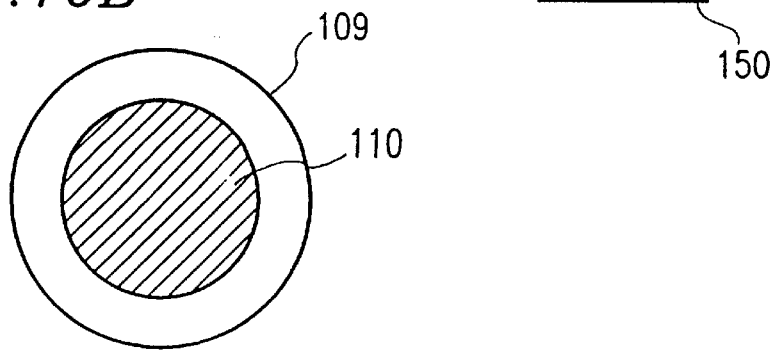
FIG. 10B is a front view of an objective lens usable in the optical system shown in FIG. 10A.

FIG. 10B is a front view of the objective lens 109 which is included in the collection optical system of the optical head device shown in FIG. 10A. A holographic element is provided on the objective lens 109 in a hatched area 110 as a light reducing element. The light diffracted by the holographic element becomes unnecessary light, which does not contribute to the reproduction of the signal. Only zero—the order light which is not diffracted by the holographic element is effectively collected on the information layer 108 of the optical disk 105.

Figure 43A:
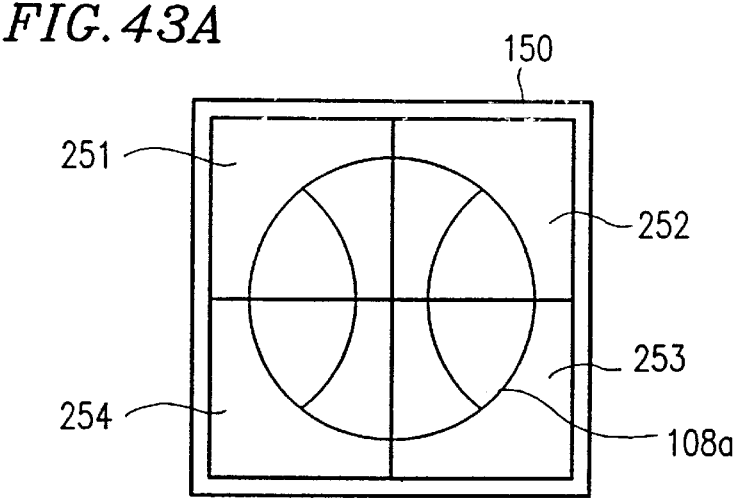
FIGS. 43A through 43C each show a pattern of light detection areas of a light detector and the shape of a cross section of light detected by the detection areas in a conventional optical head device.
Figure 43B:
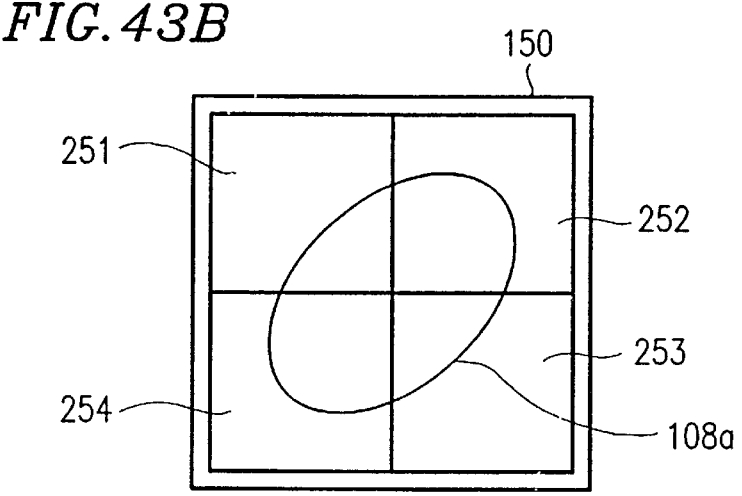
Figure 43C:
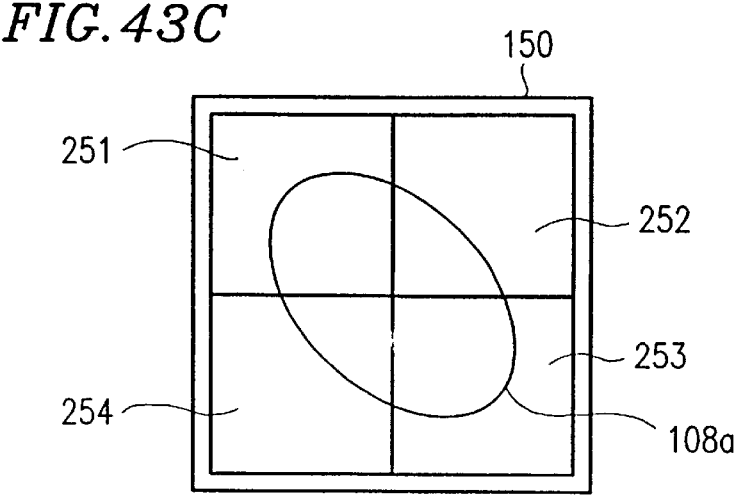

Detection areas 251 through 254 of a light detector 150 can be arranged as shown in FIG. 43A. In the case where the detection areas 251 through 254 are arranged as shown in FIG. 43A, a tracking error signal TE1, a focusing error signal FE, and an information reproduction signal RF are obtained by the expressions (1), (2) and (3), respectively.

Comparison of the degrees of asymmetry of the tracking error signal in the fourth example and a conventional optical head device will be described.

The comparison is performed by correcting the off-track amount to zero under the same conditions as those described regarding the optical head device shown in FIG. 2, in the case where the transmittance T of the area 110 is 55%, the ratio of the radius of the area 110 with respect to the radius of the objective lens 109 is 0.72, and the angle of the radial tilt is 0.4 degrees. The degree of asymmetry of the upper and lower amplitudes of the tracking error signal is restricted to 17% in the optical head device shown in FIG. 10A, whereas the degree of asymmetry is 31% in the conventional optical head device. The degree of asymmetry obtained in the optical head device shown in FIG. 10A is about ½ of the degree obtained in the conventional optical head device.

As described above, in the optical head device shown in FIG. 10A, even if the optical disk 105 tilts, stable tracking control can be performed while maintaining the off-track amount small. Thus, the optical head device shown in FIG. 10A realizes recording and reproduction of information with a sufficiently low error ratio.

In this example, another light spot may be formed by light diffracted by the holographic element provided on the objective lens 109. In such a case, zero—the order diffraction light can be used to form a spot for a DVD having a thickness of 0.6 mm, and first-order diffraction light can be used to form a spot for a CD having a thickness of 1.2 mm thick. By forming a different light spot by light diffracted on the holographic element, the function of a bifocal lens can be provided.

In this example, the holographic element is provided as a light reducing element. The same effect can be obtained by providing the objective lens with a reflection film having an appropriate transmittance or providing the objective lens with a light absorption film.

Figure 11:
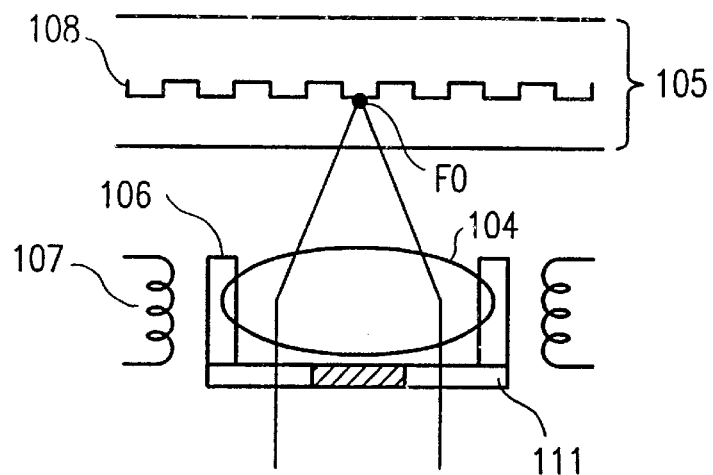
FIG. 11 is a schematic view of an optical system, using another light reducing element, of an optical head device according to the present invention.

Alternatively, as shown in FIG. 11, a holographic element or filter 111 including a light reducing film may be held so as not to be moved with respect to the objective lens 104, in lieu of directly attaching any of the above-mentioned light reducing elements on the objective lens. In such a case, the same effect can be obtained.

In FIG. 11, the filter 111 as a light reducing element covers a surface of the objective lens 104 which is farther from the optical disk 105, but may cover a surface of the object lens 104 which is closer to the optical disk 105. Similarly, the light reducing element in FIG. 10A can cover a surface of the objective lens 10 which is closer to the optical disk 105.

Figure 12:
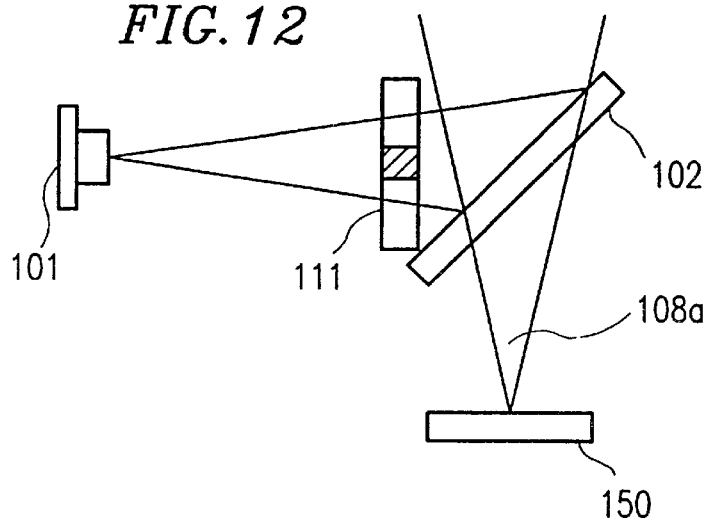
FIG. 12 is a schematic view of an optical system, using still another light reducing element, of an optical head device according to the present invention.

In the fourth example, the light reducing element is provided integrally with the collection optical system, but may be provided in the fixed optical system separately from the collection optical system. FIG. 12 shows an exemplary optical head device including a light reducing element on a light path from the light source to the optical disk. As shown in FIG. 12, the light emitted by the semiconductor laser 101 as a light source passes through a filter 111 as a light reducing element. By the filter 111, the light corresponding to a central area of the filter 111 is reduced. The remaining light is reflected by the plane-parallel beam splitter 102. In such a structure, the zero—the order diffraction light in the overlapping area of the plus first-order diffraction light and the minus first-order diffraction light which are obtained from the grooves of the optical disk 105 is reduced. Thus, the influence of the overlapping area can be reduced.

Figure 13:
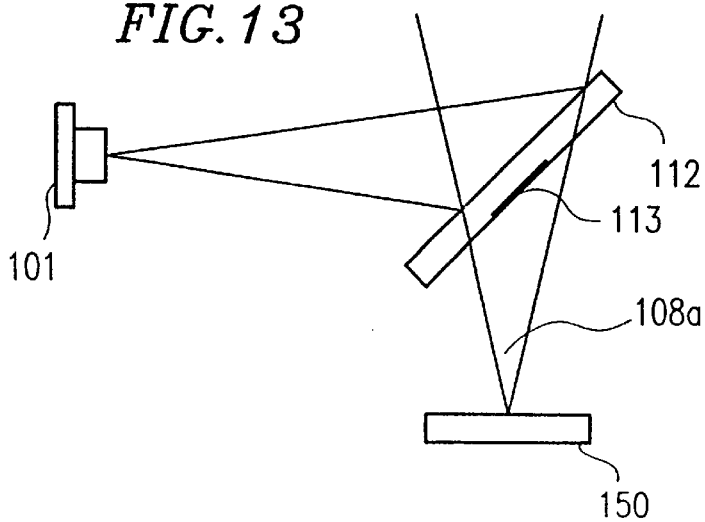
FIG. 13 is a schematic view of an optical system, using still another light reducing element, of an optical head device according to the present invention.

FIG. 13 shows an exemplary optical head device including a light reducing element in an optical system from the optical disk to the light detector 150. In FIG. 13, a light reducing element 113 is provided on a bottom surface of a plane-parallel beam splitter 112. In such an arrangement also, the influence of the overlapping area of the plus first-order diffraction light and the minus first-order diffraction light can be reduced, and the same effect can be obtained.

In the first through fourth examples, the non-point aberration method is used for obtaining a focusing error signal.

The present invention is not limited to such a method. The non-point aberration method can be used in combination with other methods such as the Foucault method or the spot size method.

EXAMPLE 5

In a fifth example according to the present invention, a holographic element or a stepped prism is used as a light division element. A focusing error signal is obtained by the spot size method. In the fifth example also, the conditions represented by expression (4) described above are fulfilled.

Figure 14:
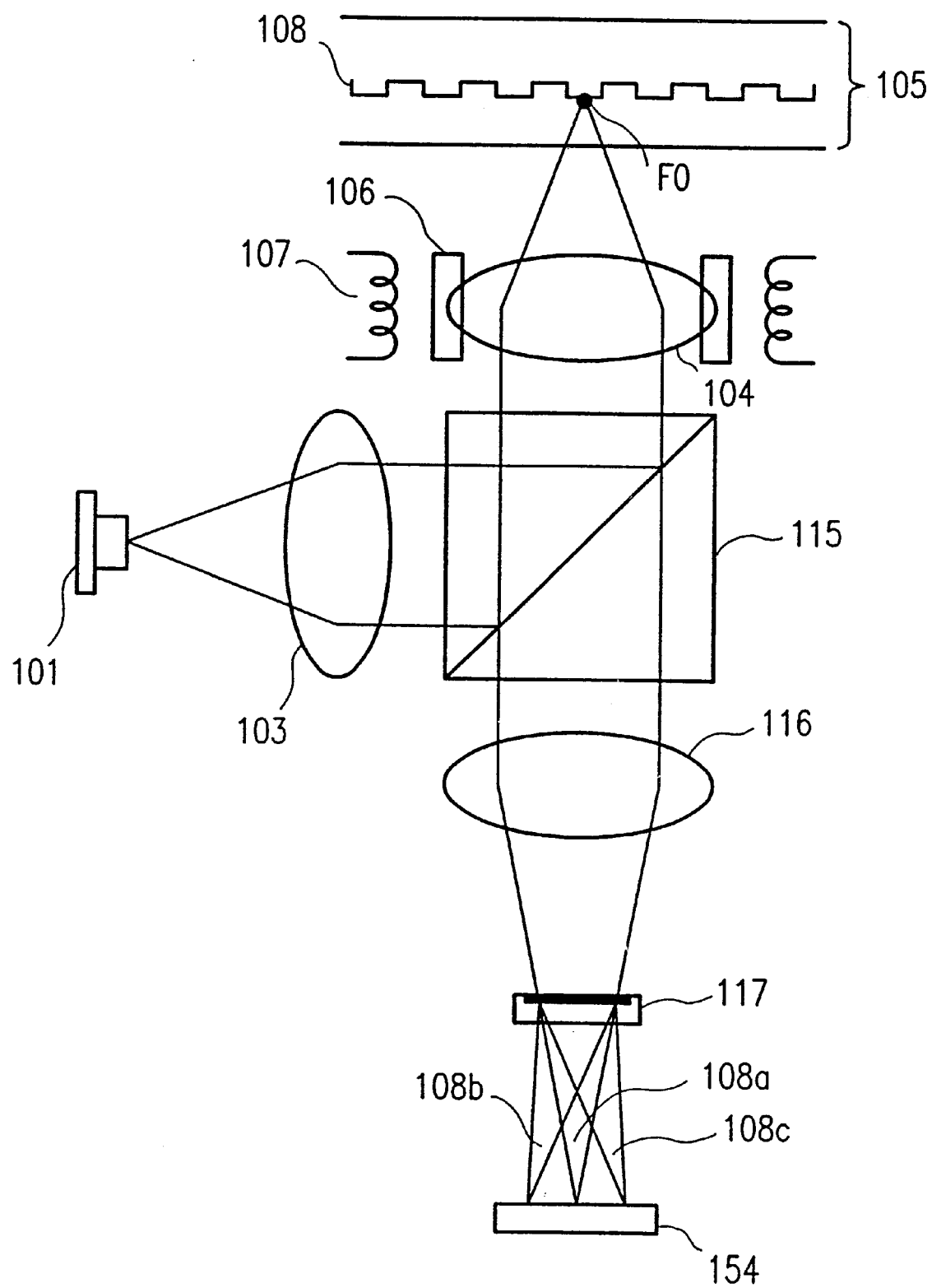
FIG. 14 is a schematic view of an optical system of an optical head device according to the present invention.

An optical head device according to the fifth example of the present invention will be described with reference to FIG. 14. FIG. 14 is a schematic view of an optical system of the optical head device. The optical head device shown in FIG. 14 operates in the following manner.

Light emitted by a semiconductor laser 101 (used as a light source) is collimated by a collimator lens 103 and then reflected by a beam splitter 115. Then, the light is converged by an objective lens 104, which is a part of the optical system, and then collected on an information layer 108 of an optical disk 105 employed as an information memory medium. The light is then reflected by the information layer 108 of the optical disk 105 as light 108a, which is transmitted back through the objective lens 104 to be collimated. The collimated light 108a is then transmitted through the beam splitter 115 and converged by a detection lens 116. The converged light 108a is diffracted by a holographic element 117 provided as a light division element. Minus first-order diffraction light 108b and plus first-order diffraction light 108c obtained by the diffraction performed by the holographic element 117 are received by a light detector 154.

Figure 15:
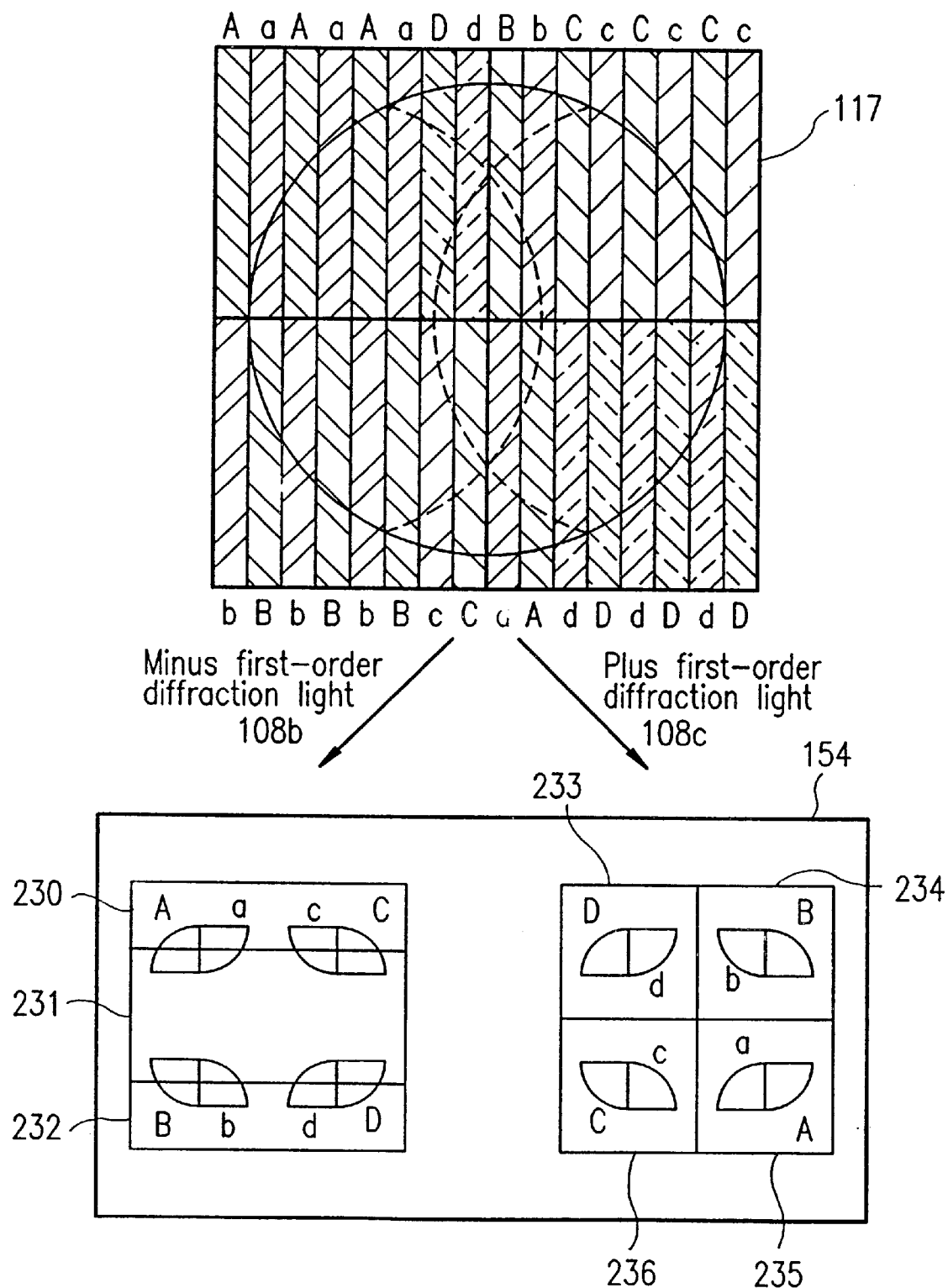
FIG. 15 shows a relationship among a pattern for dividing a holographic element, detection areas of the light detector, and the cross section of the diffraction light on the light detector in the optical head device shown in FIG. 14.

FIG. 15 shows a pattern for dividing the holographic element 117, a detection area of the light detector 154, and cross sections of the minus first-order diffraction light 108b and the plus first-order diffraction light 108c on the light detector 154.

The holographic element 117 is divided into a plurality of strip-shaped areas A, a, B, b, C, c, D and d. These letters indicating the strip-shaped areas also indicate the corresponding cross sections of the minus first-order diffraction light 108b and the plus first-order diffraction light 108c.The minus first-order diffraction light 108b obtained from the areas represented by capital letters A, B, C and D is collected farther from the minus first-order diffraction light 108b obtained from the areas represented by lower case letters a, b, c and d with respect to the detection lens 116.

The optical system and the holographic element 117 are designed so that, when the focal point F0 of the light from the objective lens 104 matches the information layer 108 of the optical disk 105, the cross section of the diffraction light obtained from the areas represented by the capital letters A, B, C and D has an equal size to that of the cross section of the diffraction light obtained from the areas represented by the lower case letters a, b, c and d.

Detection areas 230, 231 and 232 of the light detector 154 generates signals f1, f2 and f3 in accordance with the amount of light received.

A focus error signal FE is obtained by expression (15).

$$FE = f1 + f3 - f2 \tag{15}$$

When the information layer 108 is distanced from the objective lens 104 to be beyond the focal point F0 of the light from the objective lens 104, the cross sections A, B, C and D of the minus first-order diffraction light 108b are decreased, and the cross sections a, b, c and d of the minus first-order diffraction light 108b are increased. Accordingly, the amplitudes of signals f1 and f3 reduce and the amplitude of signal f2 increases. The amplitude of the focusing error signal FE reduces.

When the information layer 108 approaches the objective lens 104 to be between the objective lens 104 and the focal point F0 of the light from the objective lens 104, the cross sections A, B, C and D of the minus first-order diffraction light 108b are increased, and the cross sections a, b, c and d of the minus first-order diffraction light 108b are decreased. Accordingly, the amplitudes of signals f1 and f3 increase and the amplitude of signal f2 reduces. The amplitude of the focusing error signal FE increases.

In such a system, focusing control for maintaining the focal point F0 on the information layer 108 is realized.

Detection areas 233 through 236 of the light detector 154 generate signals t1 through t4 in accordance with the mount of light received. An operation circuit (not shown) generates a tracking error signal TE1.

The tracking error signal TE1 is obtained by expression (16).

$$TE1=(t1+t4)-(t2+t3) \tag{16}$$

This substantially provides the difference in light amount between the hatched areas and the blank areas in FIG. 15.

By the differential phase method, a tracking error signal TE2 is obtained by comparing the phase of (signal t1+signal t3) and the phase of (signal t2+signal t4).

An RF signal for reproducing the information is obtained as RFf by expression (17), as RFt by expression (18), or as the sum of RFf and RFt.

$$RFf=f1+f2+f3 \tag{17}$$

$$RFt=t1+t2+t3+t4 \tag{18}$$

A feature of the optical head device shown in FIG. 15 is that a plurality of areas sandwiching the division line (which runs through the center of the aperture and is parallel to the grooves of the optical disk) are exchanged with each other diagonally. In FIG. 15, the total of eight areas, namely, areas A and D, areas B and C, areas a and d, and areas b and c are exchanged with each other. Thus, the same effect as that of the second example can be obtained. In more detail, when a tilt of 0.4 degrees occurs in a radial direction, the degree of asymmetry of the upper and lower amplitudes of the tracking error signal is 14% when the off-track amount is corrected to zero. The degree of 14% is about ½ of the degree of asymmetry obtained in the conventional optical head device. The optical head device shown in FIG. 15 is specifically advantageous for restricting a radial tilt.

As described above, in the optical head device shown in FIG. 15, even if the optical disk 105 (FIG. 14) tilts, stable tracking control can be performed while maintaining the off-track amount small. Thus, the optical head device shown in FIG. 15 realizes recording and reproduction of information with a substantially low error ratio.

Figure 16:
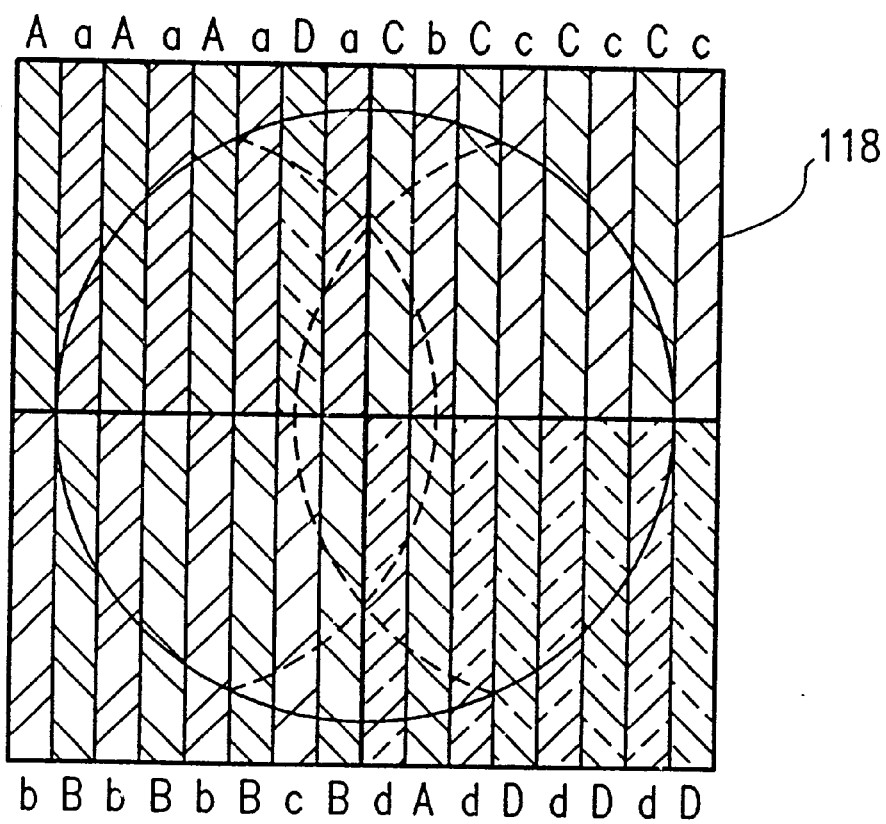
FIG. 16 shows another pattern for dividing a holographic element.

FIG. 16 shows another pattern for dividing a holographic element 118. In FIG. 16, only a part of the areas sandwiching the division line (which runs through the center of the aperture and is parallel to the grooves of the optical disk) are exchanged with each other diagonally. In this case, the same effect as that described in the second example with reference to FIG. 8 can be obtained. In the case where the angle of the radial tilt is 0.4 degrees, the off-track amount is 0.042 $\mu$m. When the off-track amount is corrected to zero, the degree of asymmetry of the upper and lower amplitudes of the tracking error signal is 18%. In the conventional optical head device, in the case where the angle of the radial tilt is 0.4 degrees, the degree of asymmetry is 31% when the off-track amount is corrected to zero. The optical head device shown in FIG. 16 using the holographic element 118 significantly reduces the degree of asymmetry of the tracking error signal compared to the conventional optical head device.

In the optical head device shown in FIG. 16 using the holographic element 118, in the case where the objective lens shifts by 150 $\mu$m, the degree of asymmetry of the upper and lower amplitudes of the tracking error signal is 8% when the off-track amount is corrected to zero. In the conventional optical head device, in the case where the objective lens shifts by 150 $\mu$m, the degree of asymmetry is 16% when the off-track amount is corrected to zero. The optical head device shown in FIG. 16 using the holographic element 118 significantly reduces the degree of asymmetry of the tracking error signal compared to conventional optical head devices.

As described above, in the optical head device shown in FIG. 16, even if the optical disk 105 (FIG. 14) tilts, stable tracking control can be performed while maintaining the off-track error small. Thus, the optical head device shown in FIG. 16 realizes recording and reproduction of information with a substantially low error ratio.

As can be understood from the above description, according to the optical head device in the fifth example, a significant effect can be achieved by using a holographic element as a light division element, without increasing the number of detection areas of the light detector compared to conventional devices. Such a structure does not require the number of head amplifiers for generating an RF signal to be increased, and thus the circuit can be simplified.

In the fifth example, the aperture is divided by a division line which is perpendicular to the tangent to the tracks. Areas a through d and areas A through D are arranged to sandwich the division line. The areas a through d form a spherical wave having a light collection point on the side closer to the collimator lens 103; and areas A through D form a spherical wave having a light collection point on the side farther from the collimator lens 103. In addition, these two types of areas are arranged alternately in an area outside the aperture which is not usually irradiated by light.

In the case where the division line perpendicular to the tracks is not provided and strip-like areas extending parallel to the tracks from one end to the other end of the aperture are provided, when the holographic element 117 is offset with respect to the center of the aperture of the objective lens 104, the balance between the amount of light incident on the areas a through d of the light detector 154 and the amount of light incident on the areas A through D is spoiled. When the light collection point F0 of the light from the objective lens 104 is off the information layer 108 of the optical disk 105 to cause defocus, stripes of bright areas and dark areas which are parallel to the tracks are formed in an area where the ±first-order diffraction light formed by the optical disk 105 and the zero-th order light overlap. Again, the balance between the amount of light incident on the areas a through d of the light detector 154 and the amount of light incident on the areas A through D is spoiled by the manner in which the stripes and the areas of the holographic element 117 overlap.

On calculation, in a conventional device where there is no division line perpendicular to the tangent to the tracks, under the conditions where the numerical aperture NA of the objective lens is 0.5, the wavelength $\lambda$ of light is 0.795 $\mu$m, the diameter of the objective lens is 4 mm, the width of each area of the holographic element is 0.2 mm, and the objective lens is off with respect to the center of the polarization anisotropic holographic element by 100 µm, the focus gain changes by 3.4 dB by the defocus of ±2 µm.

In the case of the arrangement according to the fifth example, the focus gain changes only by 1.2 dB under the same conditions on calculation. Such a change is about ⅓ of the conventional device, indicating a significant reduction. Thus, the focus control is stabilized against disturbance. Accordingly, the error ratio in information reproduction is reduced.

In the case where the above-described two types of areas are provided outside the aperture without any division line perpendicular to the tracks, the focus gain changes only by 1.8 dB under the same conditions on calculation. Such a change is about ½ of the conventional device. Accordingly, the focus control is stabilized, and thus the error ratio in information reproduction is reduced.

The pattern for dividing the holographic element can be set more freely than the pattern for dividing the light detector. Accordingly, a suitable pattern for a particular purpose can be easily realized.

In the fifth example, only a holographic element is used. Alternatively, a polarizing anisotropic holographic element can be used in combination with a ¼-wave plate. In this case, the light utilization factor can be improved without spoiling the above-described effect of the present invention.

In the fifth example, a light division element for performing both the focusing control and the tracking control is provided. Since the focusing control and the tracking control are independent from each other, a light division element for performing either one of them may be provided. In such a case, the effect in accordance with such a structure can be obtained.

Figure 17:
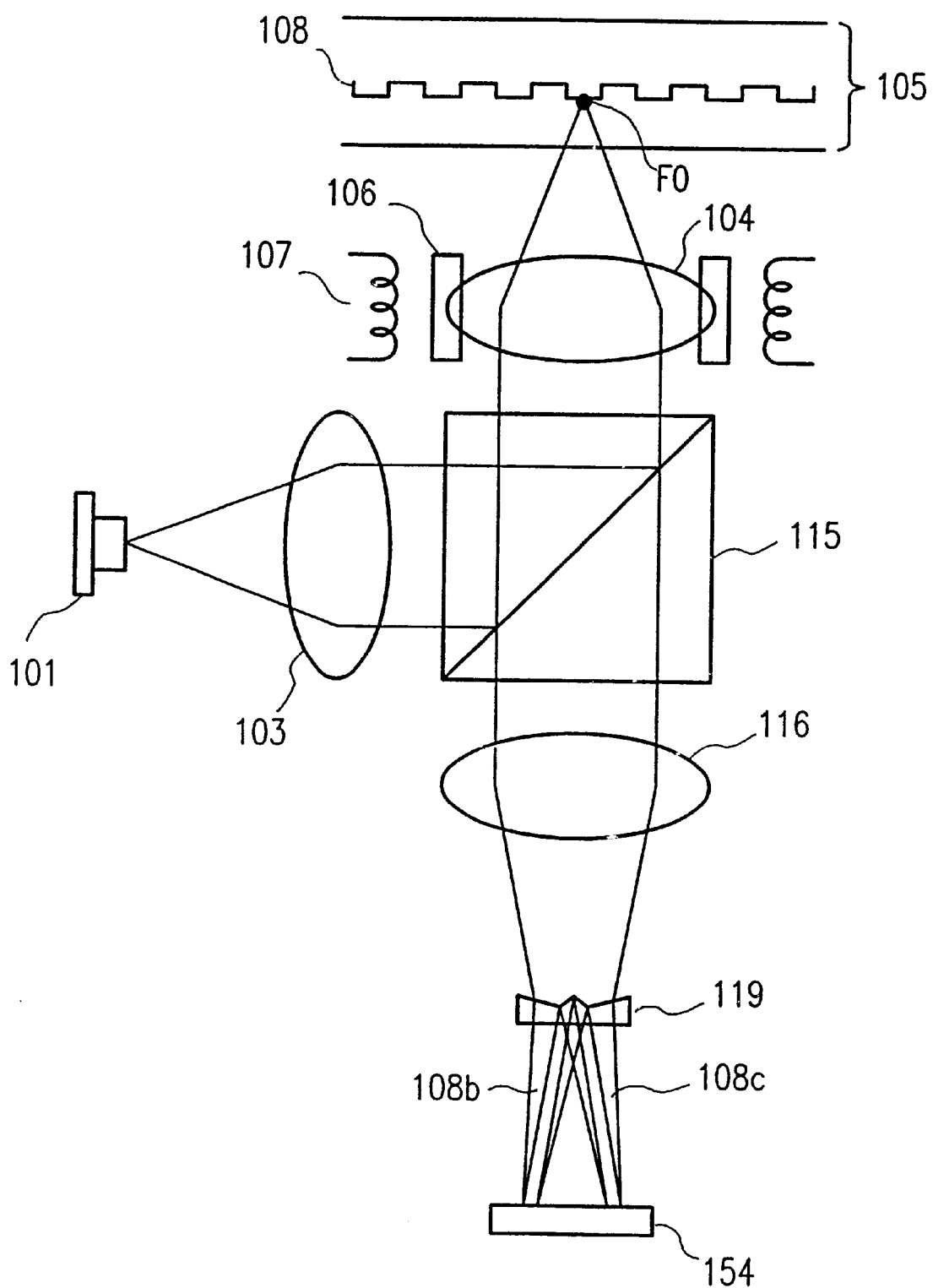
FIG. 17 is a schematic view of an optical system of an optical head device according to the present invention.

In lieu of a holographic element, a stepped prism may be used as the light division element. FIG. 17 is a schematic view of an optical system including a stepped prism 119 in place of the holographic element 117 shown in FIG. 14. The light divided by the stepped prism 119 is received by the light detector 154, In this case also, the same effect as in the structure using a holographic element can be obtained.

EXAMPLE 6

In a sixth example according to the present invention, a structure and method for reproducing information which is recorded at a position off the grooves of the optical disk used as an information memory medium will be described.

An optical system of the optical head device used in the sixth example has substantially the same structure as and operates in the same manner as the optical system shown in FIG. 1, and thus will not described in detail.

Figure 18:
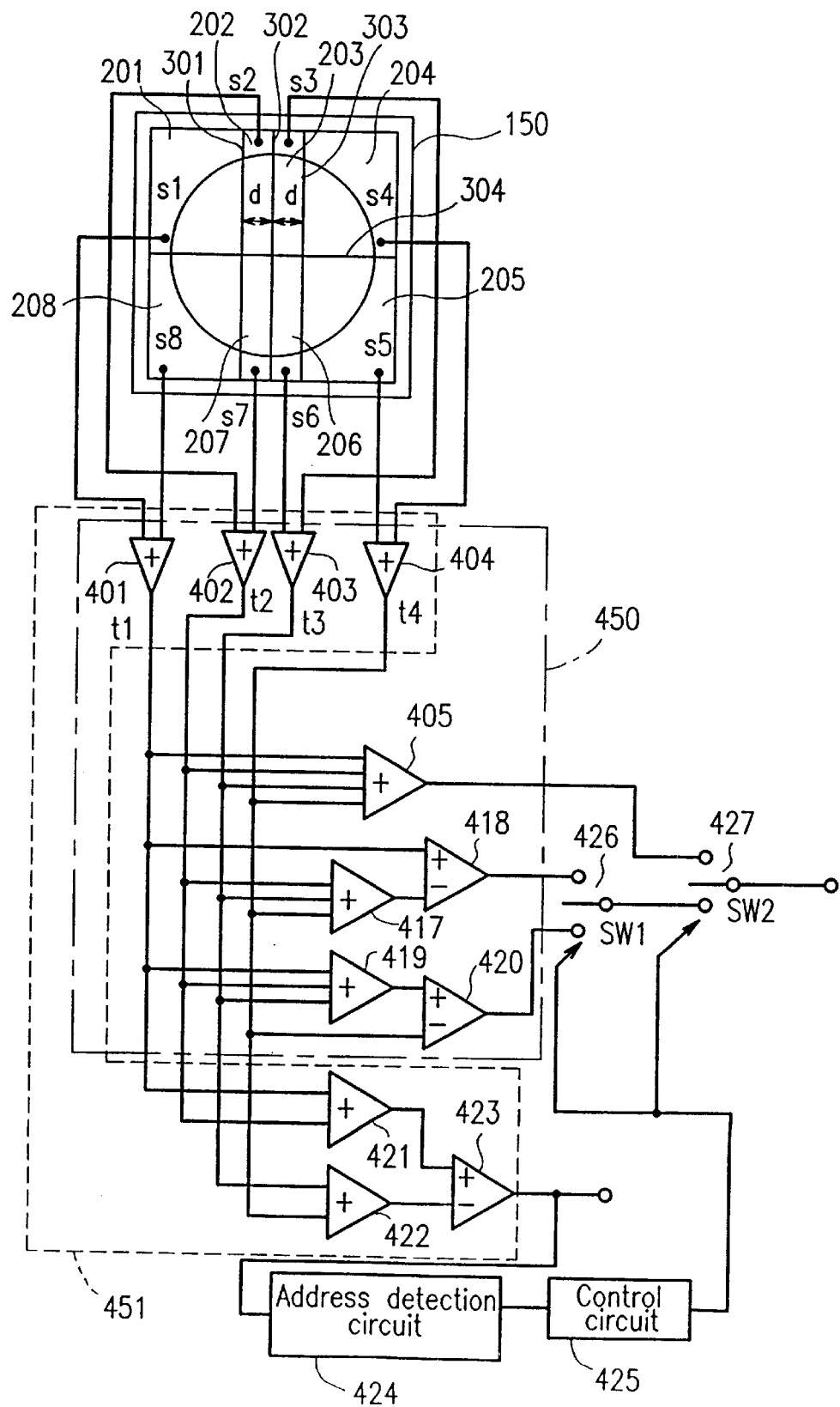
FIG. 18 shows detection areas of a light detector of the optical head device shown in FIG. 17, and a configuration of a circuit acting as an information reproduction signal generator and a tracking error signal generator.

FIG. 18 shows detection areas of the light detector 150, an information reproduction signal generator 450 and a tracking error signal generator 451 of the optical head device.

The light detector 150 is divided into eight detection areas 201 through 208 by division lines 301 through 304. The division lines 301 through 304 are disposed in the same manner as in FIG. 2. The detection areas 201 through 208 generate signals s1 through s8 in accordance with the amount of light received.

As shown in FIG. 18, the information reproduction signal generator 450 includes adders 401 through 404 and 405, 417 and 419, and differential operation circuits 418 and 420. The tracking error signal generator 451 includes the adders 401 through 404, 421 and 422, and a differential operation circuit 423. The optical head device shown in FIG. 18 further includes an address detection circuit 424 and a control circuit 425.

Figure 19A:
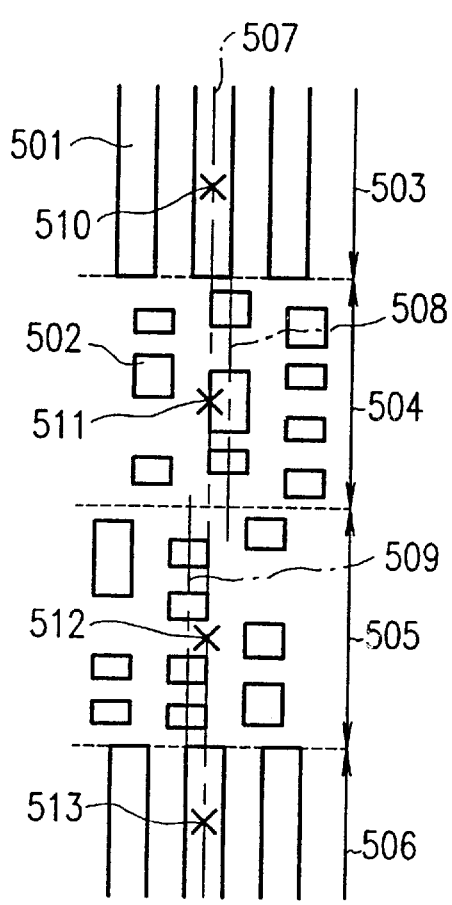
FIG. 19A shows a pattern of a groove, tracks and pits of an information memory medium.
Figure 19B:
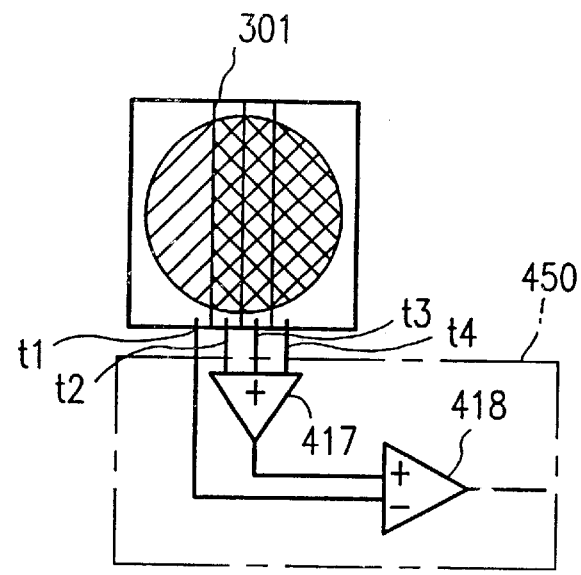
FIG. 19B shows detection areas of a light detector and a configuration of an information reproduction signal generator for producing information stored off track according to the present invention.
Figure 19C:
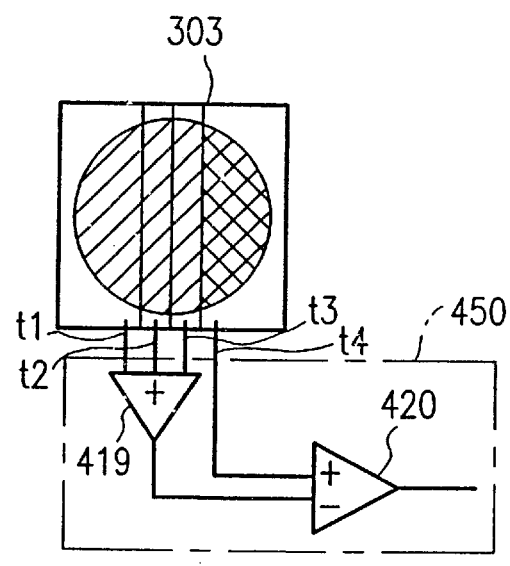
FIG. 19C shows different detection areas of a light detector and a configuration of an information reproduction signal generator for producing information stored off track according to the present invention.

With reference to FIGS. 19A, 19B and 19C, the operation for reading a series of pits recorded off the grooves in the optical disk will be described.

FIG. 19A shows a part of the optical disk having a groove 501 and a series of pits 502 on the information layer 108 (FIG. 1).

A track 507 runs along the center of the grooves 501 in zones 503 and 506. In a first address zone 504, a center line 508 of the series of pits is off the track 507 in one direction by a prescribed distance. In a second address zone 505, a center line 509 of the series of pits is off the track 507 in the opposite direction by a prescribed distance.

When the focal point F0 of the light from the objective lens 104 (FIG. 1) is in the zone 503 or 506, the focal point F0 is on the track 507, for example, on a point 510 in the case where tracking control is performed. While the optical disk 105 (FIG. 1) rotates and thus moves with respect to the optical head device, the focal point F0 moves from the point 510 to a point 511, a point 512, and a point 513 on an extension of the track 507. While the focal point F0 is in the first address zone 504 and the second address zone 505, the tracking error signal is on hold.

A focusing error signal FE is obtained as in the first example based on expression (6).

$$FE=(s1+s2+s5+s6)-(s3+s4+s7+s8) \qquad (6)$$

The tracking error signal THE is generated by the tracking error signal generator 451 in the following manner.

The adder 421 receives signal t1 from the adder 401 and signal t2 from the adder 402, and outputs the sum of signals t1 and t2. The adder 422 receives signal t3 from the adder 403 and signal t4 from the adder 404, and outputs the sum of signals t3 and t4. The differential operation circuit 423 receives the signals from the adders 421 and 422, and outputs the difference between the two signals. The output from the differential operation circuit 423, (i.e., the tracking signal THE) is obtained based on expression (19).

$$THE=(t1+t2)-(t3+t4) \qquad (19)$$

The tracking control is performed by the tracking error signal THE.

The information reproduction signal generator 450 generates an information reproduction signal RF in the following manner.

The adder 401 receives signals s1 and s8, and outputs signal t1, which is the sum of signals s1 and s8. The adder 402 receives signals s2 and s7, and outputs signal t2, which is the sum of signals s2 and s7. The adder 403 receives signals s3 and s6, and outputs signal t3, which is the sum of signals s3 and s6. The adder 404 receives signals s4 and s5, and outputs signal t4, which is the sum of signals s4 and s5. The adder 405 receives signals t1 through t4 from the adders 401 through 404, and outputs the sum of the four signals. The output from the adder 405, which is an information reproduction signal RF, is obtained by expression (20).

$$RF=t1+t2+t3+t4 \qquad (20)$$

The adder 417 receives signals t2, t3 and t4 from the adders 402, 403 and 404, and outputs the sum of the three signals. The differential operation circuit 418 receives the signals from the adders 401 and 417, and outputs the difference between the two signals. The output from the differential operation circuit 418, (i.e., signal RFa1) is obtained by expression (21).

$$RFa1=t1-(t2+t3+t4) \qquad (21)$$

The adder 419 receives signals t1, t2 and t3 from the adders 401, 402 and 403, and outputs the sum of the three signals. The differential operation circuit 420 receives the signals from the adders 419 and 404, and outputs the difference between the two signals. The output from the differential operation circuit 420, (i.e., signal RFa2) is obtained by expression (22).

$$Rfa2=(t1+t2+t3)-t4 \qquad (22)$$

The address detection circuit 424 receives the tracking error signal THE from the differential operation circuit 423. Then, the address detection circuit 424 determines whether the focal point F0 of the light from the objective lens is in the zone 503 or 506 having the groove 501, in the first address zone 504 or the second address zone 505, and outputs an identification signal indicating the determination result.

The control circuit 425 receives the identification signal from the address detection circuit 424, and controls switches 426 and 427 based on the identification signal.

The switch 426 receives the signals from the differential operation circuits 418 and 420, and outputs one of the two signals.

The switch 427 receives the signals from the adder 405 and the switch 426, and outputs one of the two signals. The signal output from the switch 427 is used for reproducing the information or address stored in the optical disk 105 (FIG. 1).

The control circuit 425 controls the switches 426 and 427 so that, when the focal point F0 of the light from the objective lens is in the zone 503 or 506 having the groove 501, the switch 427 outputs the signal RF which is input from the adder 405. The control circuit 425 also controls the switches 426 and 427 so that, when the focal point F0 is in the first address zone 504, the switch 427 outputs the signal RFa1 which is input from the differential operation circuit 418; and so that, when the focal point F0 is in the second address zone 505, the switch 427 outputs the signal RFa2 which is input from the differential operation circuit 420.

Through the above-described control of the control circuit 425, information stored in the optical disk is reproduced in the following manner.

When the focal point F0 is at the point 511 in the first address zone 504, information stored in the series of pits corresponding to the track 507 is reproduced based on signal RFa1, which indicates the difference between the signals obtained from the two areas (lined area and hatched area) sandwiching the division line 301.

When the focal point F0 is at the point 512 in the second address zone 505, information stored in the series of pits corresponding to the track 507 is reproduced based on signal RFa2, which indicates the difference between the signals obtained from the two areas (lined area and hatched area) sandwiching the division line 303.

Hereinafter, comparison between the optical head device shown in FIG. 18 and the conventional optical head device regarding the jitter will be described. In the following comparison, the numerical aperture NA of the objective lens is 0.6, the wavelength λ of the light is 0.660 μm, and the space Gp between two adjacent guiding grooves is 1.48 μm. The center line 508 of the series of pits 502 in the first address zone 504 and the center line 509 of the series of pits 502 in the second address zone 505 are each off the center line of the track 507 by 0.37 μm.

In the conventional optical head device, in which the information is reproduced based on a signal indicating the difference among the signals obtained from each of the areas in the light detector defined by a central division line of the aperture, the jitter obtained by calculation is 6.4%.

In the optical head device shown in FIG. 18, the information can be reproduced in the following manner. The division line 302 divides the aperture equally into two. The aperture has a radius of 1. The distance between the division lines 301 and 302 is represented by d, and the distance between the division lines 303 and 302 is also represented by d, where d=0.23. The aperture is divided into two detection areas by the division line 301 or 303, and the information is reproduced based on a signal indicating the difference between the signals obtained from the two detection areas, namely, signals RFa1 or RFa2. In such a system, the jitter obtained by calculation is 1.8%. Thus, the optical head device shown in FIG. 18 can improve the jitter by 4% or more compared to the conventional optical head device.

In the case where d is 0.1 or more and 0.3 or less, the jitter is 3% or less in the optical head device shown in FIG. 18. In this case, such a level of jitter is half or less of the jitter obtained in the conventional optical head device.

As described above, in the optical head device shown in FIG. 18, information stored in the form of a series of pits which are positioned off the track can be reproduced with a sufficiently low level of jitter. Accordingly, margin against disturbance and the like is increased, and thus information such as addresses can be recorded to and reproduced from the optical disk in the form of pits with satisfactory stability.

Figure 20:
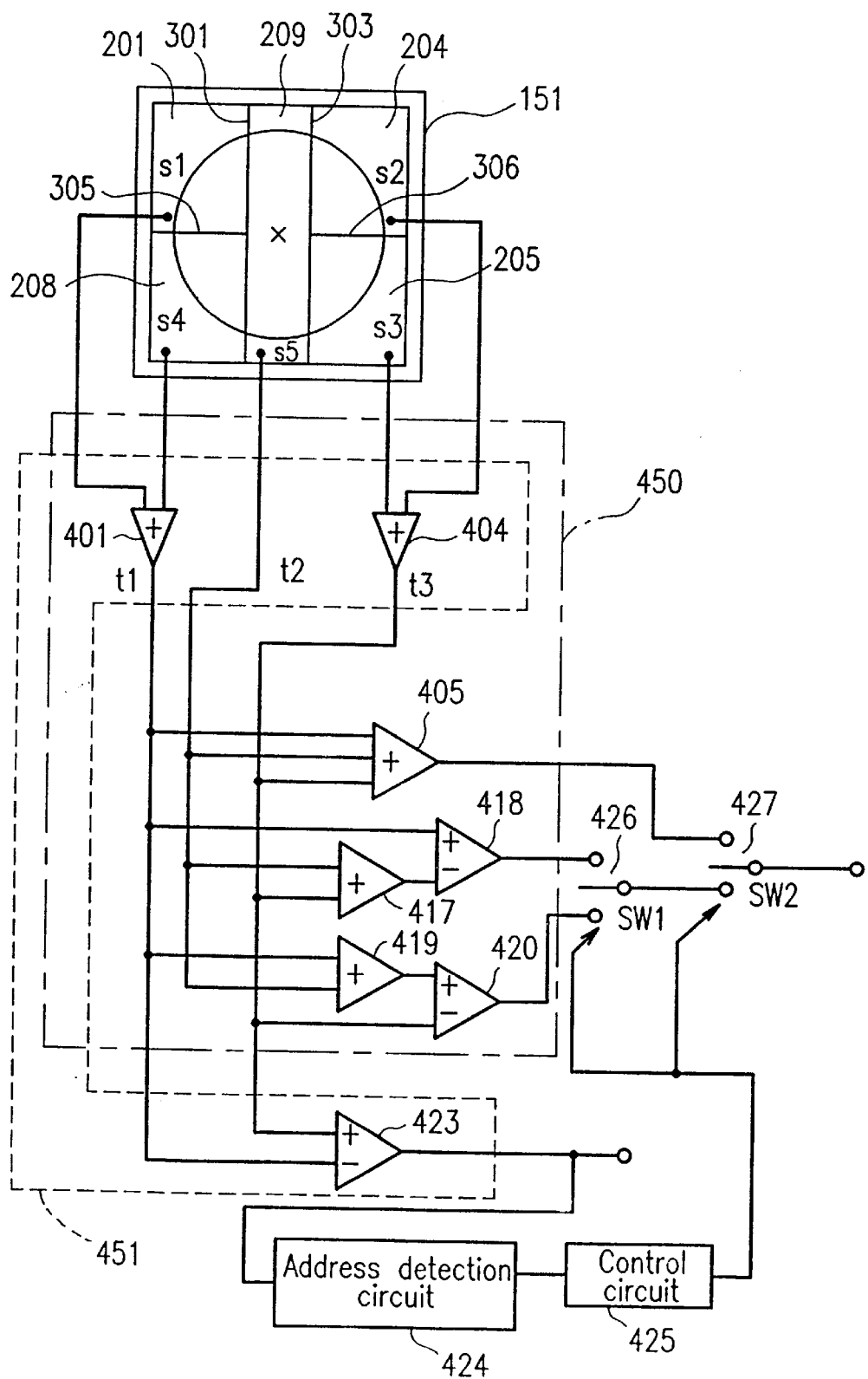
FIG. 20 shows detection areas of a light detector usable in the optical head device shown in FIG. 17, and a configuration of a circuit acting as an information reproduction signal generator and a tracking error signal generator.

With reference to FIG. 20, an optical head device having a different light detector 151 from the detector shown in FIG. 18 will be described.

FIG. 20 shows detection areas 201, 204, 205, 208 and 209 of the light detector 151, an information reproduction signal generator 450 and a tracking error signal generator 451 of the optical head device.

As shown in FIG. 20, the information reproduction signal generator 450 includes adders 401, 404, 405, 417 and 419 and differential operation circuits 418 and 420. The tracking error signal generator 451 includes the adders 401 and 404, and a differential operation circuit 423. The optical head device shown in FIG. 20 further includes an address detection circuit 424 and a control circuit 425.

The adder 405 generates a signal corresponding to the total amount of light received by the detection areas 201, 204, 205, 208 and 209 of the light detector 151. The differential operation circuit 418 generates a differential signal corresponding to {signal t1−(signal t2+signal t3)}. The differential operation circuit 420 generates a differential signal corresponding to {(signal t1+signal t2)−signal t3)}. Signal t1 is generated by the adder 401, signal t2 is the same as signal s5 which is output from the detection area 209, and signal t3 is generated by the adder 404.

The tracking error signal is a differential signal indicating the difference between signals t1 and t3. Signal t1 is the sum of the signals output from the detection areas 201 and 208 which are disposed left to the division line 301. Signal t3 is the sum of the signals output from the detection areas 204 and 205 which are disposed right to the division line 303.

Due to the above-described structure, the optical head device shown in FIG. 20 can perform recording and reproduction of information such as addresses to and from the optical disk with substantial stability.

Figure 21A:
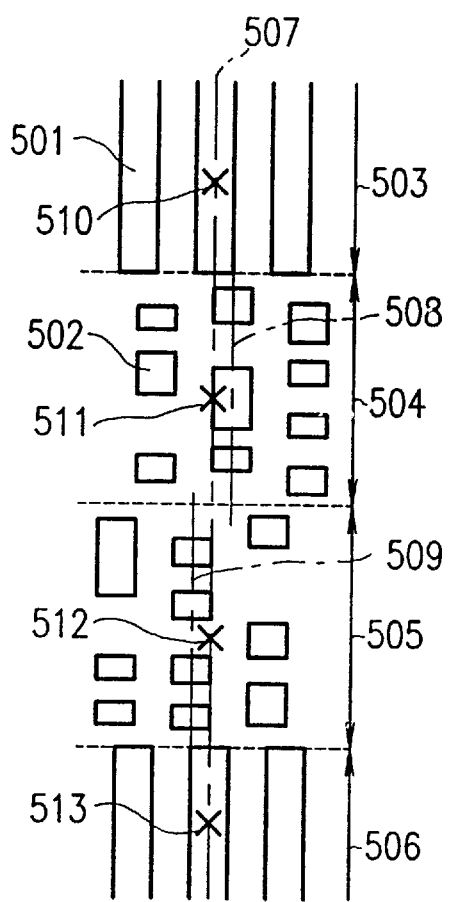
FIG. 21A shows a pattern of a groove, tracks and pits of an information memory medium.
Figure 21B:
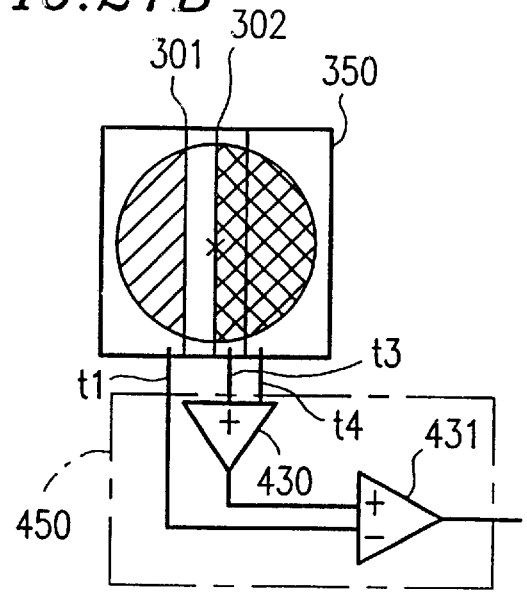
FIG. 21B shows detection areas of a light detector and a configuration of an information reproduction signal generator for producing information stored off track according to the present invention.
Figure 21C:
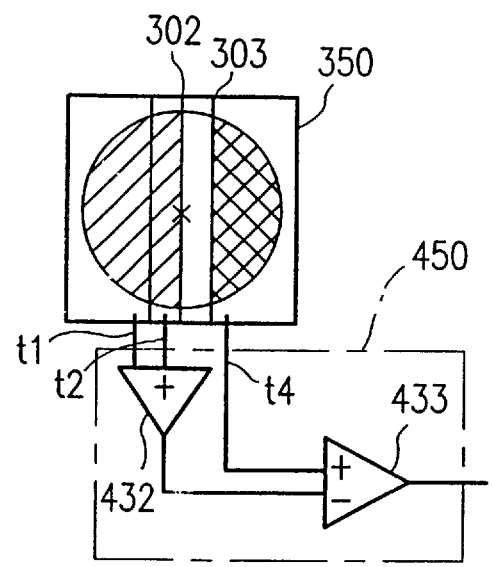
FIG. 21C shows different detection areas of a light detector and a configuration of an information reproduction signal generator for producing information stored off track according to the present invention.

With reference to FIGS. 21A, 21B and 21C, an optical head device having a different information reproduction signal generator from the generator shown in FIG. 18 will be described.

FIG. 21A shows a part of the optical disk having a groove 501 ad a series of pits 502 on the information layer 108 (FIG. 1).

FIGS. 21B and 21C schematically show a light detector 350 and an information reproduction signal generator 450.

FIG. 21B shows a circuit configuration for reproducing information stored in a first address zone 504 of the optical disk in FIG. 21A. FIG. 21C shows a circuit configuration for reproducing information stored in a second address zone 505 of the optical disk in FIG. 21A. The information reproduction signal generator 450 includes an adder 430 and a differential operation circuit 431 shown in FIG. 21B and also an adder 432 and a differential operation circuit 433 shown in FIG. 21C.

The differential operation circuit 431 generates a reproduction signal RFa3 based on expression (23), and the differential operation circuit 433 generates a reproduction signal RFa4 based on expression (24).

$$RFa3=t1-(t3+t4) \tag{23}$$

$$RFa4=(t1+t2)-t4 \tag{24}$$

The reproduction signal RFa3 is used for reproducing the information stored in the first address zone 504, and the reproduction signal RFa4 is used for reproducing the information stored in the second address zone 505. The information reproduction signal generator 450 may include a selector for selecting either the reproduction signal RFa3 or RFa4.

Hereinafter, comparison between the optical head device shown in FIGS. 21B and 21C and the conventional optical head device regarding the jitter will be described. In the following comparison, the numerical aperture NA of the objective lens is 0.6, the wavelength λ of the light is 0.660 µm, and the space Gp between two adjacent guiding grooves is 1.48 µm. The center line 508 of the series of pits 502 in the first address zone 504 and the center line 509 of the series of pits 502 in the second address zone 505 are each off the center line of the track 507 by 0.37 µm.

In the conventional optical head device, in which the information is reproduced based on a signal indicating the difference among the signals obtained from each of the areas in the light detector defined by a central division line of the aperture, the jitter obtained by calculation is 6.4%.

In the optical head device shown in FIGS. 21B and 21C, the information can be reproduced in the following manner. The division line 302 divides the aperture equally into two. The aperture has a radius of 1. The distance between the division lines 301 and 302 is represented by d, and the distance between the division lines 303 and 302 is also represented by d, where d=0.23. The aperture is divided into two detection areas by the division line 301 or 303, and the information is reproduced based on a signal indicating the difference between the signals obtained from the two detection areas, namely, signals RFa3 or RFa4. In such a system, the jitter obtained by calculation is 1.4%. Thus, the optical head device shown in FIGS. 21B and 21C can improve the jitter by 5% or more compared to the conventional optical head device.

As described above, in the optical head device shown in FIGS. 21B and 21C, information stored in the form of a series of pits which are positioned off the track can be reproduced with a sufficiently low level of jitter. Accordingly, margin against disturbance and the like is increased, and thus information such as addresses can be recorded to and reproduced from the optical disk in the form of pits with satisfactory stability.

Figure 22A:
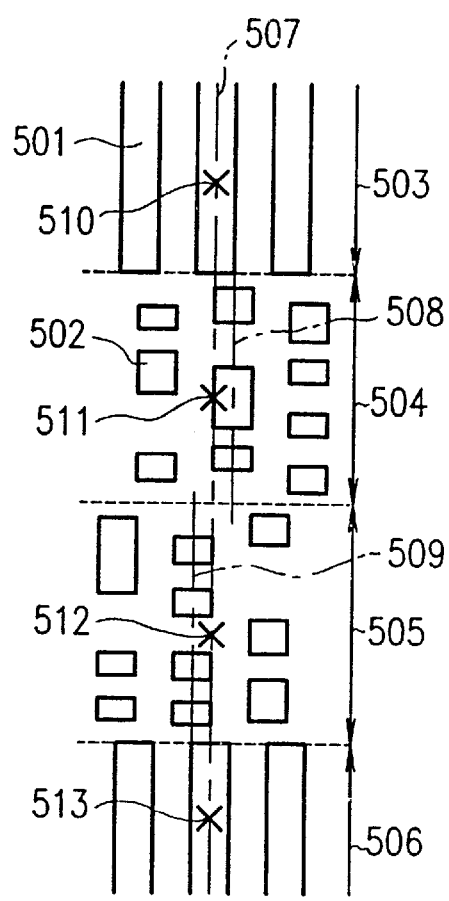
FIG. 22A shows a pattern of a groove, tracks and pits of an information memory medium.
Figure 22B:
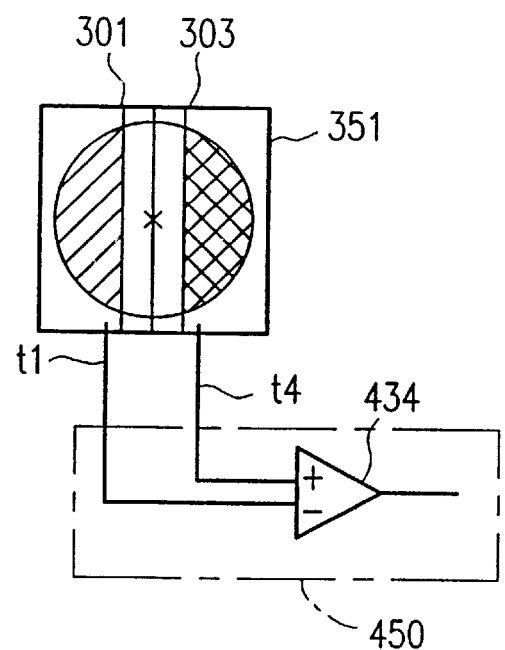
FIG. 22B shows detection areas of a light detector and a configuration of an information reproduction signal generator for producing information stored off track according to the present invention.

With reference to FIGS. 22A and 22B, other another optical head device having a different information reproduction signal generator from the generators shown in FIGS. 18 and 20 will be described.

FIG. 22A shows a part of the optical disk having a groove 501 and a series of pits 502 on the information layer 108 (FIG. 1).

FIG. 22B schematically shows a light detector 351 and an information reproduction signal generator 450.

The information reproduction signal generator 450 includes a differential operation circuit 434. The differential operation circuit 434 generates a reproduction signal RFa0 based on expression (25).

$$RFa0=t1-t4 \tag{25}$$

The reproduction signal RFa0 is used for reproducing the information stored in the first address zone 504 and the second address zone 505.

Hereinafter, comparison between the optical head device shown in FIG. 22B and the conventional optical head device regarding the jitter will be described. In the following comparison, the numerical aperture NA of the objective lens is 0.6, the wavelength λ of the light is 0.660 µm, and the space Gp between two adjacent guiding grooves is 1.48 µm. The center line 508 of the series of pits 502 in the first address zone 504 and the center line 509 of the series of pits 502 in the second address zone 505 are each off the center line of the track 507 by 0.37 µm.

In the conventional optical head device, the jitter obtained by calculation is 6.4% as described above.

In the optical head device shown in FIG. 22B, the jitter obtained by calculation is 2.6%. Thus, the optical head device shown in FIG. 22B can improve the jitter by nearly 4% compared to the conventional optical head device.

As described above, in the optical head device shown in FIG. 22B, information stored in the form of a series of pits which are positioned off the track can be reproduced with a sufficiently low level of jitter. Accordingly, margin against disturbance and the like is increased, and thus information such as addresses can be recorded to and reproduced from the optical disk in the form of pits with satisfactory stability.

In the optical head device shown in FIG. 22B, it is not necessary to select a signal to be output from the information reproduction signal generator 450 in accordance with whether the information to be reproduced is stored in the first address zone 504 or the second address zone 505. Accordingly, the optical head device shown in FIG. 22B can be realized with a relatively simple circuit configuration.

Figure 23A:
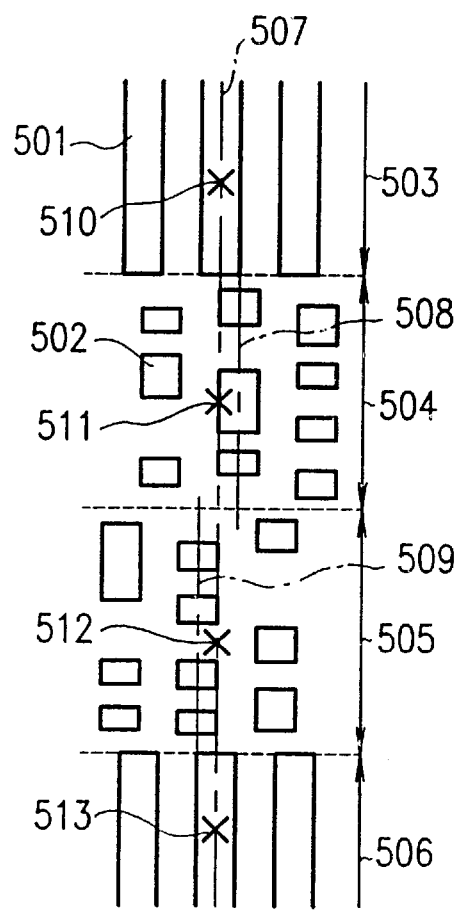
FIG. 23A shows a pattern of a groove, racks and pits of an information memory medium.
Figure 23B:
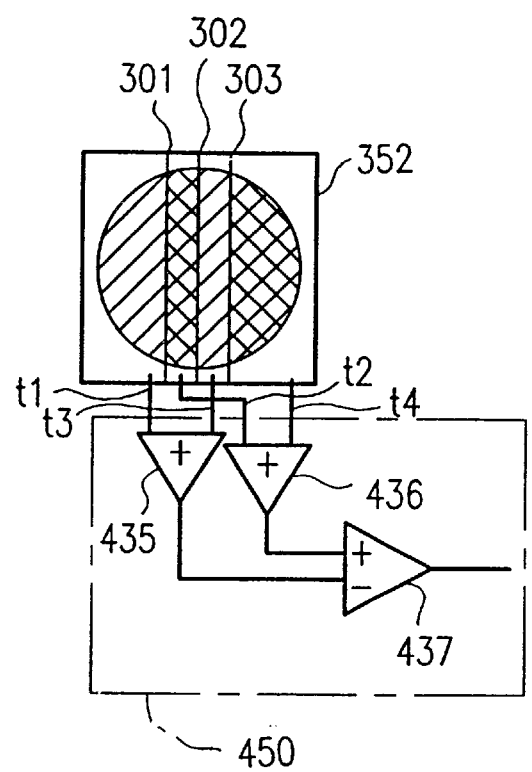
FIG. 23B shows detection areas of a light detector and a configuration of an information reproduction signal generator for producing information stored off track according to the present invention.

With reference to FIGS. 23A and 23B, another optical head device having a different information reproduction signal generator from the generators shown in FIGS. 18, 20 and 22 will be described.

FIG. 23A shows a part of the optical disk having a groove 501 and a series of pits 502 on the information layer 108 (FIG. 1).

FIG. 23B schematically shows a light detector 352 and an information reproduction signal generator 450.

As shown in FIG. 23B, the information reproduction signal generator 450 includes a differential operation circuit 437, and adders 435 and 436. The differential operation circuit 437 generates a reproduction signal RFa00 based on expression (26).

$$RFa00=(t1+t3)-(t2+t4) \tag{26}$$

The reproduction signal RFa00 is used for reproducing the information stored in the first address zone 504 and the second address zone 505.

Hereinafter, comparison between the optical head device shown in FIG. 23B and the conventional optical head device regarding the jitter will be described. The conditions are the same as described above with reference to FIG. 22B.

In the conventional optical head device, the jitter obtained by calculation is 6.4% as described above.

In the optical head device shown in FIG. 23B, the jitter obtained by calculation is 1.2%. Thus, the optical head device shown in FIG. 23B can improve the jitter by nearly 5% compared to the conventional optical head device.

As described above, in the optical head device shown in FIG. 23B, information stored in the form of a series of pits which are positioned off the track can be reproduced with a sufficiently low level of jitter. Accordingly, margin against disturbance and the like is increased, and thus information such as addresses can be recorded to and reproduced from the optical disk in the form of pits with satisfactory stability.

In the optical head device shown in FIG. 23B, it is not necessary to select a signal to be output from the information reproduction signal generator 450 in accordance with whether the information to be reproduced is stored in the first address zone 504 or the second address zone 505. Accordingly, the optical head device shown in FIG. 23B can be realized with a relatively simple circuit configuration.

EXAMPLE 7

In a seventh example according to the present invention, information which is recorded at a position off the grooves of the optical disk used as an information memory medium is reproduced.

An optical system of the optical head device used in the seventh example has substantially the same structure as the optical system shown in FIG. 14 except for including a holographic element 120 in lieu of the holographic element 117 and including a light detector 155 in lieu of the light detector 154.

Figure 24:
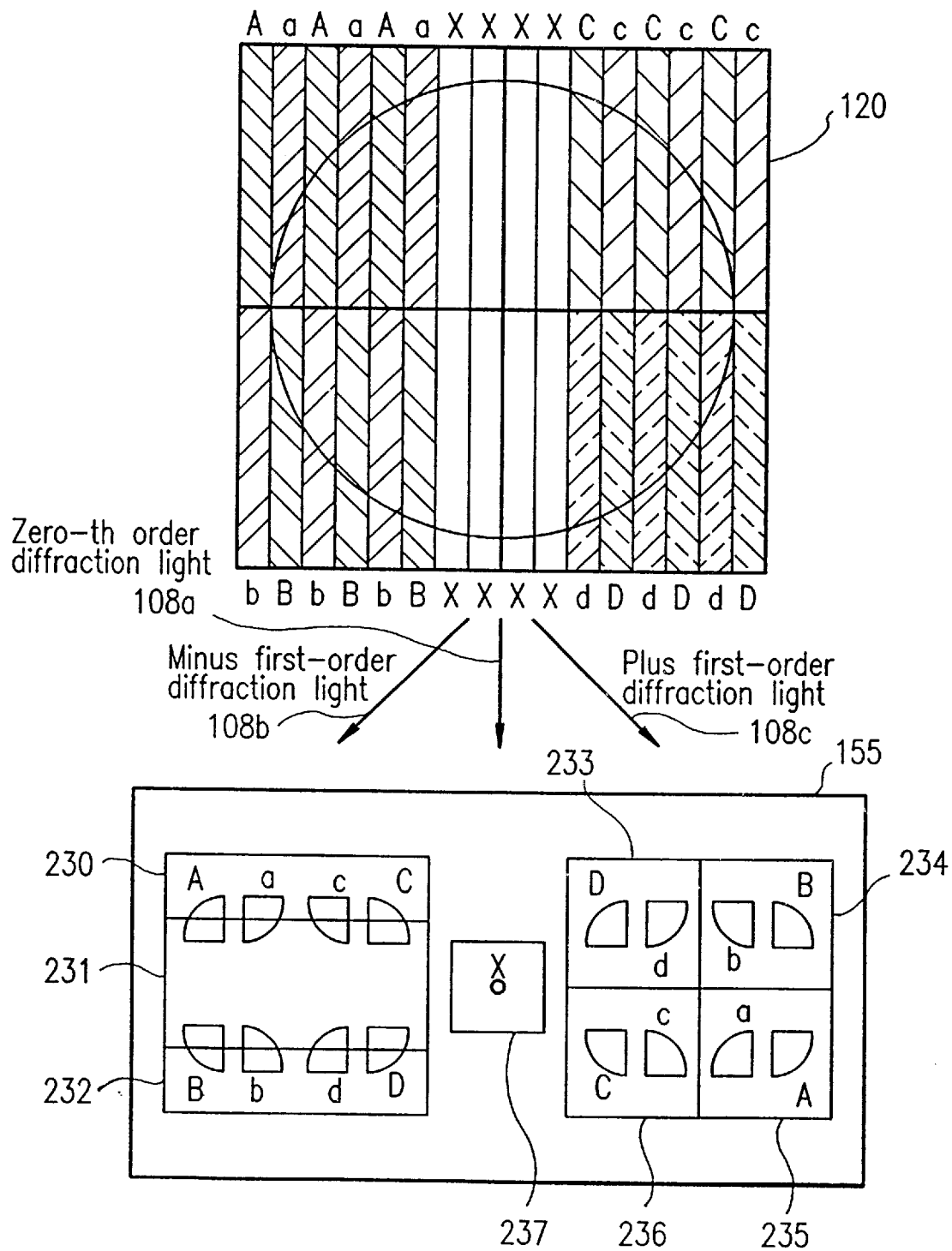
FIG. 24 shows a relationship among a pattern for dividing a holographic element, detection areas of the light detector, and the cross section of the diffraction light on the light detector in an optical head device according to the present invention.

FIG. 24 shows a pattern for dividing the holographic element 120, detection areas of the light detector 155, and cross sections of the zero—the order light 108a, the minus first-order diffraction light 108b and the plus first-order diffraction light 108c on the light detector 155.

The holographic element 120 is divided into a plurality of strip-shaped areas A, a, B, b, C, c, D, d, and X. These letters indicating the strip-shaped areas also indicate the corresponding cross sections of the zero—the order light 108a, the minus first-order diffraction light 108b and the plus first-order diffraction light 108c. The minus first-order diffraction light 108b obtained from the areas represented by capital letters A, B, C and D is collected farther from the minus first-order diffraction light 108b obtained from the areas represented by lower case letters a, b, c and d with respect to the detection lens 116. The light corresponding to the areas X is not diffracted and thus is entirely transmitted through the areas X as the zero—the order light 108a.

The minus first-order diffraction light 108b is received by detection areas 230 through 232, and the plus first-order diffraction light 108c is received by detection areas 233 through 236. The zero—the order light 108a is received by a detection area 237. A focusing error signal is generated by a signal obtained in accordance with the amount of light received by the detection areas 230 through 232.

The detection areas 233 through 236, respectively, generate signals t1 through t4 in accordance with the amount of light received. The detection area 237 generates signal x0 in accordance with the amount of light received. A tracking error signal THE for the groove of the optical disk 105 (FIG. 14) is obtained based on expression (27).

$$THE=(t1+t4)-(t2+t3) \quad (27)$$

The ratio of the diffraction efficiency of the plus first-order diffraction light 108c (obtained by the detection areas other than the detection areas X of the holographic element 120) with respect to the zero—the order light transmitted through the detection areas X is indicated by β. An information reproduction signal RF is obtained by expression (28).

$$RF=t1+t2+t3+t4+\beta \cdot x0 \quad (28)$$

For reproducing information stored in the optical disk having the structure shown in FIG. 19A, when the focal point of the light from the objective lens is in the track 507 of the first address zone 504, the information stored in the optical disk in the form of the pits 502 is reproduced by obtaining signal RFa1 by the operation represented by expression (29).

$$RFa1=(s1+s4)-(s2+s3+\beta \cdot x0) \quad (29)$$

When the focal point of the light from the objective lens is in the track 507 of the second address zone 505, the information stored in the optical disk in the form of the pits 502 is reproduced by obtaining signal RFa2 by the operation represented by expression (30).

$$RFa2=(s1+s4+\beta \cdot x0)-(s2+s3) \quad (30)$$

Through such a system, the optical head device shown in FIG. 24 provides the same effect as the effect described in the sixth example. As described above, in the optical head device shown in the seventh example, information stored in the form of a series of pits which are positioned off the track can be reproduced with a sufficiently low level of jitter. Accordingly, information such as addresses can be recorded to and reproduced from the optical disk in the form of pits with satisfactory stability.

EXAMPLE 8

In an eighth example according to the present invention, characteristics of a tracking error signal THE are improved using a holographic element. The focusing error signal is generated by the spot size method, and the tracking error signal is generated by the push-pull method.

Figure 25:
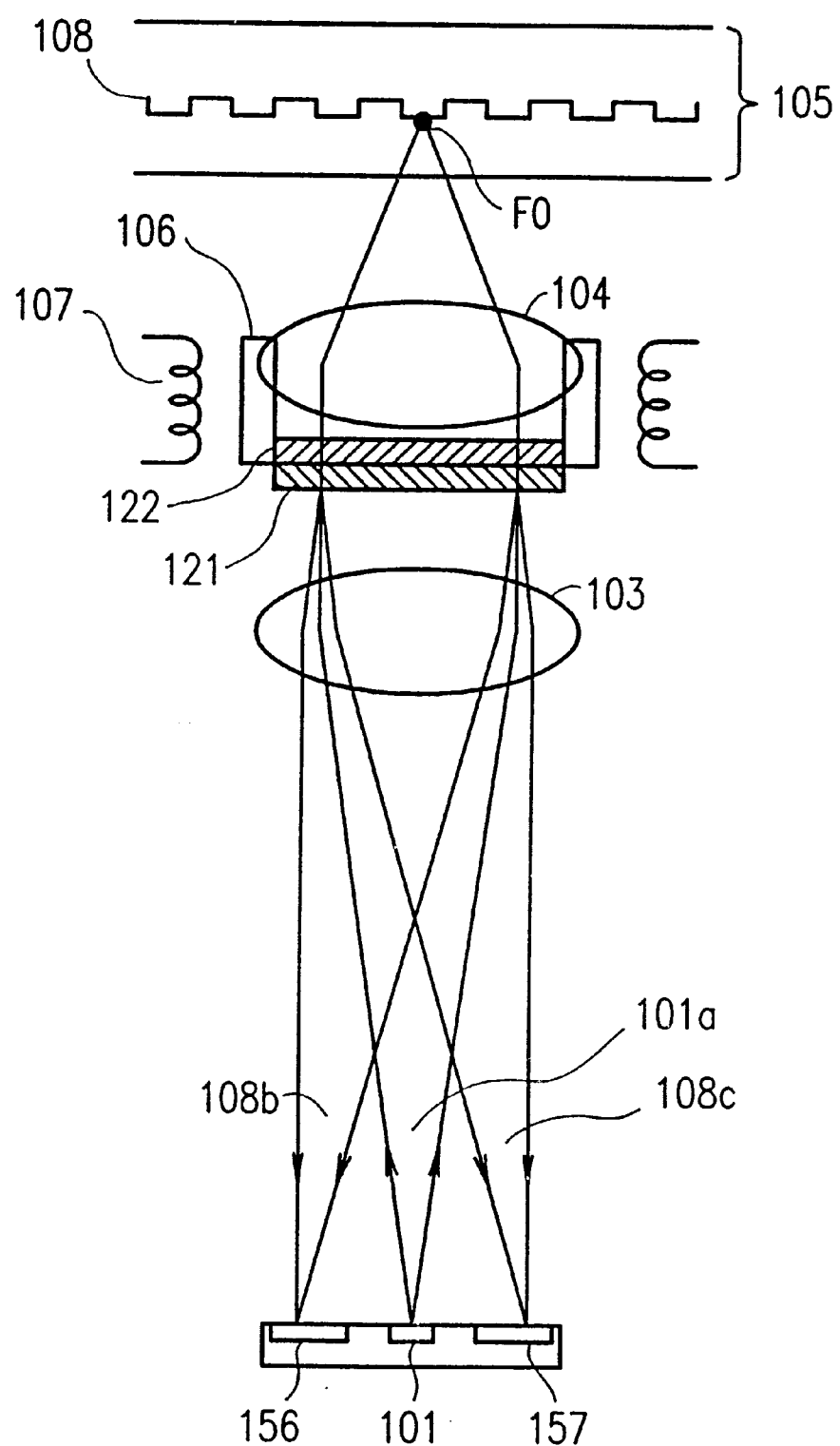
FIG. 25 is a schematic view of an optical system of an optical head device according to the present invention.

FIG. 25 is a schematic view of an optical system of an optical head device according to the eighth example. The optical head device shown in FIG. 25 operates in the following manner.

Linearly polarized light emitted by a semiconductor laser 101 (used as a light source) is collimated by a collimator lens 103 as light 101a, the collimator lens 103 being included in a collection optical system. The collimated light 101a enters a polarization anisotropic holographic element 121 employed as a light division element. The holographic element 121 is positioned so that the light 101a from the semiconductor laser 101 is not diffracted by the holographic element 121. The light 01a transmitted through the holographic element 121 is circularly polarized by a ¼-wave plate 122. The light 101a is then collected by an objective lens 104 on an information layer 108 of an optical disk 105 used as an information memory medium.

The light is reflected and/or diffracted by the information layer 108 of the optical disk 105 as light 108a is transmitted back through the objective lens 104 to be collimated. The collimated light 108a is transmitted through the ¼-wave plate 122 to be converted into linearly polarized light which runs in a direction perpendicular to the direction of the light 101a from the semiconductor laser 101. The linearly polarized light is then diffracted by the polarization anisotropic holographic element 121 into minus first-order diffraction light 108b and plus first-order diffraction light 108c. The minus first-order diffraction light 108b and the plus first-order diffraction light 108c are converged by the collimator lens 103. Then, the minus first-order diffraction light 108b is received by a light detector 156, and the plus first-order diffraction light 108c is received by a light detector 157.

A holding device 106 integrally holds the polarization anisotropic holographic element 121, the ¼-wave plate 122 and the objective lens 104. An actuator 107 moves the holding device 106 in accordance with the fluctuation or decentration of the optical disk 105.

Figure 26:
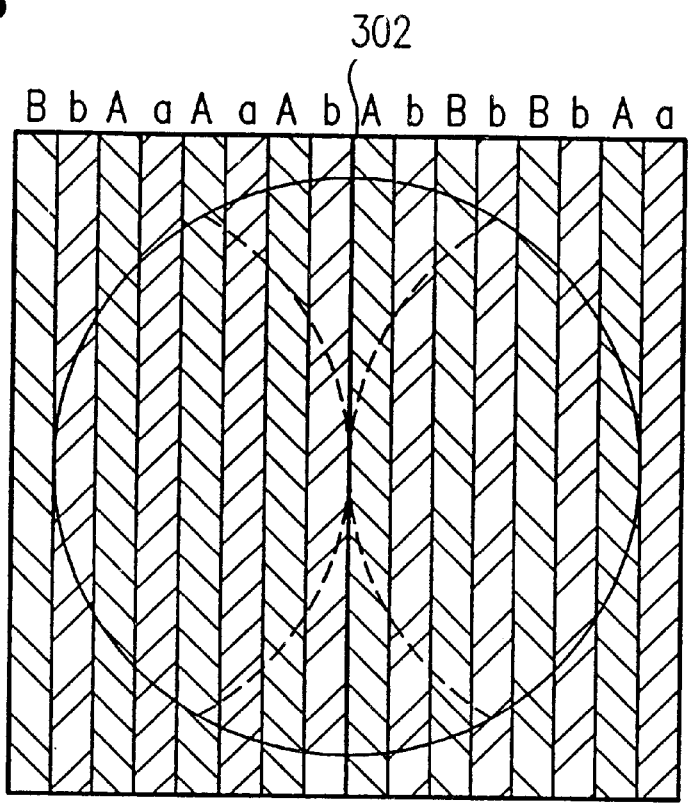
FIG. 26 shows a relationship among a pattern for dividing a holographic element, detection areas of the light detector, and the cross section of the diffraction light on the light detector in an optical head device according to the present invention.
Figure 26:
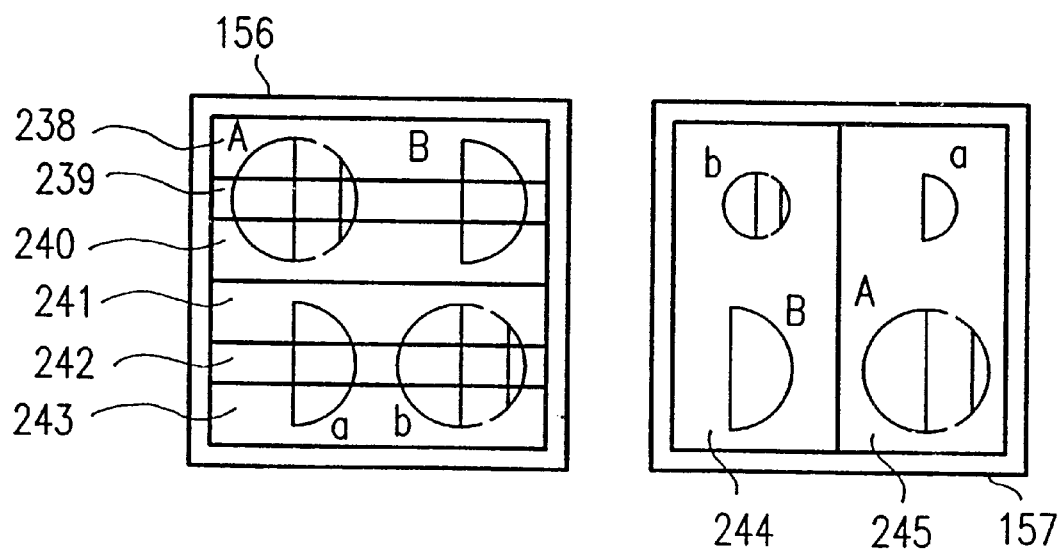

FIG. 26 shows a pattern for dividing the polarization anisotropic holographic element 121, detection areas of the light detectors 156 and 157, and cross sections of the minus first-order diffraction light 108b and the plus first-order diffraction light 108c respectively on the light detectors 156 and 157.

The holographic element 121 is divided into a plurality of strip-shaped areas A, a, B, and b. These letters indicating the strip-shaped areas also indicate the corresponding cross sections of the minus first-order diffraction light 108b and the plus first-order diffraction light 108c on the light detectors 156 and 157. The minus first-order diffraction light 108b obtained from the areas represented by capital letters A and B is collected farther from the minus first-order diffraction light 108b obtained from the areas represented by lower case letters a and b with respect to the collimator lens 103.

The optical system shown in FIG. 25 and the holographic element 121 are designed so that, when the focal point F0 of the light from the objective lens 104 is on the information layer 108 of the optical disk 105, the cross section of the minus first-order diffraction light 108b obtained from the areas represented by the capital letters A and B has an equal size to that of the cross section of the minus first-order diffraction light 108b obtained from the areas represented by the lower case letters a and b.

Detection areas 238 through 243 respectively generate signals f1 through f6 in accordance with the amount of light received. A focusing error signal FE is obtained b an operation represented by expression (31) or (32).

$$FE=(f1+f3+f5)-(f2+f4+f6) \quad (31)$$

$$FE=f5-f2 \quad (32)$$

When the information layer 108 is distanced from the objective lens 104 to be beyond the focal point F0 of the light from the objective lens 104, the cross sections A and B of the minus first-order diffraction light 108b are decreased, and the cross sections a and b of the minus first-order diffraction light 108b are increased. Accordingly, the amplitudes of signals f1, f3 and f5 reduce and the amplitudes of signals f2, f4 and f6 increase. The amplitude of the focusing error signal FE reduces.

When the information layer 108 approaches the objective lens 104 to be between the objective lens 104 and the focal point F0 of the light from the objective lens 104, the cross sections A and B of the minus first-order diffraction light 108b are increased, and the cross sections a and b of the minus first-order diffraction light 108b are decreased. Accordingly, the amplitudes of signals f1, f3 and f5 increase and the amplitudes of signals f2, f4 and f6 reduce. The amplitude of the focusing error signal FE increases.

In such a system, focusing control for maintaining the focal point F0 on the information layer 108 is realized.

Detection areas 244 and 245 of the light detector 157 respectively generate signals t1 and t2 in accordance with the amount of light received. The tracking error signal TE1 is obtained by expression (33) by the push-pull method.

$$TE1=t1-t2 \quad (33)$$

The tracking error signal TE1 substantially indicates the difference in light amount between the lined areas and the blank areas of the holographic element 121 in FIG. 26.

An RF signal for reproducing the information is obtained as RFf by expression (34), as RFt by expression (35), or as the sum of RFf and RFt.

$$RFf=f1+f2+f3+f4+f5+f6 \quad (34)$$

$$RFt=t1+t2 \quad (35)$$

Hereinafter, comparison between the optical head device shown in FIG. 26 and the conventional optical head device regarding he degree of asymmetry of the upper and lower amplitudes of the tracking error signal will be described.

The optical disk includes a plurality of tracks having grooves or a series of pits. The distance from the center of a track to the center of an adjacent track is indicated by Tp. Where the numerical aperture of the objective lens 104 (FIG. 25) is NA and the wavelength of the light is λ, expression (36) is fulfilled in the eighth example.

$$\lambda/(NA \cdot Tp) \geq 1 \quad (36)$$

A feature of the optical head device in the eighth example is that areas included in about 0.1 wide parts sandwiching the division line which runs through the center of the aperture and is parallel to the grooves of the optical disk are exchanged with each other, and areas included in about 0.1 wide parts at ends of the aperture are exchanged with each other for the operation, as described in detail below.

In the case of a polarization anisotropic holographic element, the strip-shaped areas A and a are alternately arranged in the part left to the central division line 302, and the strip-shaped areas B and b are alternately arranged in the part right to the central division line 302. In the case of the holographic element shown in FIG. 26, one strip-shaped area A and one strip-shaped area b sandwiching the central divisional line 302 are exchanged with each other. Along the ends of the aperture, the strip-shaped areas A and a are exchanged with the strip-shaped areas B and b.

In the case where the strip-shaped areas are not exchanged as described above (i.e., in the conventional optical head device), the degree of asymmetry of the upper and lower amplitudes of the tracking error signal is as follows. The degree of asymmetry is measured under the conditions where the numerical aperture NA of the objective lens is 0.5, the wavelength λ of light is 0.795 μm, the light intensity at the end of the objective lens is 10% higher than the light intensity at the center of the objective lens, the thickness of the optical disk is 1.2 mm, and the distance Tp between the centers of two adjacent tracks Tp is 1.6 μm. When the objective lens shifts by 500 μm, the degree of asymmetry is 53%. When the radial tilt is 1.0 degrees, the degree of asymmetry is 24%.

In the case of the optical head device shown in FIG. 26, the degree of asymmetry is as follows where each of the strip-shaped areas has a width of 0.1 times the radius of the objective lens and Tp is 1.6 μm. When the objective lens shifts by 500 μm, the degree of asymmetry is 46%. When the radial tilt is 1.0 degrees, the degree of asymmetry is 12%. As can be understood, when the objective lens shifts by 500 μm, the degree of asymmetry in the optical head device shown in FIG. 26 is 13% lower than that of the conventional optical head device. When the radial tilt is 1.0 degrees, the degree of asymmetry in the optical head device shown in FIG. 26 is 50% lower than that of the conventional optical head device. Due to such a significant reduction in the degree of asymmetry, the tracking control is stabilized, and margin against disturbance and the like is increased. Thus, information can be recorded and reproduced with a sufficiently low error ratio.

In an optical head device in which the aperture is simply divided into two, the difference between the focus position at which the amplitude of the information reproduction signal is maximum and the focus position at which the amplitude of the tracking error signal is maximum is 1.5 to 1.0 $\mu$m. In the optical head device shown in FIG. 26, such a difference is 1.0 to 0.5 $\mu$m. The reduction in such a difference also realizes a lower error ratio for information recording and reproduction while maintaining the tracking control stable.

In the eighth example, the polarization anisotropic holographic element is used as a light division element. Alternatively, a holographic without polarization anisotropy may be used. The same effect can be obtained.

In the eighth example, the polarization anisotropic holographic element used as a light division element is driven integrally with the objective lens. The light division element may be provided at any position between the collection optical system and the light detector. As the objective lens moves in accordance with the decentration of the track of the optical disk or the like, the relative positions of the light division element and the objective lens changes. By the pattern for dividing the holographic element described in the eighth example, the deterioration of the tracking error signal due to this change can be restricted.

EXAMPLE 9

In a ninth example according to the present invention, the degree of asymmetry of the tracking error signal is corrected. The optical system of the optical head device used in the ninth example is identical with that of the optical system shown in FIG. 25 except that a polarization anisotropic holographic element 123 is used in lieu of the holographic element 121. The structure and operation of the optical system will be omitted.

Figure 27:
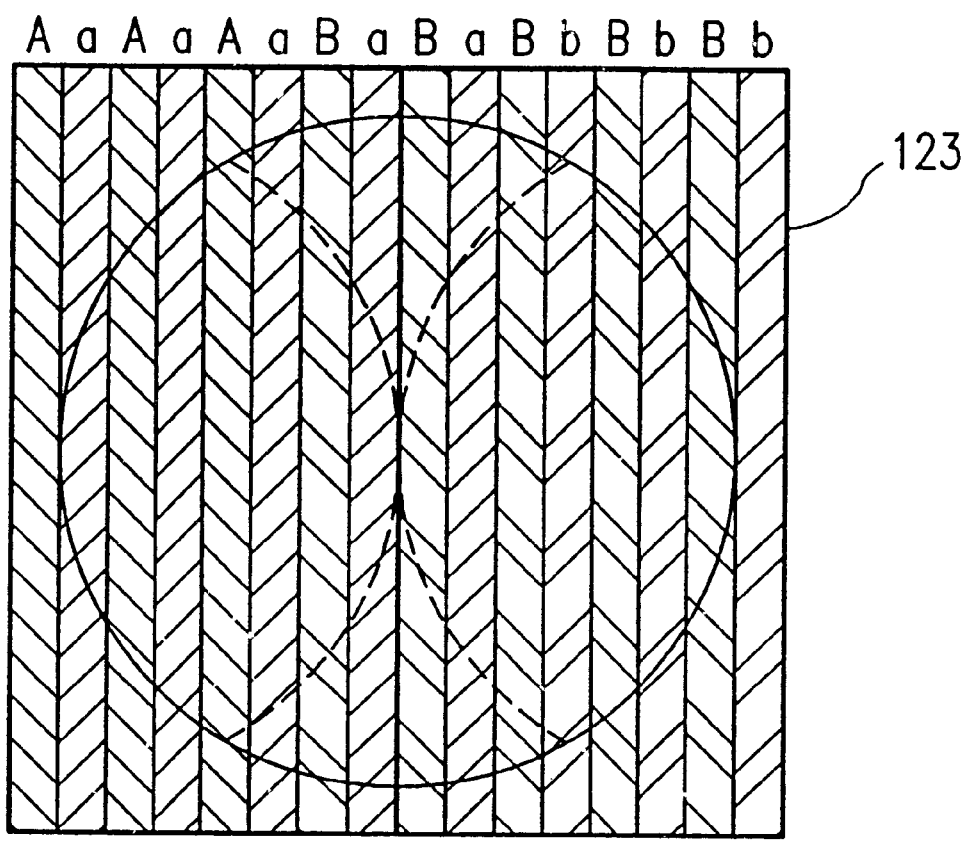
FIG. 27 shows another pattern for dividing a holographic element.

FIG. 27 shows the holographic anisotropic element 123 used in the ninth example. The aperture is a circle having a radius of 1. Strip-shaped area a each having a width of about 0.6 and strip-shaped areas B each having a width of about 0.6 which sandwich a central division line of the aperture are exchanged with each other. The central division line is parallel to the track. A tracking error signal indicates the difference between the amount of light incident on the strip-shaped areas A and a (lined areas) and the amount of light incident on the strip-shaped areas B and b (white areas). In FIG. 27, two lined areas and two white areas are exchanged with each other.

The degree of asymmetry of the upper and lower amplitudes of the tracking error signal is as follows under the conditions where the numerical aperture NA of the objective lens is 0.5, the wavelength $\lambda$ of light is 0.795 $\mu$m, the diameter of the objective lens is 4 mm, the light intensity at the end of the objective lens is 10% higher than the light intensity at the center of the objective lens, and the distance Tp between the centers of two adjacent tracks is 1.6 $\mu$m. In the case of the conventional optical head device in which the strip-shaped areas are not exchanged, when the objective lens shifts by 500 $\mu$m, the degree of asymmetry is 53%. When the radial tilt is 1.0 degrees, the degree of asymmetry is 24%.

According to one aspect of the optical head device shown in FIG. 27, for example, the lined areas having a total width of 1.2 mm are exchanged with the white areas having a total width of 1.2 mm with the central division line at the center. When the objective lens shifts by 500 $\mu$m, the degree of asymmetry is 45%. When the radial tilt is 1.0 degrees, the degree of asymmetry is 14%. As can be understood, when the objective lens shifts by 500 $\mu$m, the degree of asymmetry in the optical head device shown in FIG. 27 is about 15% lower than that of the conventional optical head device. When the radial tilt is 1.0 degrees, he degree of asymmetry in the optical head device shown in FIG. 27 is about 42% lower than that of the conventional optical head device.

The optical head device in the ninth example has a greater effect against the shift of the objective lens even than the optical head device shown in FIG. 26 in the eighth example. Accordingly, the tracking control is further stabilized, and margin against disturbance and the like is increased. Thus, information can be recorded and reproduced with a substantially low error ratio.

In the ninth example, the polarization anisotropic holographic element is used as a light division element. Alternatively, a holographic without polarization anisotropy may be used. The same effect can be obtained.

In the first through ninth examples, an optical disk is used as an information memory medium. The same effect is achieved when an optical card or the like is used.

In the first through ninth examples, an infinite-type collection optical system including a collimator lens and an objective lens is used. The same effect can be achieved with a limited-type collection optical system including an objective lens which also acts as a collimator lens without using a separate collimator lens.

EXAMPLE 10

In a tenth example according to the present invention, an inclination detection apparatus will be described.

Figure 28:
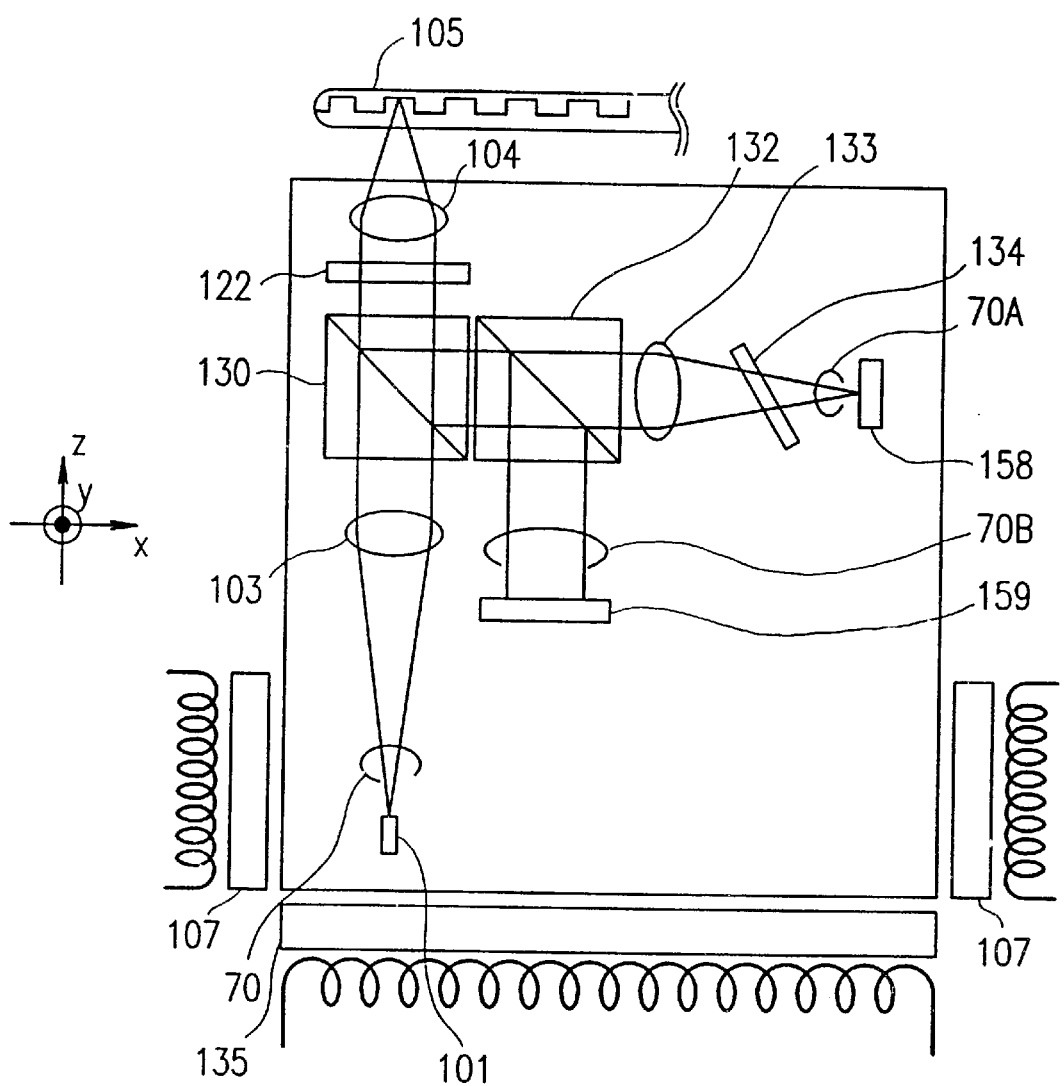
FIG. 28 is a schematic view of an inclination detection apparatus according to the present invention.

FIG. 28 schematically shows an inclination detection apparatus in the tenth example. The inclination detection apparatus operates in the following manner.

A linearly polarized scattering beam emitted by a semiconductor laser 101 used as a light source is collimated by a collimator lens 103 and then incident on a polarizing beam splitter 130 employed as a beam branching element. The beam is entirely transmitted through the polarizing beam splitter 130 as a beam 70 and then transmitted through a ¼-wave plate 122 to be circularly polarized. The circularly polarized light is collected on an information memory medium 105 by an objective lens used as a collection light system. The beam 70 is diffracted and/or reflected by the information memory medium 105 is transmitted back through the objective lens 104 and then through the ¼-wave plate 122 to be converted into a linearly polarized beam (also indicated by reference numeral 70) which runs in a direction perpendicular to the direction of the light from the semiconductor laser 101. The beam 70 is then entirely reflected by the polarizing beam splitter 130 and then made incident on a polarizing beam splitter 132. The beam 70 is divided into two beams 70A and 70B. The beam 70B is detected by a light detector 159. The beam 70A is converged by a detection lens 133. The converged beam 70A is transmitted through a plane-parallel beam splitter 134 and then received by a light detector 158. The beam 70A is provided with a non-point aberration for detecting a focusing error signal when passing through the plane-parallel beam splitter 134. The beam 70A received by the light detector 158 and the beam 70B received by the light detector 159 are respectively converted into electric signals in accordance with the amounts thereof. The electric signals which are output from the light detectors 158 and 159 are input to a signal processing section 700 (FIG. 29).

Figure 29:
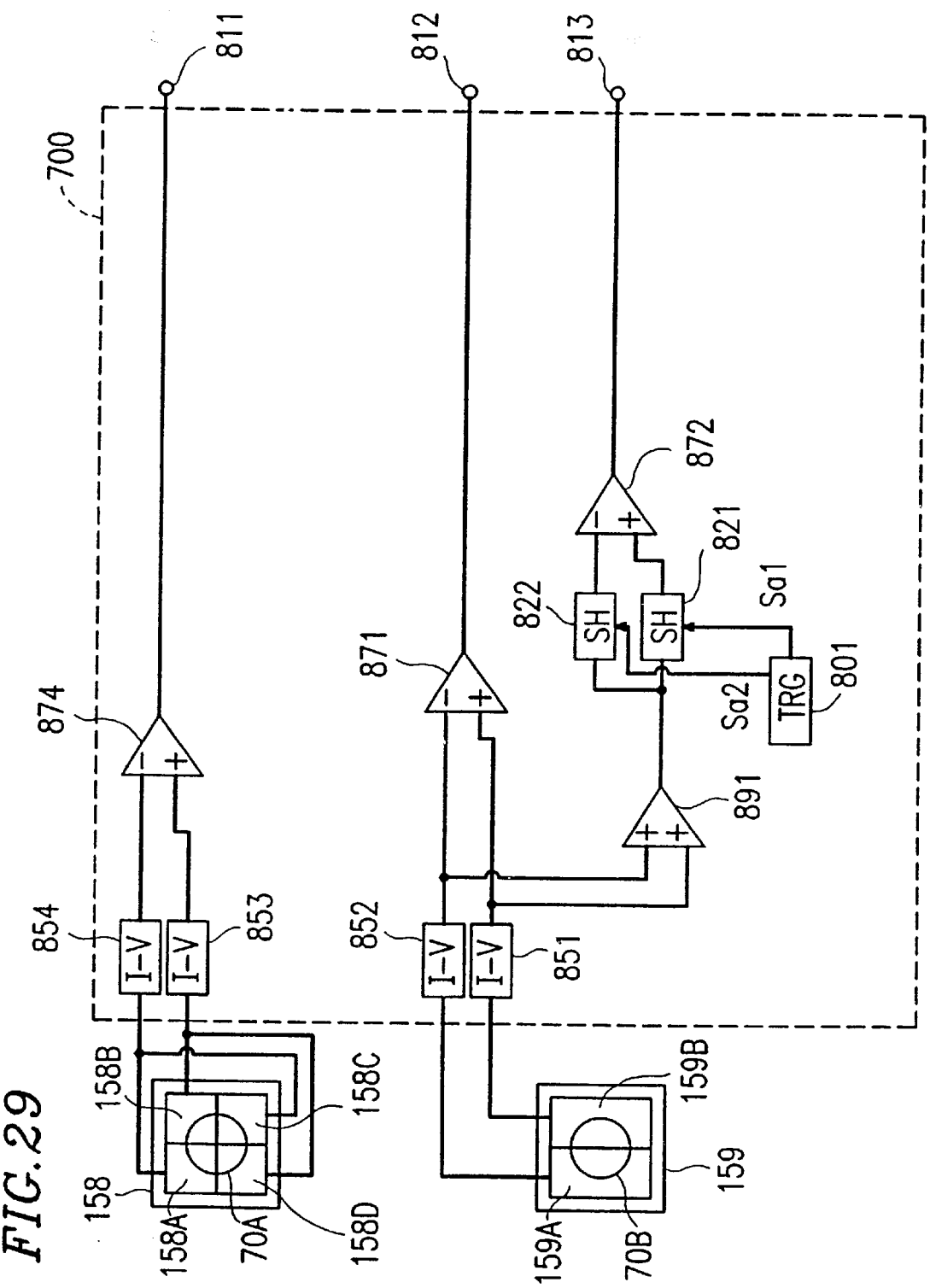
FIG. 29 shows a configuration of a signal processing section of the inclination detection apparatus shown in FIG. 28.

FIG. 29 shows a configuration of the signal processing section 700.

The light detector 158 includes four detection areas 158A through 158D, and the light detector 159 includes two detection areas 159A and 159B. The signals which are output from the detection areas 158A and 158C are current-voltage converted by a current-voltage converter 854, and the signals which are output from the detection areas 158B and 158D are current-voltage converted by a current-voltage converter 853. The signal which is output from the detection area 159A is current-voltage converted by a current-voltage converter 852, and the signal which is output from the detection areas 159B is current-voltage converted by a current-voltage converter 851.

The difference between the signals output from the current-voltage converters 853 and 854 is obtained by an operation section 874. The signal from the operation section 874 is output from a terminal 811 as a focusing error signal.

The difference between the signals output from the current-voltage converters 851 and 852 is obtained by an operation section 871. The signal from the operation section 871 is output from a terminal 812 as a tracking error signal.

The system for generating the focusing error signal, which is referred to as the non-point aberration method, and the system for generating the tracking error signal, which is referred to as the push-pull method, are both known and will not described in detail.

The focusing error signal is sent to an actuator 107 for driving the focusing control, and the tracking error signal is sent to an actuator 107 for driving the tracking control.

The optical system and the information memory medium 105 are relatively positioned so that the beam 70 from the semiconductor laser 101 is focused on a desired position on the information memory medium 105.

The current-voltage converters 851 and 852 are added together by an adder 891. The signal from the adder 891 is sent to sample and hold sections 821 and 822. The sample and hold sections 821 and 822 perform the sample-and-hold operation respectively at the timing of timing signals Sa1 and Sa2, which are generated by a trigger signal generator 801. The difference between the signals from the sample and hold sections 821 and 822 is obtained by an operation section 872 and then output from a terminal 813 as an inclination detection signal.

Figure 30:
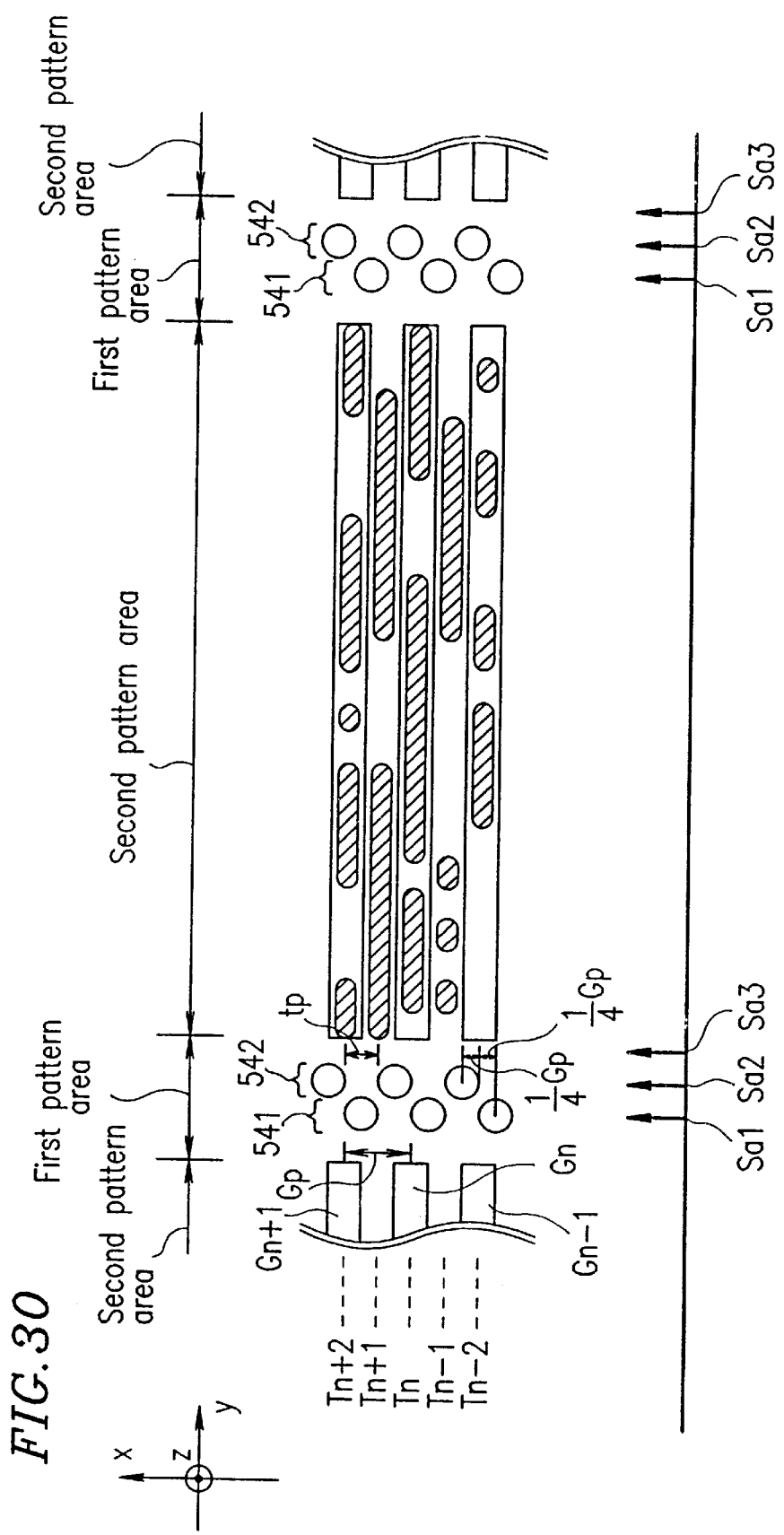
FIG. 30 shows a configuration of an information memory medium usable in the inclination detection apparatus shown in FIG. 28.

FIG. 30 shows the relationship between a pattern on the information memory medium 105 and the timing of the timing signal generated by the trigger signal generator 801. In FIG. 30, letter x represents the direction perpendicular to the track storing the information, and letter y represents the direction parallel to the track storing the information. Letter z represents the direction perpendicular to both directions x and y.

The information memory medium 105 includes first pattern areas having marks and spaces and second pattern areas having guide grooves Gn−1, Gn and Gn+1. The first pattern areas and the second pattern areas are arranged alternately in the direction y. In the second pattern areas, each represent a guide groove.

Letter Gp represents a distance between centers of two adjacent guide grooves. Data can be stored in the guide grooves as well as between the grooves in order to increase the amount of information which can be stored. Symbols Tn−2 . . . Tn+2 each represent a track for storing information. Where the distance between centers of two adjacent tracks is tp, Gp and tp have the relationship of: Gp=2·tp. In this example, Gp=1.48 $\mu$m, the wavelength $\lambda$ of the beam 70 from the semiconductor laser 101 is 650 nm, and the numerical aperture NA of the objective lens 104 (FIG. 28) is 0.6.

In the first pattern areas, marks 541 and 542 are formed with a distance from each other of ±Gp/4 in the direction x. The timing signals Sa1 and Sa2 generated by he trigger signal generator 801 respectively correspond to the marks 541 and 542. The tracking error signal is generated using a signal obtained from the light detector 159 when the second pattern areas are irradiated by the beam 70 collected by the objective lens 104. Where the signal output from the terminal 812 is a tracking error signal, when the angle made by the beam 70 collected by the objective lens 104 and the information memory medium 105 changes, the signal output from the terminal 813 changes in correspondence with the change.

Figure 31A:
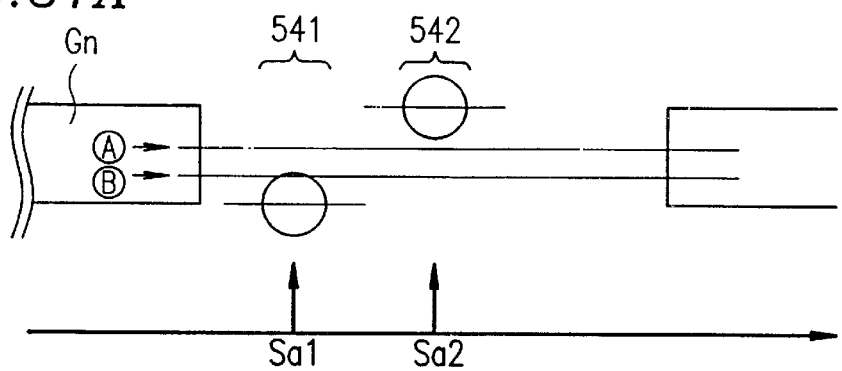
FIG. 31A is a schematic partial view of the track of the information memory medium shown in FIG. 30.

FIG. 31A is a schematic partial view of the track shown in FIG. 30. In FIG. 31A, (A) and (B) each represent a path of the beam collected by the objective lens 104. When the beam runs the path (A), the signal which is output from the adder 891 (FIG. 29) has a waveform shown in FIG. 31B, and the signal which is output from the operation section 872 (FIG. 29) has a waveform shown in FIG. 31C. When the beam runs the path (B), the signal which is output from the adder 891 has a waveform shown in FIG. 31D, and the signal which is output from the operation section 872 has a waveform shown in FIG. 31E.

Figure 31B:
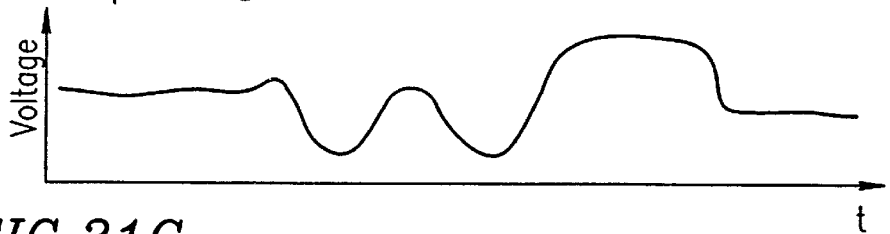
FIGS. 31B through 31E show waveforms of a signal which is output from different elements of the signal processing section shown in FIG. 29.
Figure 31C:
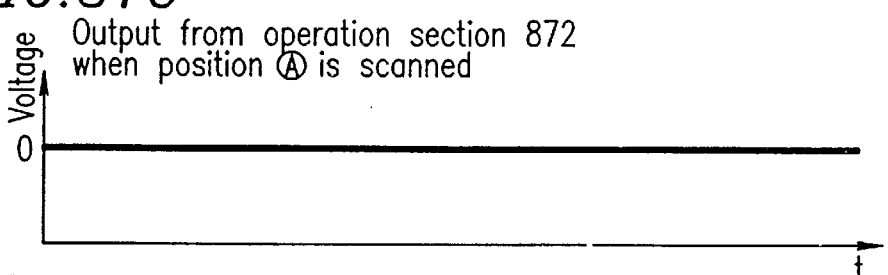
Figure 31D:
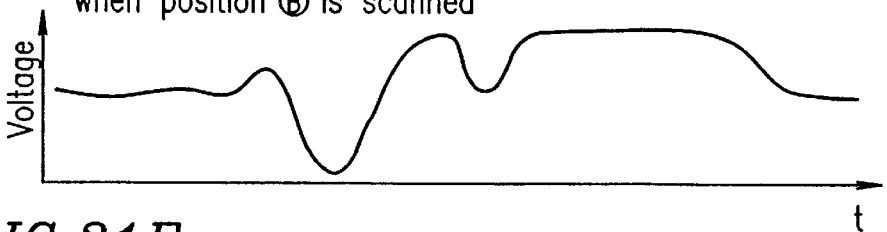
Figure 31E:
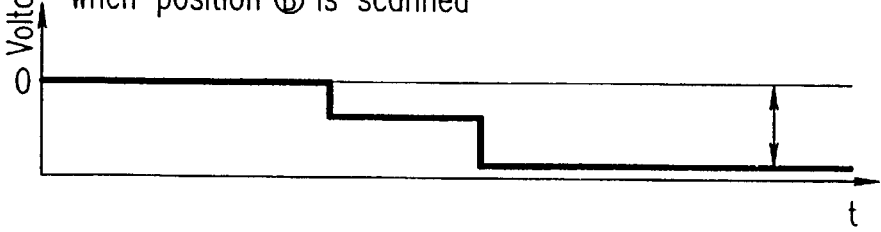

In the case of FIG. 31B, the values of the timing signals Sa1 and Sa2 from the adder 891 are equal to each other. Accordingly, as shown in FIG. 31C, the output from the operation section 872 after the timing signal Sa2 is output is zero. In the case of FIG. 31D, the values of the timing signals Sa1 and Sa2 from the adder 891 are different from each other. Accordingly, as shown in FIG. 31E, the output from the operation section 872 after the timing signal Sa2 is not zero.

Figure 32:
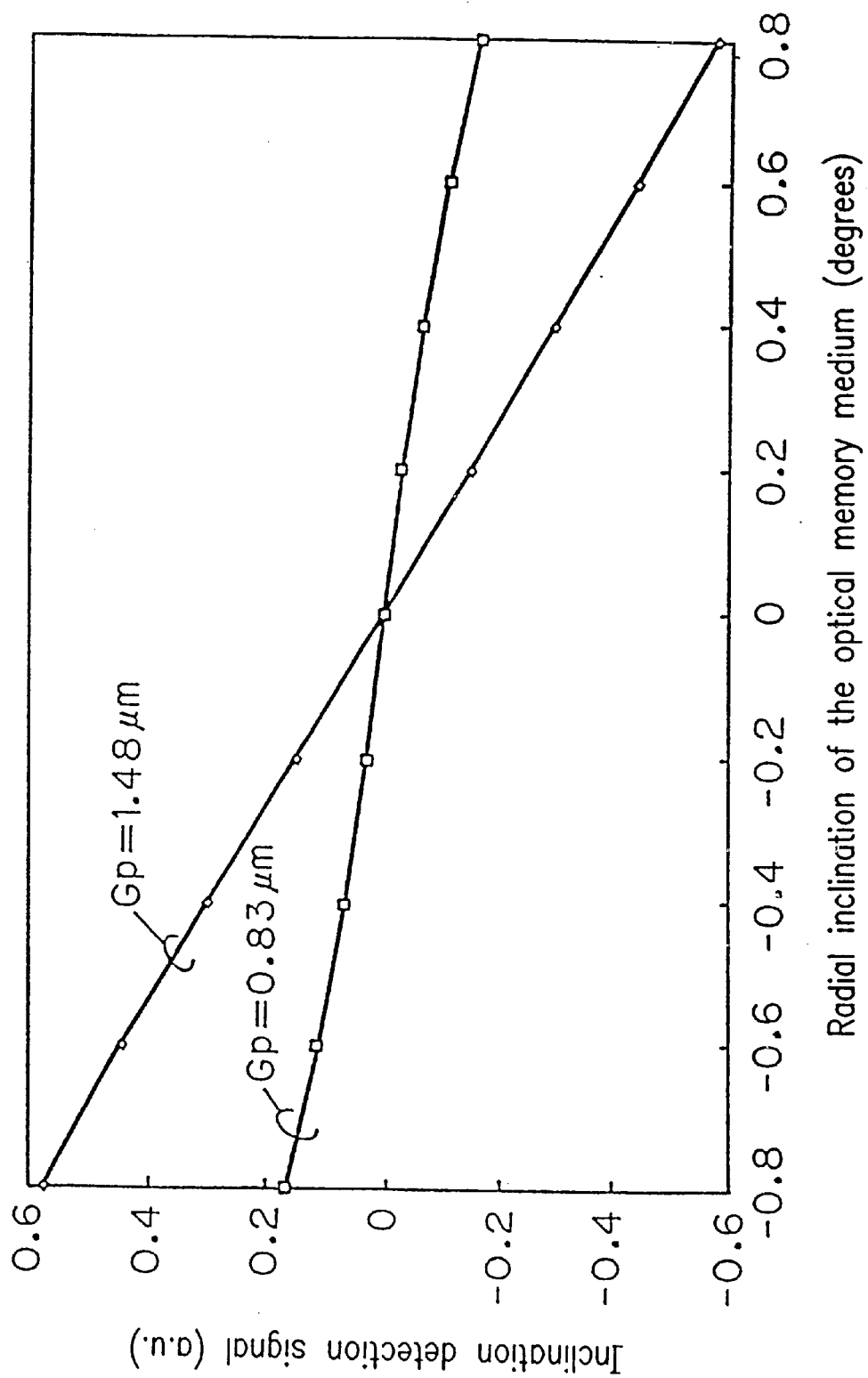
FIG. 32 is a graph illustrating the relationship between the inclination detection signal and the radial inclination of the optical memory medium obtained in an inclination detection apparatus according to the present invention.

FIG. 32 is a graph illustrating the inclination detection signal output from the terminal 813 with respect to the angle made by the beam 70 collected by the objective lens 104 and the information memory medium 105 in the case where Gp=1.48 $\mu$m and Gp=0.83 $\mu$m. In FIG. 32, the inclination is zero when the axis of the beam 70 collected by the objective lens 104 is parallel to the direction z, i.e., perpendicular to the information memory medium 105.

In both of the cases where Gp=1.48 $\mu$m and Gp=0.83 $\mu$m, the inclination detection signal can be detected as long as the inclination of the angle is 1 degree or less. Such a level of detection sensitivity is 5 times higher than in the conventional inclination detection apparatus. The inclination detection apparatus in the tenth example has such a high detection sensitivity since the apparatus operates based on the principle that the phase of the beam is diffracted by the pattern and guide grooves of the information memory medium 105. The detection sensitivity is higher when Gp=1.48 $\mu$m than when Gp=0.83 $\mu$m. The apparatus utilizes the principle that detection sensitivity is related to the pattern of the information memory medium 105 and overlap of plus first-order diffraction light and minus first-order diffraction light obtained from the light. The conditions under which the plus first-order diffraction light and the minus first-order diffraction light overlap are represented by NA>$\lambda$/Gp. The detection sensitivity of the inclination of the angle is improved when the optical system has the relationship of NA>$\lambda$/Gp.

The inclination detection apparatus in the tenth example realizes detection of the inclination of the angle made by the beam collected by the collection optical system and the information memory medium 105 with a higher precision than in conventional inclination detection apparatuses. Moreover, since the inclination can be detected using a light detector for detecting a tracking error signal, a separate device for detecting the inclination is not necessary. Thus, a low-cost and compact inclination detection apparatus can be provided.

In the tenth example, the signal which is output from the terminal 812 is used as a tracking error signal and the signal which is output from the terminal 813 is used as an inclination detection signal. Alternatively, the signal which is output from the terminal 813 may be used as a tracking error signal and the signal which is output from the terminal 812 may be used as an inclination detection signal. Use of the signal output from the terminal 813 is advantageous in, for example, an optical head device without a driving section for correcting the inclination of the angle made by the beam 70 collected by the objective lens 104 and the information memory medium 105. Even when such an inclination occurs, the positional deviation between the guide grooves and the track is substantially small, and thus the compatibility between different types of optical head devices and different types of information memory mediums is improved.

In the case where the inclination detection signal is a control signal of a driving section 135 (FIG. 28) for driving the optical system and controls so that the beam 70 collected by the objective lens 104 and the information memory medium 105 made a prescribed angle, an optical head device for stably reading information even from a significantly curved information memory medium. Through control of the intensity of the beam for recording the information on the information memory medium 105 in accordance with the inclination detection signal, satisfactory recording of information can be performed on a significantly curved information memory medium.

Figure 44:
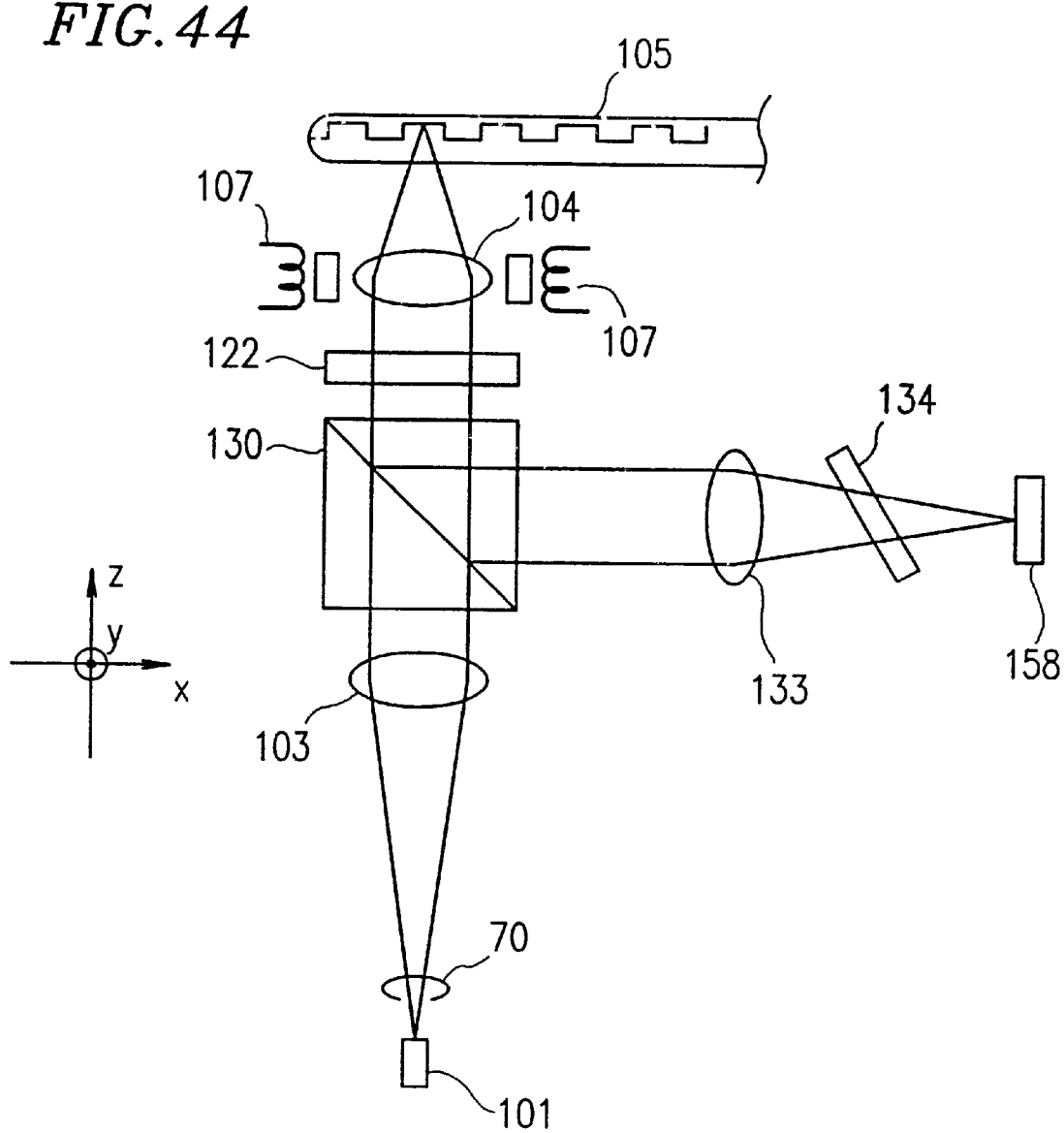
FIG. 44 is a schematic view of a conventional inclination detection apparatus.
Figure 45:
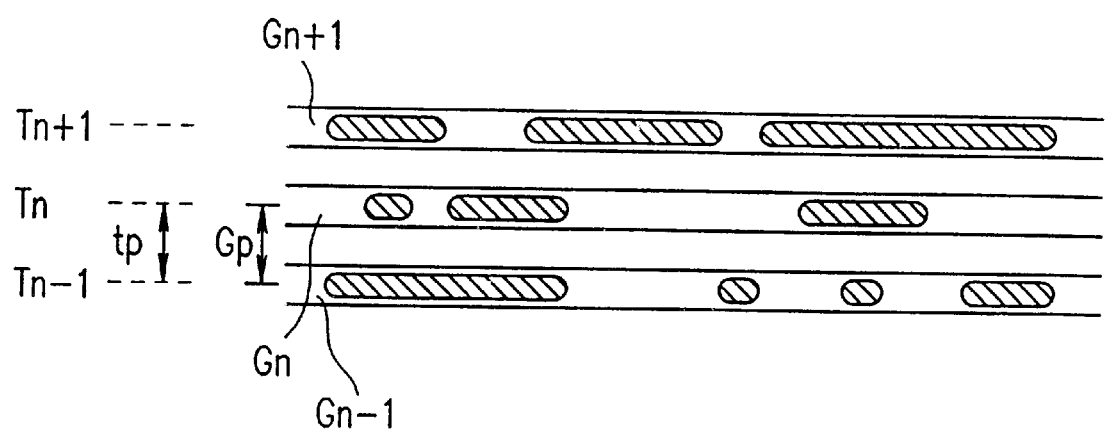
FIG. 45 shows a configuration of a conventional information memory medium.
Figure 46:
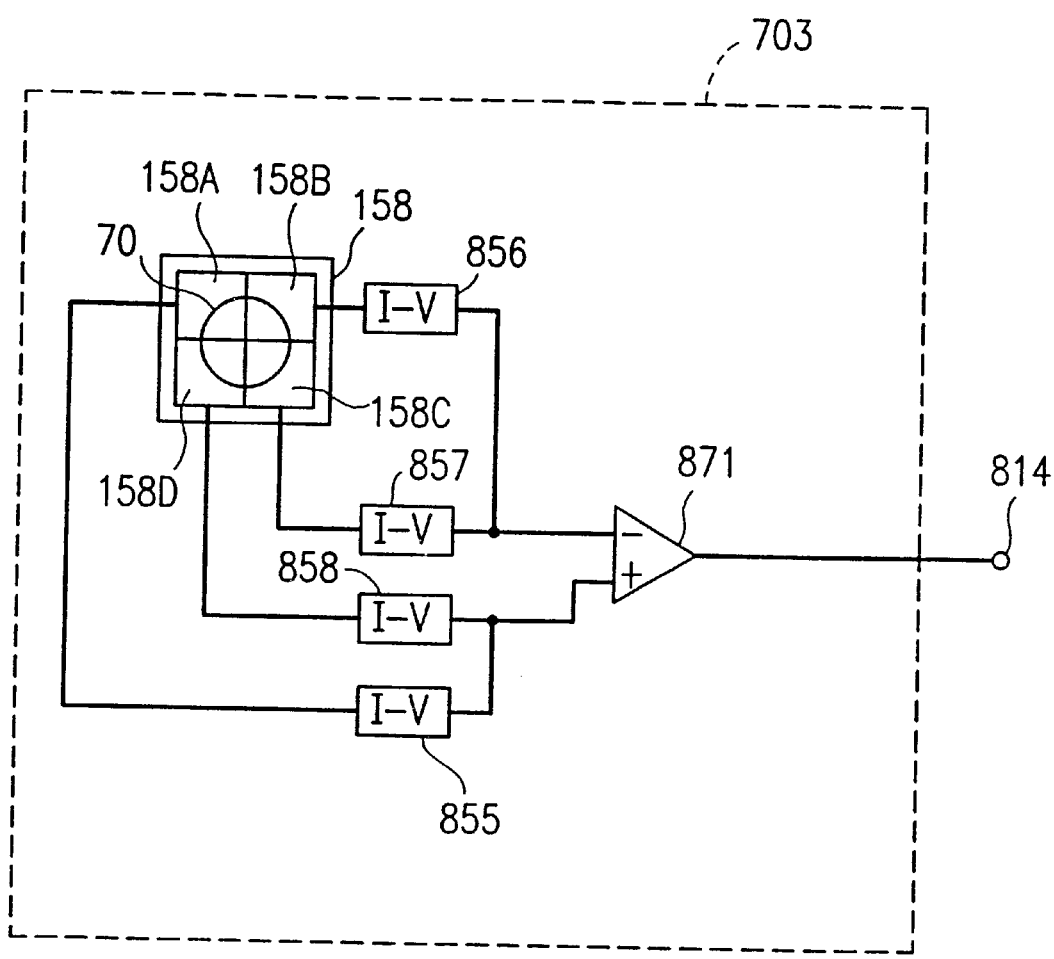
FIG. 46 shows a configuration of a signal processing section of a conventional inclination detection apparatus.
Figure 47:
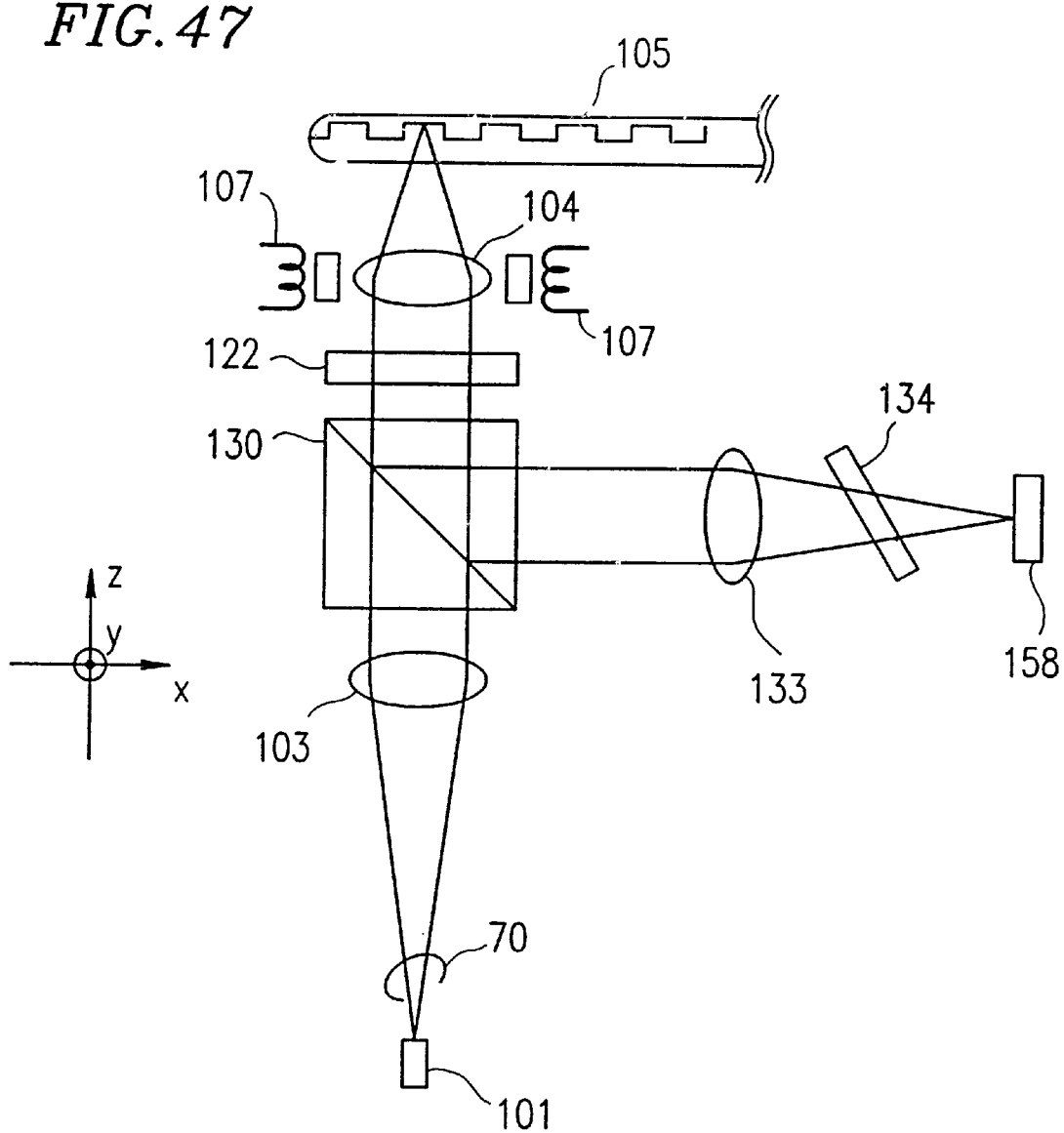
FIG. 47 is a schematic view of another conventional optical head device.
Figure 48:
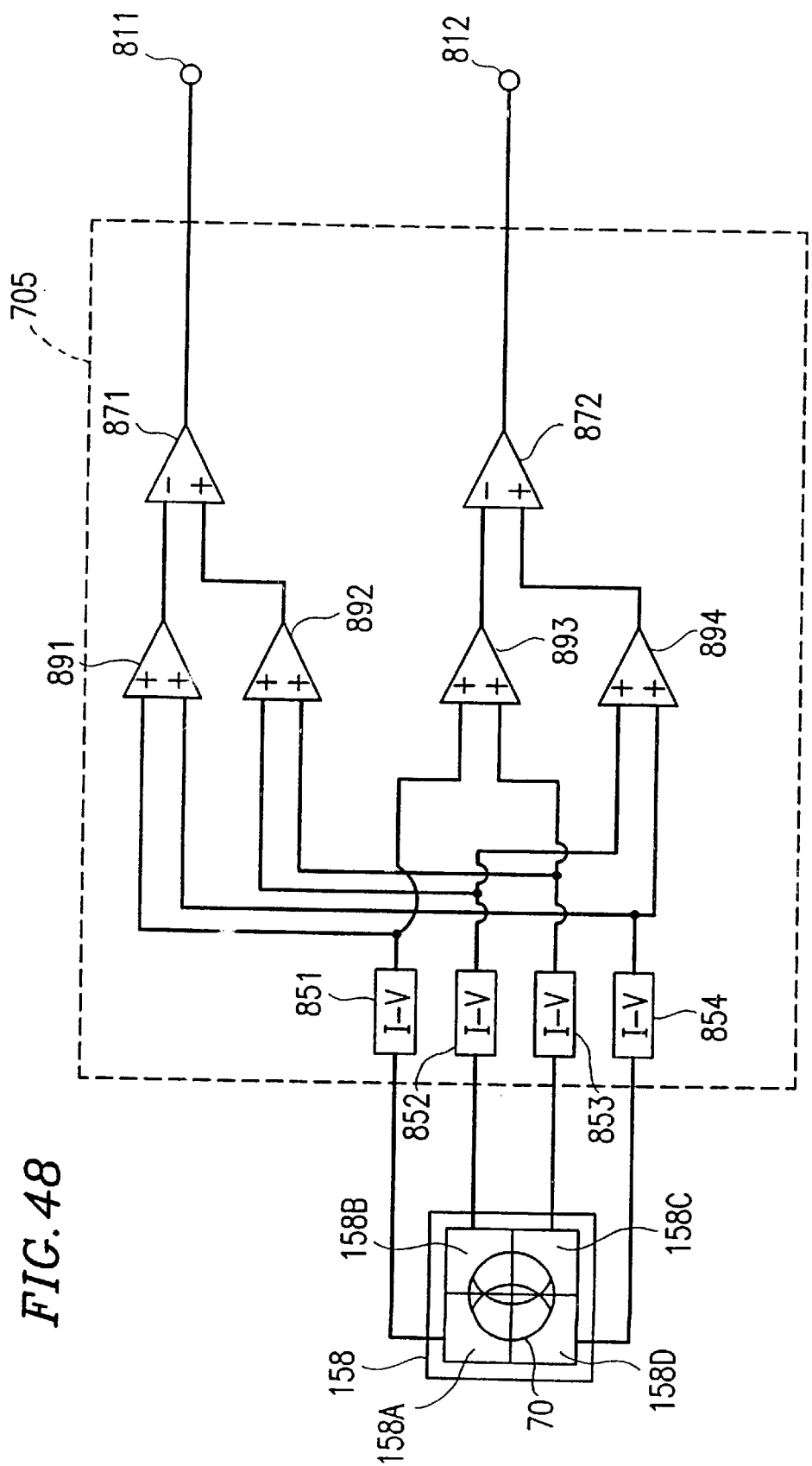
FIG. 48 shows a configuration of a signal processing section of a conventional optical head device.
Figure 49:
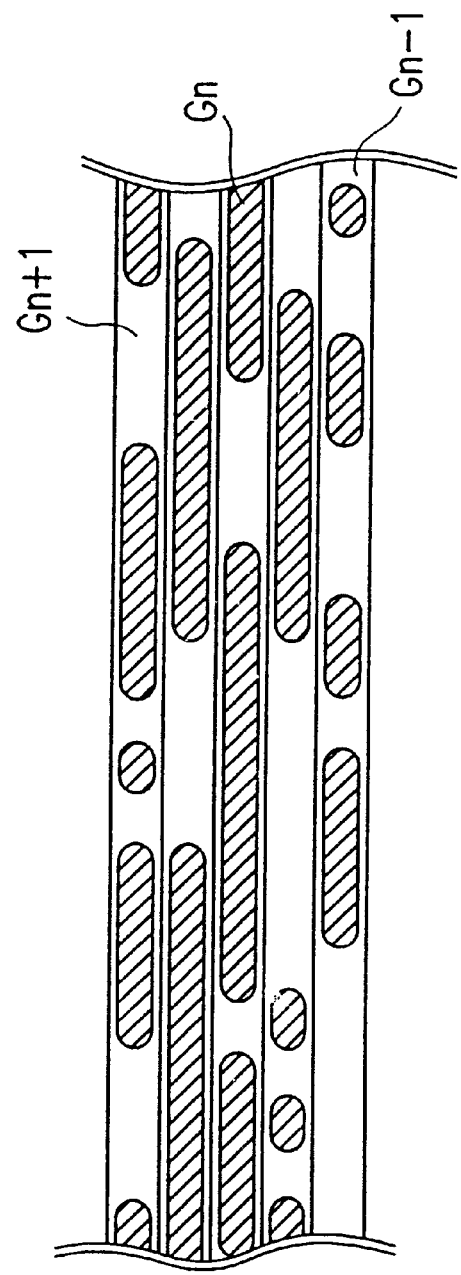
FIG. 49 shows a configuration of a conventional information memory medium used in the optical head device shown in FIG. 47.
Figure 49:
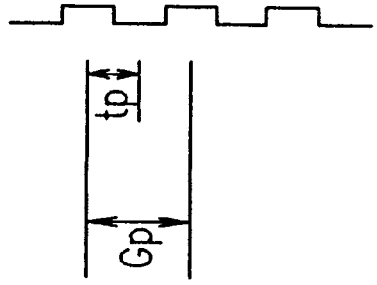

In the tenth example, the light detector 158 for detecting a focusing error signal and a tracking error signal and the light detector 159 for generating an inclination detection signal are separately provided. Alternatively, the optical system shown in FIG. 44 having one light detector for generating a focusing error signal and a tracking error signal as well as an inclination detection signal can be used.

EXAMPLE 11

Figure 33:
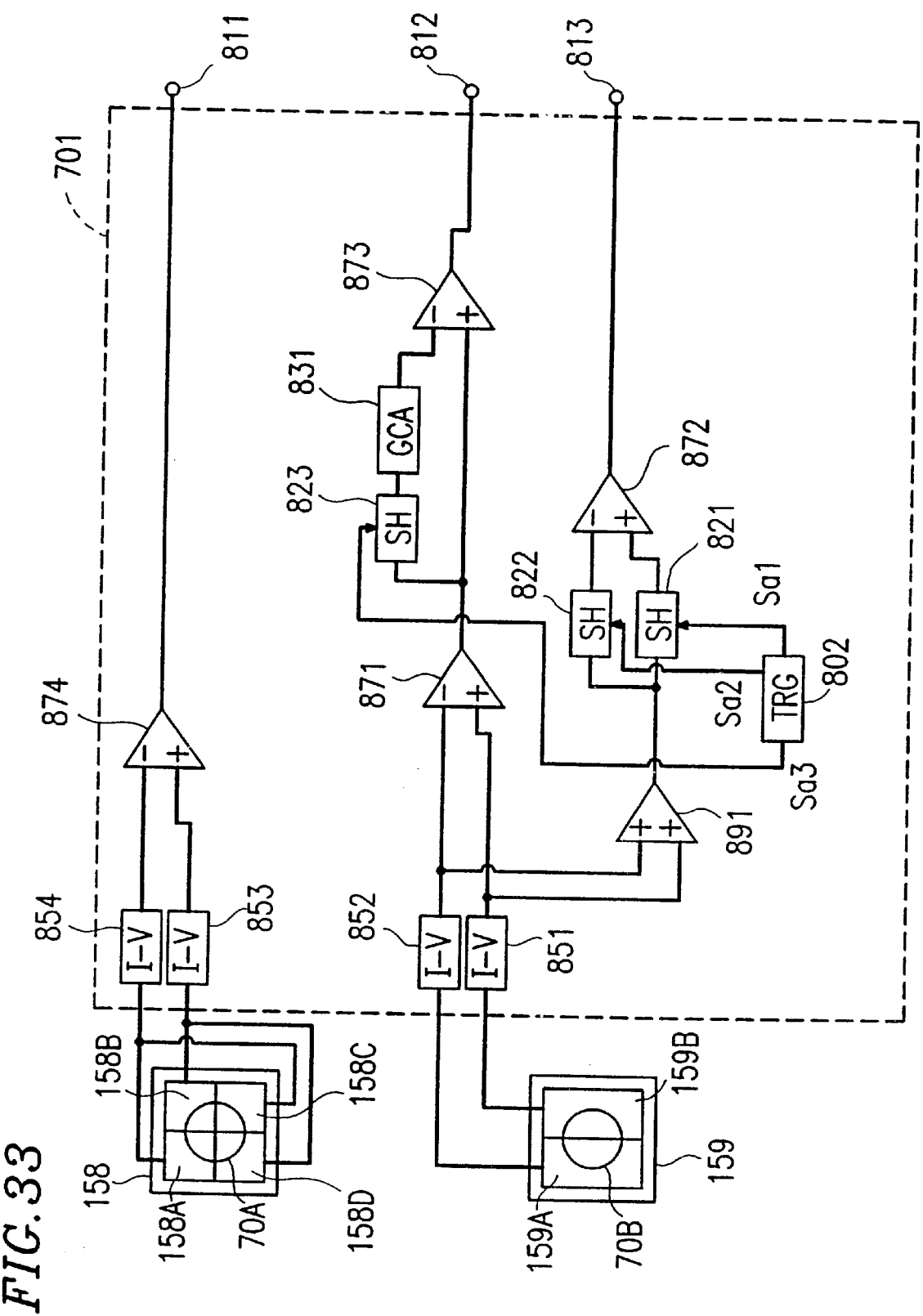
FIG. 33 shows another configuration of a signal processing section usable in an inclination detection apparatus according to the present invention.

FIG. 33 shows a configuration of a signal processing section 701 of an inclination detection apparatus in an eleventh example according to the present invention.

The signal processing section 701 is used in lieu of the signal processing section 700 shown in FIG. 29 in the inclination detection apparatus.

Figure 35:
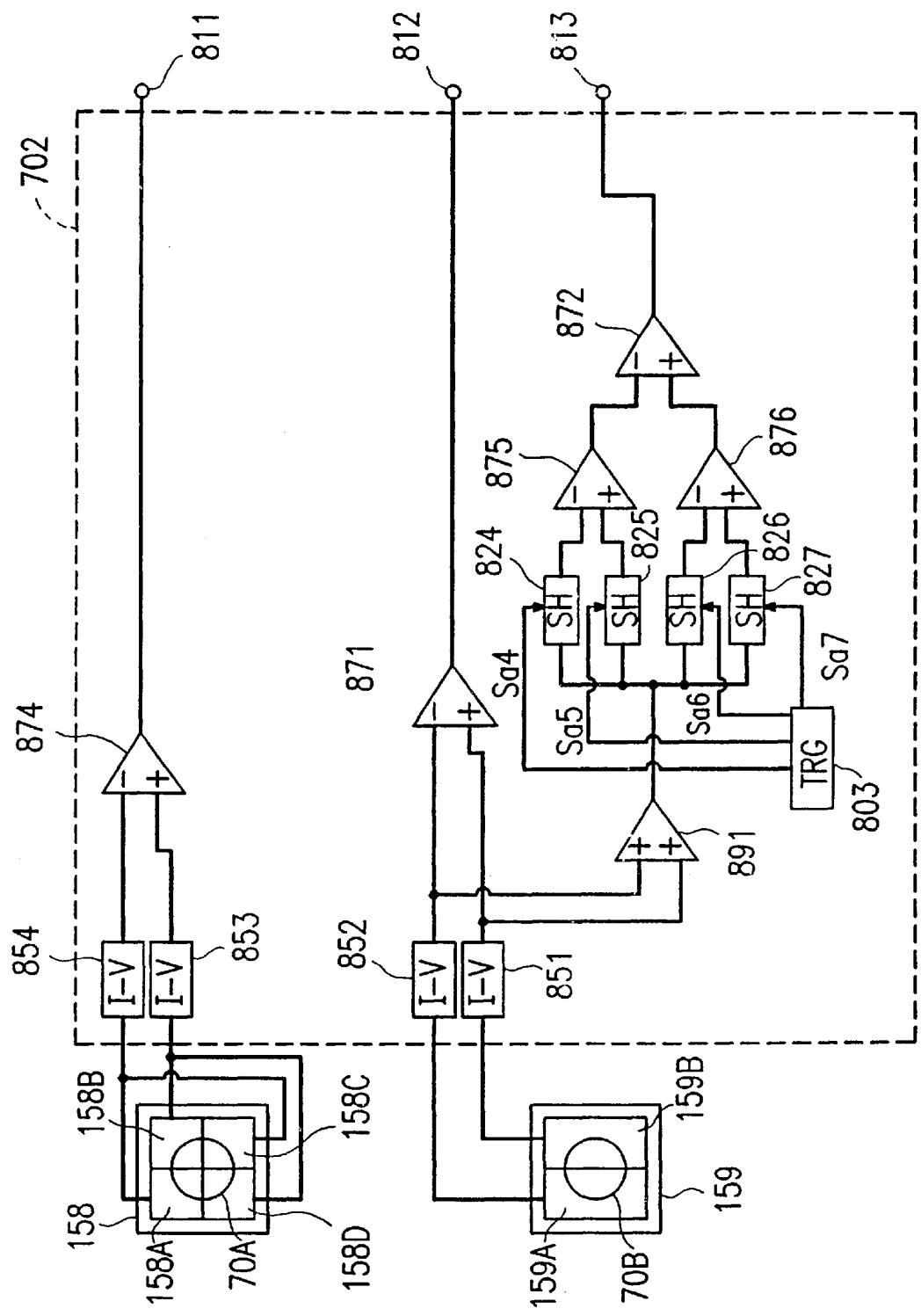
FIG. 35 shows still another configuration of a signal processing apparatus in an inclination detection apparatus according to the present invention.

The signal processing section 701 is different from the signal processing section 700 in that the former includes a sample and hold section 823, a variable gain amplification section 831 and the operation section 873 and has a different timing signal output from a trigger signal generator 802. The sample and hold section 823 performs the sample-and-hold operation at the timing of a timing signal Sa3 which is output from the trigger signal generator 802. As shown in FIG. 30, the timing of the timing signal Sa3 corresponds to the space in the first pattern area of the information memory medium 105. A signal which is sampled and held by the sample and hold section 823 is, for example, a signal in proportion to the offset which is caused to the tracking error signal in an optical system for driving the objective lens for tracking control as shown in FIG. 35 (infra) when the objective lens moves. The signal which is output from the sample and hold section 823 is, for example, sent to the variable gain amplification section 831 and adjusted to have a desirable level. The signal output from the variable gain amplification section 831 is sent to the operation by the operation section 873. The difference between the signal from the variable gain amplification section 831 and the signal from the operation section 871 is obtained by the operation section 873. The signal output from the operation section 873 is output from the terminal 812. By obtaining the difference between the signal from the variable gain amplification section 831 and the signal from the operation section 871, the offset caused to the tracking error signal is eliminated even when the objective lens moves by tracking control. Accordingly, stable tracking control can be performed, and thus an inclination detection signal is accurately detected.

EXAMPLE 12

Figure 34:
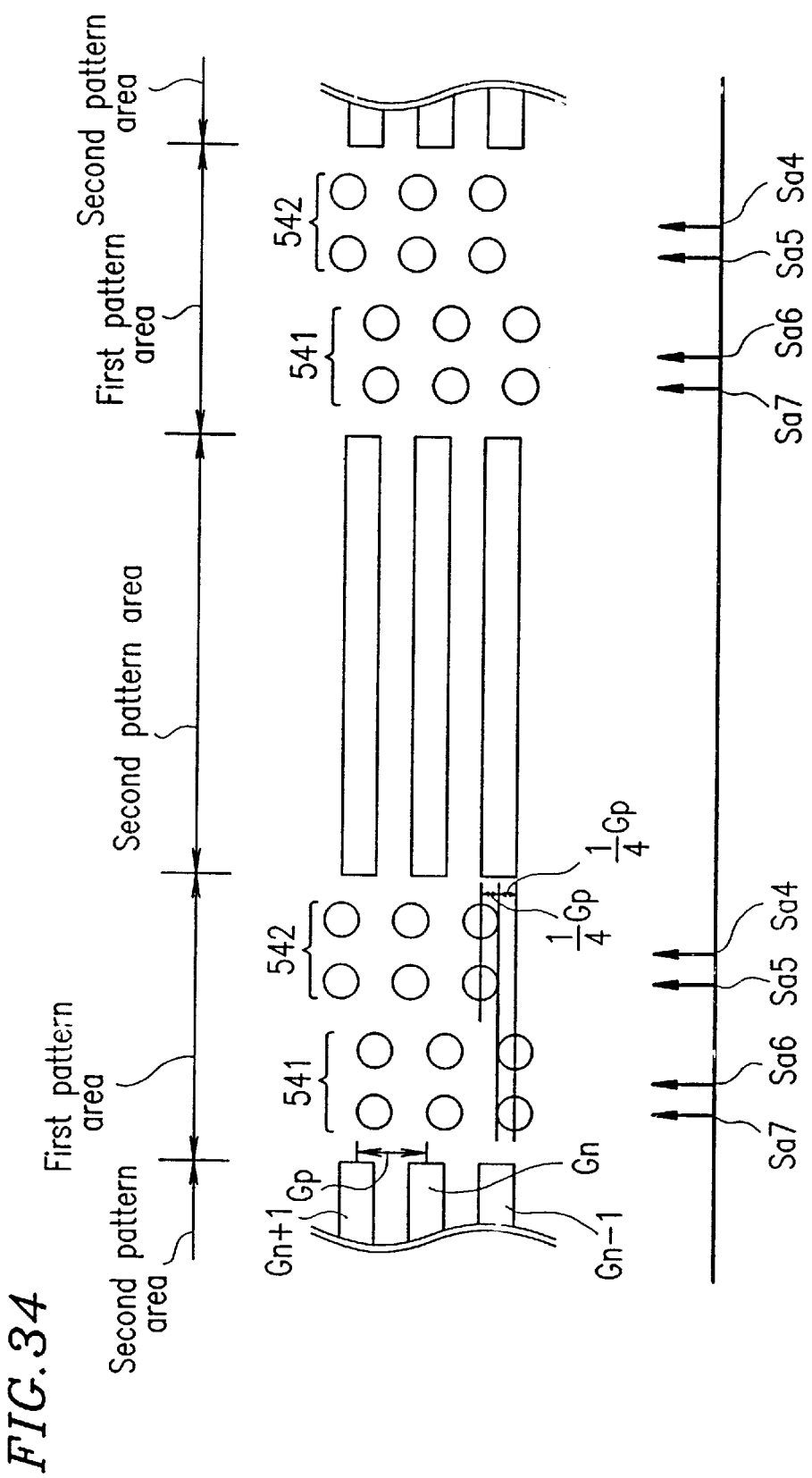
FIG. 34 shows a configuration of an information memory medium usable in an inclination detection apparatus according to the present invention.

FIG. 34 shows a configuration of an information memory medium in an inclination detection apparatus in a twelfth example according to the present invention. FIG. 35 is a schematic view of a signal processing section 702 of the inclination detection apparatus.

The information memory medium shown in FIG. 34 is different from the information memory medium shown in FIG. 30 in that the former has a plurality of marks 541 and a plurality of marks 542.

Sample and hold sections 824 through 827 in the signal processing section 702 sample and hold the signal from the adder 891 at the timing of timing signals Sa4 through Sa7. The timing signals Sa4 through Sa7 respectively correspond to the marks 541 and 542 and mirror surfaces thereof. The timing signals are generated by a trigger signal generator 803. The difference between signals output from the sample and hold sections 824 and 825 is obtained from an operation section 875, and the difference between signals output from the sample and hold sections 826 and 827 is obtained from an operation section 876. The difference between the signals from the operation sections 875 and 876 is obtained by the operation section 872 and output from the terminal 813 as an inclination detection signal.

The inclination detection apparatus using the information memory medium shown in FIG. 34 in the twelfth example provides an inclination detection signal at a higher level of detection sensitivity than the inclination detection apparatus using the information memory medium shown in FIG. 30 in the tenth example.

EXAMPLE 13

Figure 36:
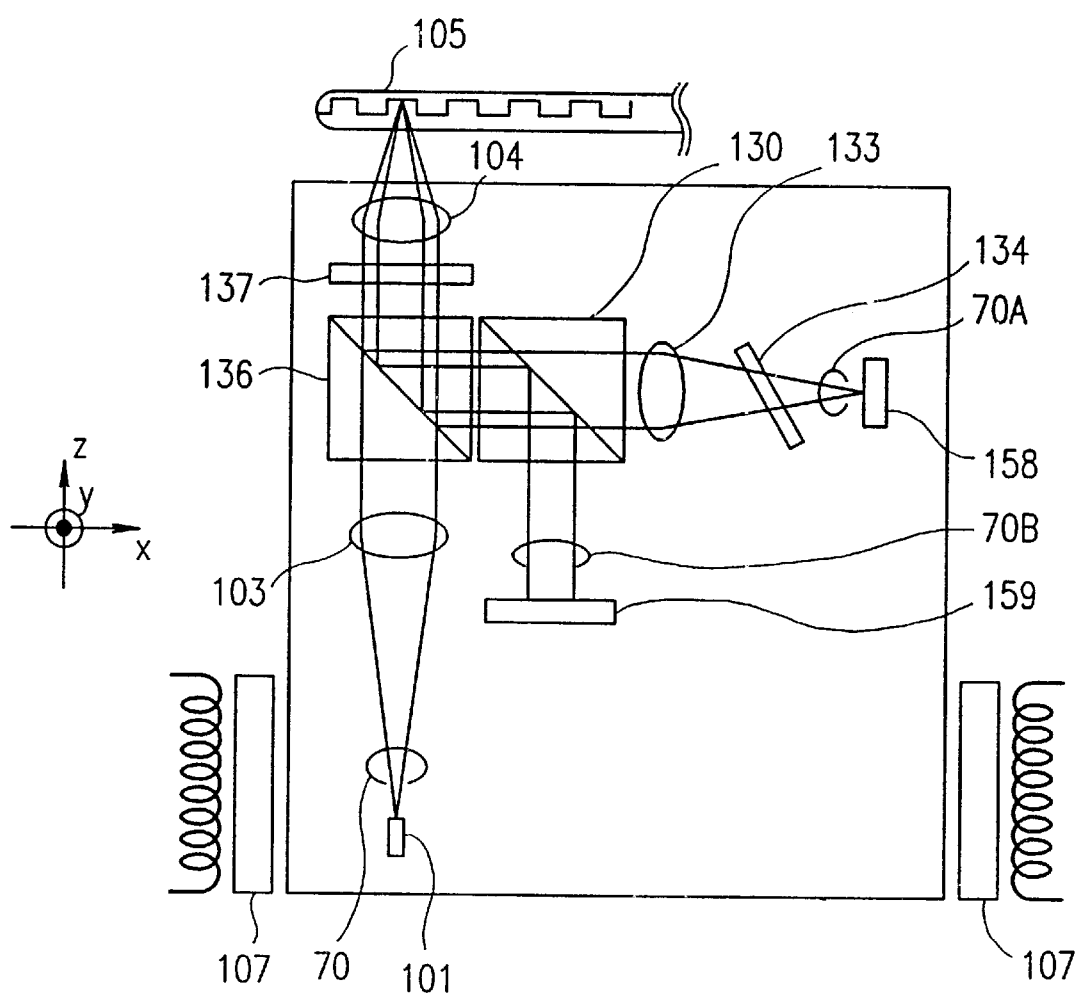
FIG. 36 is a schematic view of an optical head device according to the present invention.

FIG. 36 schematically shows an optical head device in the thirteenth example. The optical head device operates in the following manner.

A semiconductor laser 101 used as a light source emits a light beam 70 having a wavelength λ of 650 nm. The linearly polarized scattering beam emitted by the semiconductor laser 101 is collimated by a collimator lens 103 and then made incident on a beam splitter 136 employed as a beam branching element. The beam splitter 136 is a half mirror, the optical characteristics thereof do not rely on the polarization direction of the incident beam. Half of the intensity of the beam 70 incident on the beam splitter 136 is transmitted through the beam splitter 136 and then incident on a polarization filter 137.

Figure 37:
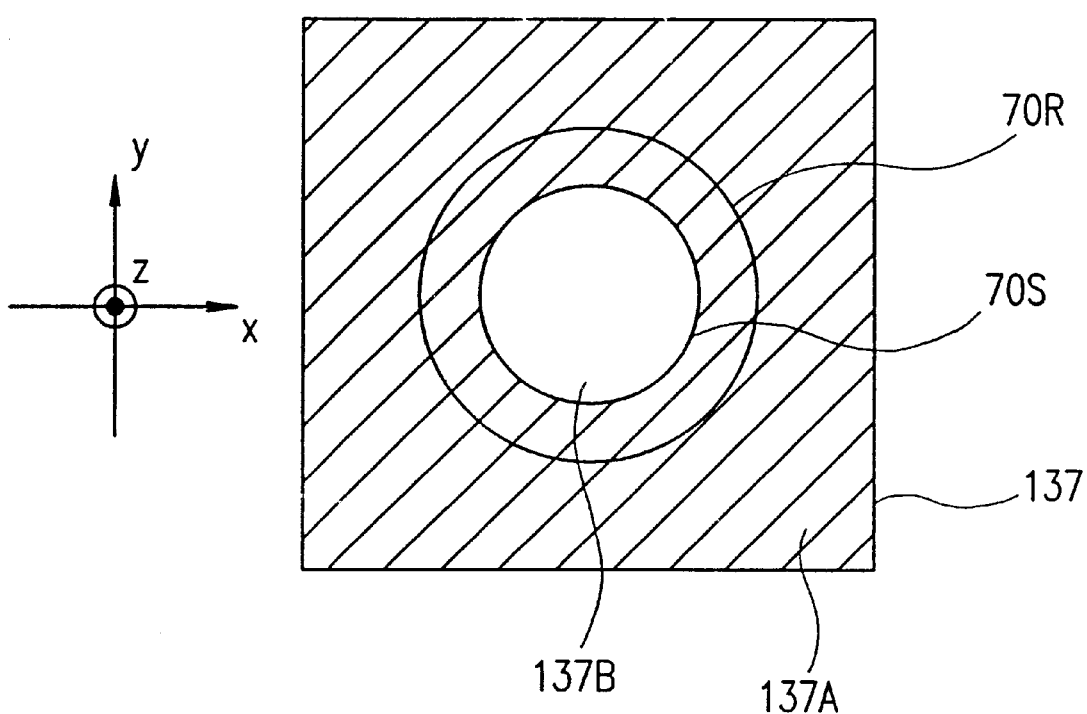
FIG. 37 shows a polarization filter usable in the optical head device shown in FIG. 36.

FIG. 37 shows the polarization filter 137. The polarization filter 137 includes two areas 137A and 137B. The area 137A allows transmission of 100% of the light polarized in direction x but blocks 100% of the light polarized in direction y. The area 137B allows transmission of 100% of the light polarized in the direction x and also 100% of the light polarized in the direction y. The direction x is a radial direction of the information memory medium 105 (FIG. 36) and is perpendicular to the tangent to the track for storing the information. The direction y is parallel to the tangent to the track of the information memory medium 105 and is perpendicular to the radial direction thereof. Direction z is perpendicular to both of the directions x and y and is parallel to the axis of the beam 70.

In FIG. 37, reference numeral 70R denotes an image of the aperture of the objective lens 104 (FIG. 36). Reference numeral 70S indicates the size of the area 137B. Since the size 70S is smaller than the image 70R, the effective numerical aperture NA of the objective lens 104 with respect to the beam 70 polarized in the direction y (i.e., the effective numerical aperture NA of the beam 70 when being collected by the objective lens 104) reduces. In the thirteenth example, the effective numerical aperture NA of the objective lens 104 with respect to the light polarized in the direction x is 0.6, and the effective numerical aperture NA of the objective lens 104 with respect to the light polarized in the direction 7 is 0.4. A beam for which the effective numerical aperture of the objective lens 104 is 0.6 is referred to as a first beam, and a beam for which the effective numerical aperture of the objective lens 104 is 0.4 is referred to as a second beam. In order to polarize the beam in the directions x and y, a laser oscillating in both the TE and TM modes can be used as the semiconductor laser 101. In the case where a semiconductor laser oscillating only either the TE or TM mode is used, the beam can be polarized in the direction x or y by locating the semiconductor laser 101 so that the polarization direction is slightly off the direction x or y. Alternatively, the beam emitted from the semiconductor laser 101 may be incident on the wave plate to be circularly or elliptically polarized. In this example, the semiconductor laser 101 is position so that the polarization direction thereof is slightly off the direction x.

Referring again to FIG. 36, the beam 70 transmitted through the polarization filter 137 is incident on the objective lens 104 included i the collection optical system and collected on the information memory medium 105. The beam 70 diffracted and/or reflected by the information memory medium 105 is transmitted back through the objective lens 104 and then through the polarization filter 137. The beam 70 is then incident on the beam splitter 136, which reflects the half of the intensity of the beam 70. The beam 70 reflected by the beam splitter 136 is incident on a polarization beam splitter 130. The polarization beam splitter 130 allows transmission of almost 100% of the light polarized in the direction x (beam 70A), and reflects almost 100% of the light polarized in the direction y (beam 70B). The beam 70B is detected by a light detector 159.

The beam 70A is converged by a detection lens 133. The converged beam 70A is transmitted through a plane-parallel beam splitter 134 and then received by a light detector 158. The beam 70A is provided with a nonpoint aberration for detecting a focusing error signal when passing through the plane-parallel beam splitter 134. The beam 70A received by the light detector 158 and the beam 70B received by the light detector 159 are respectively converted into electric signals in accordance with the amounts thereof. The electric signals which are output from the light detectors 158 and 159 are input to a signal processing section 704 (FIG. 38).

Figure 38:
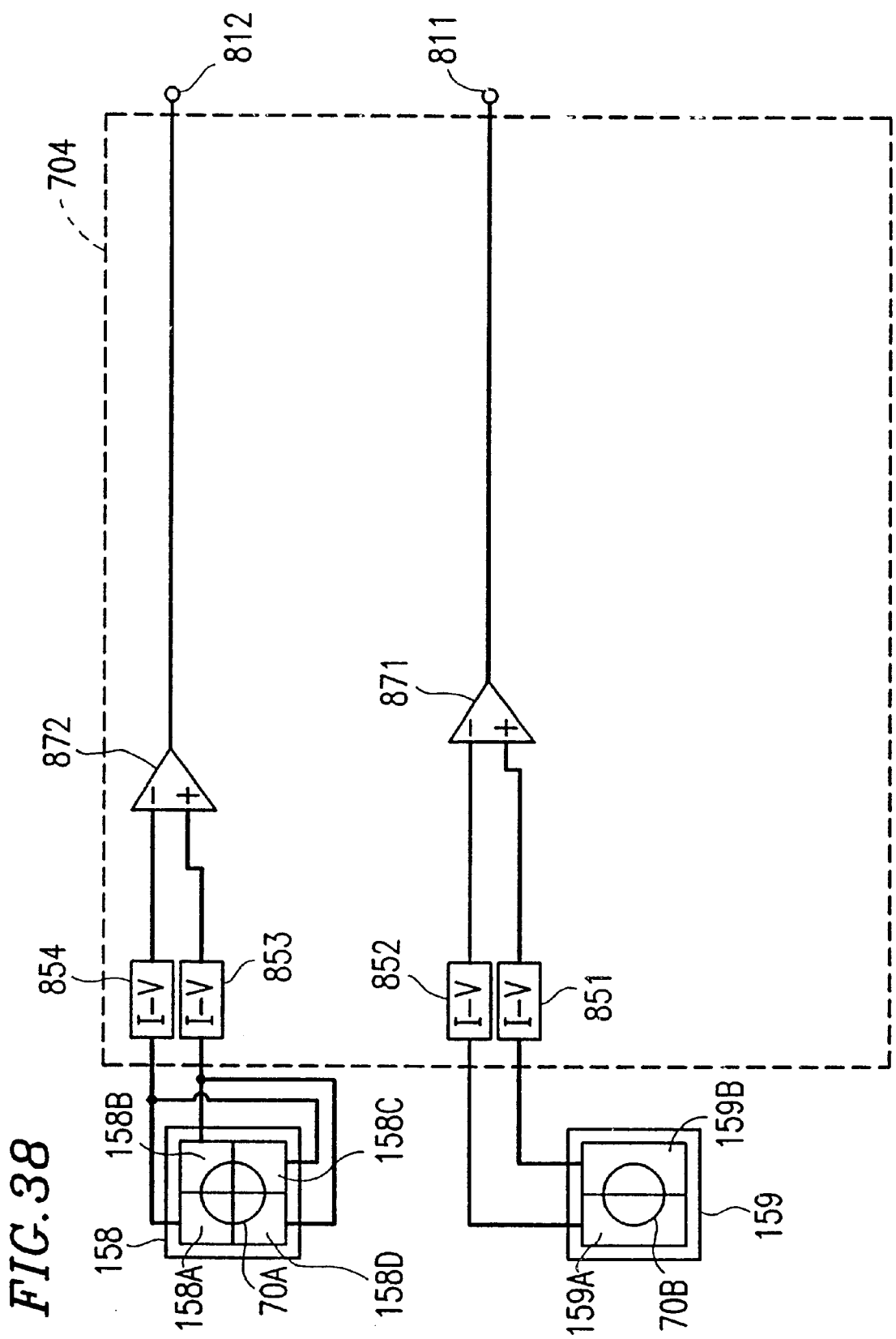
FIG. 38 shows a configuration of a signal processing section of the optical head device shown in FIG. 36.

FIG. 38 shows a configuration of the signal processing section 704.

The light detector 158 includes four detection areas 158A through 158D, and the light detector 159 includes two detection areas 159A and 159B. The signals which are output from the detection areas 158A and 158C are current-voltage converted by a current-voltage converter 854, and the signals which are output from the detection areas 158B and 158D are current-voltage converted by a current-voltage converter 853. The signal which is output from the detection area 159A is current-voltage converted by a current-voltage converter 852, and the signal which is output from the detection areas 159B is current-voltage converted by a current-voltage converter 851.

The difference between the signals output from the current-voltage converters 853 and 854 is obtained by an operation section 872. The signal from the operation section 872 is output from a terminal 812 as a focusing error signal.

The difference between the signals output from the current-voltage converters 851 and 852 is obtained by an operation section 871. The signal from the operation section 871 is output from a terminal 811 as a tracking error signal.

The focusing error signal is sent to an actuator 107 for driving the focusing control, and the tracking error signal is sent to an actuator 107 for driving the tracking control.

The optical system and the information memory medium 105 are relatively positioned so that the beam 70 from the semiconductor laser 101 is focused on a desired position on the information memory medium 105.

The information recorded on the information memory medium 105 is obtained by adding the signals output from the current-voltage converters 853 and 854.

The information memory medium 105 has guide grooves for realizing detection of the tracking error signal. The distance Gp between centers of two adjacent guide grooves is 1.48 $\mu$m. In the case where the effective numerical aperture NA of the objective lens 104 with respect to the first beam for reading information stored in the information memory medium 105 is 0.6 and the effective numerical aperture NA of the objective lens 104 with respect to the second beam for detecting the tracking error signal is 0.4, substantially no phase shift occurs to the tracking error signal even when the angle made by the beam 70 collected by the objective lens 104 and the information memory medium 105 is inclined from the normal angle. Accordingly, the off-track hardly occurs. The optical head device in the thirteenth example improves the compatibility between different types of optical head devices and different types of information memory mediums. A phase shift caused to the tracking error signal when the angle made by the beam 70 collected by the objective lens 104 and the information memory medium 105 is inclined from the normal angle is conspicuous when the distance Gp and the numerical aperture NA have the relationship of Gp>$\lambda$/NA. Accordingly, the optical head device in the thirteenth example is configured to have the relationship of Gp<$\lambda$/NA in order to obtain a satisfactory tracking error signal.

In the optical head device in the thirteenth example, the two beams with respect to which the effective numerical apertures of the objective lens 104 are different are generated so as to have exactly the same axis under any condition, by using the difference in polarization. Due to such a system, the adjustment required when assembling the optical head device in the thirteenth example is not more complicated than in the case of the conventional optical head device despite radiation of the two beams toward the information memory medium 105.

Since the optical head device in this example has no restriction in the method for detecting a focusing error signal, the focusing error signal may be detected using the second beam. In such a case, the wave surface for realizing detection of the focusing error signal such as a non-point aberration can be provided to the second beam. Since the effective numerical aperture NA of the objective lens with respect to the second beam is smaller than that with respect to the first beam, the aberration on the wave surface is also smaller. In the case where the focusing error signal is detected using the second beam, less noise is mixed to the focusing error signal when the beam collected by the objective lens crosses the track on the information memory medium than in the case where the focusing error signal is detected using the first beam. Accordingly, the focusing control can be more stable.

In the thirteenth example, the beam splitter 136 is a half mirror. Since the optical head device in this example is not influenced by the characteristics of the beam splitter 136 such as reflectance or transmittance, a beam splitter having a transmittance of 70 to 90% and a reflectance of 30 to 10% may be used. A beam splitter 136 formed of a half mirror is appropriate for an optical head device used only for reproduction since the signals from the light detectors 158 and 159 are maximum. A beam splitter having a transmittance of 70 to 90% is appropriate for an optical head device used both for recording and reproduction since the amount of light running from the semiconductor laser 101 to the information memory medium 105 increases.

In the thirteenth example, the information memory medium 105 has continuous guide grooves as a pattern for realizing detection of the tracking error signal. Alternatively, separate marks or guide grooves may be formed on the information memory medium 105. In such a case, the sample and hold section can be provided on the input side of the operation section 871 of the signal processing section 704.

EXAMPLE 14

Figure 39:
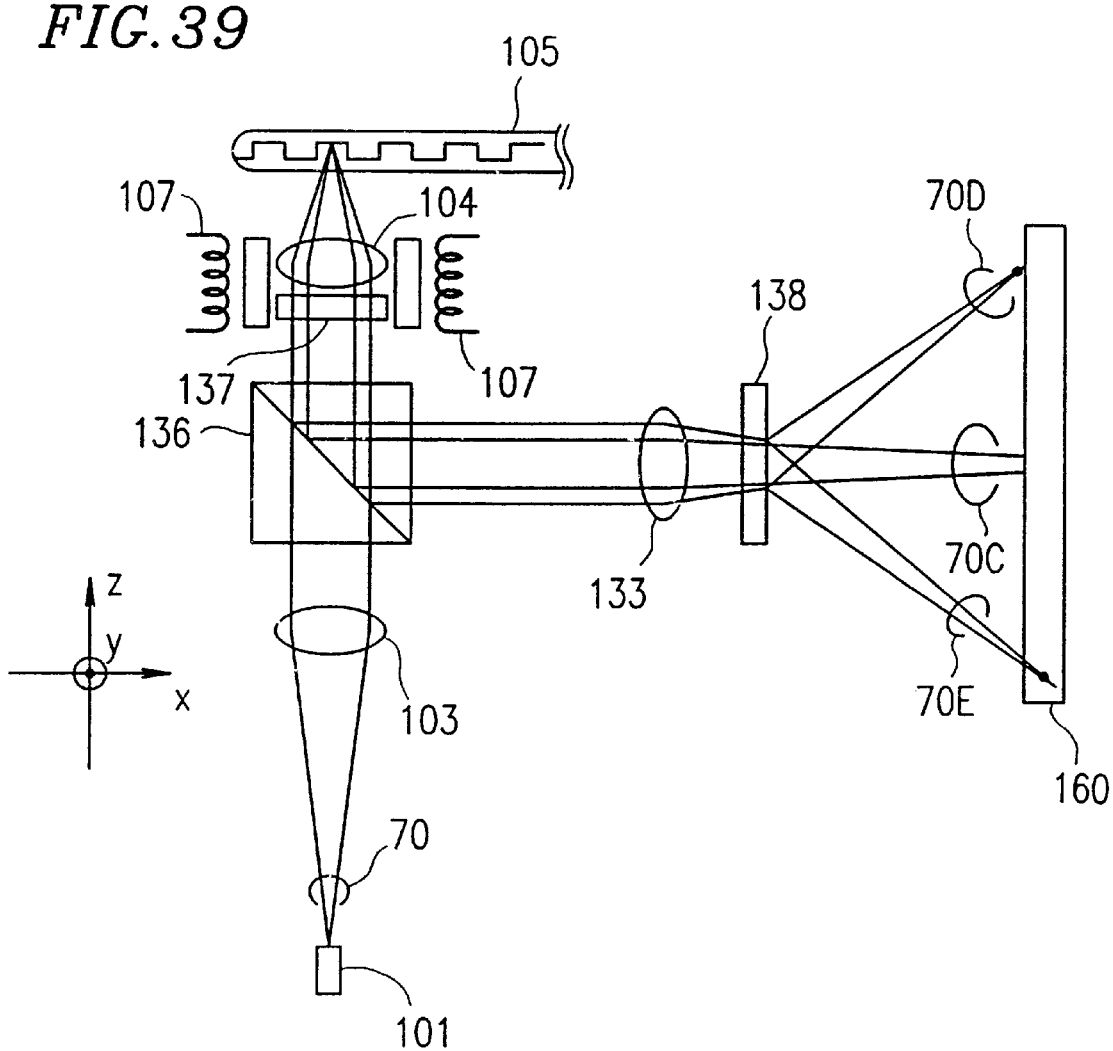
FIG. 39 is a schematic view of an optical head device according to the present invention.

FIG. 39 is a schematic view of an optical head device in a fourteenth example according to the present invention.

In this example, focusing control and tracking control are performed by driving the objective lens 104 by actuators 107 for focusing control and tracking control. The objective lens 104 and the polarization filter 137 are integrally driven by the actuators 107.

The beam 70 diffracted and/or reflected by the information memory medium 105 and then reflected by the beam splitter 136 is collected by the detection lens 133. The beam 70 is converted by the detection lens 133 and incident on a holographic element 138. The holographic element 138 divides the beam 70 into a zero—the order beam 70C and two first-order detection beams 70D and 70E. The beams 70C, 70D and 70E are detected by a light detector 160.

Figure 40:
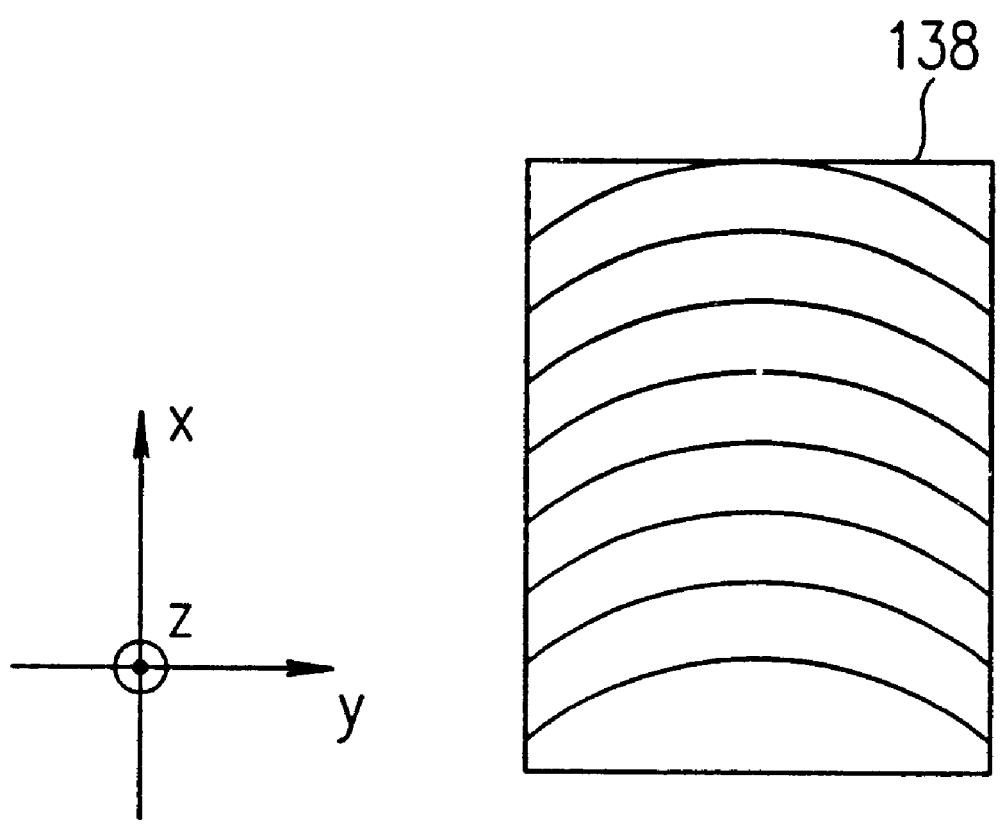
FIG. 40 shows a schematic pattern of an off-axis fresnel zone plate formed on a holographic element usable in the optical head device shown in FIG. 39.

FIG. 40 schematically shows the pattern of an off-axis fresnel zone plate formed on the holographic element 138. When the beam 70 collected by the objective lens 104 is focused on the information memory medium 105, the first-order diffraction beam 70D is focused before the light detector 160, and the first-order diffraction beam 70E is focused beyond the light detector 160. The diffraction efficiency of the holographic element 138 relies on the polarization direction. The holographic element 138 is designed so that, for the beam polarized in the direction x, the diffraction efficiency of the zero—the order light is 0% and the diffraction efficiency of each of the plus and minus first-order diffraction beams is 40%, and so that, for the beam polarized in the direction y, the diffraction efficiency of the zero—the order light is 100% and the diffraction efficiency of each of the plus and minus first-order diffraction beams is 0%. The pattern on the holographic element 138 is formed by proton exchange of lithium niobate.

Figure 41:
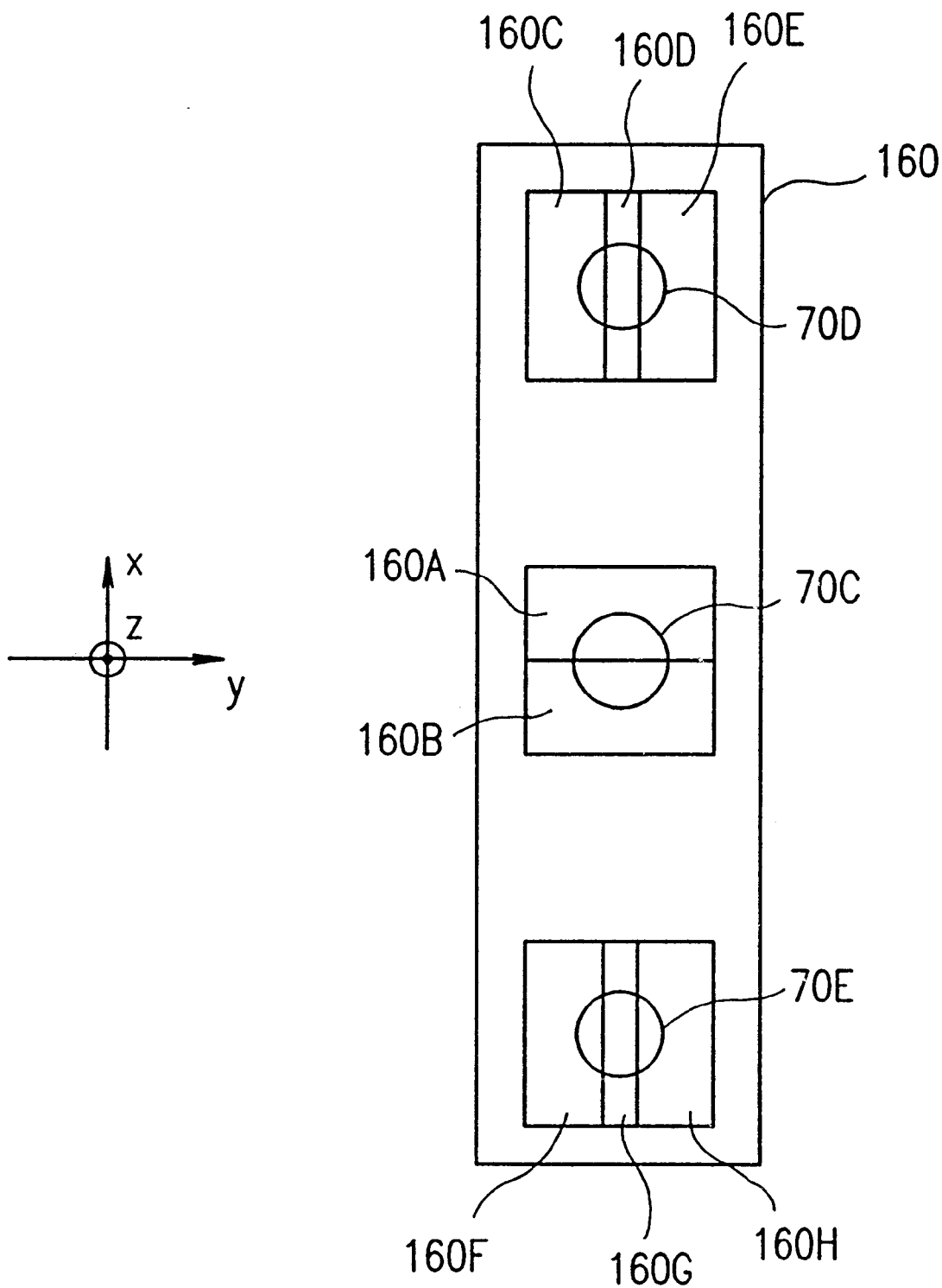
FIG. 41 shows the relationship between detection areas of a light detector and beams in the optical head device shown in FIG. 39.
Figure 42:
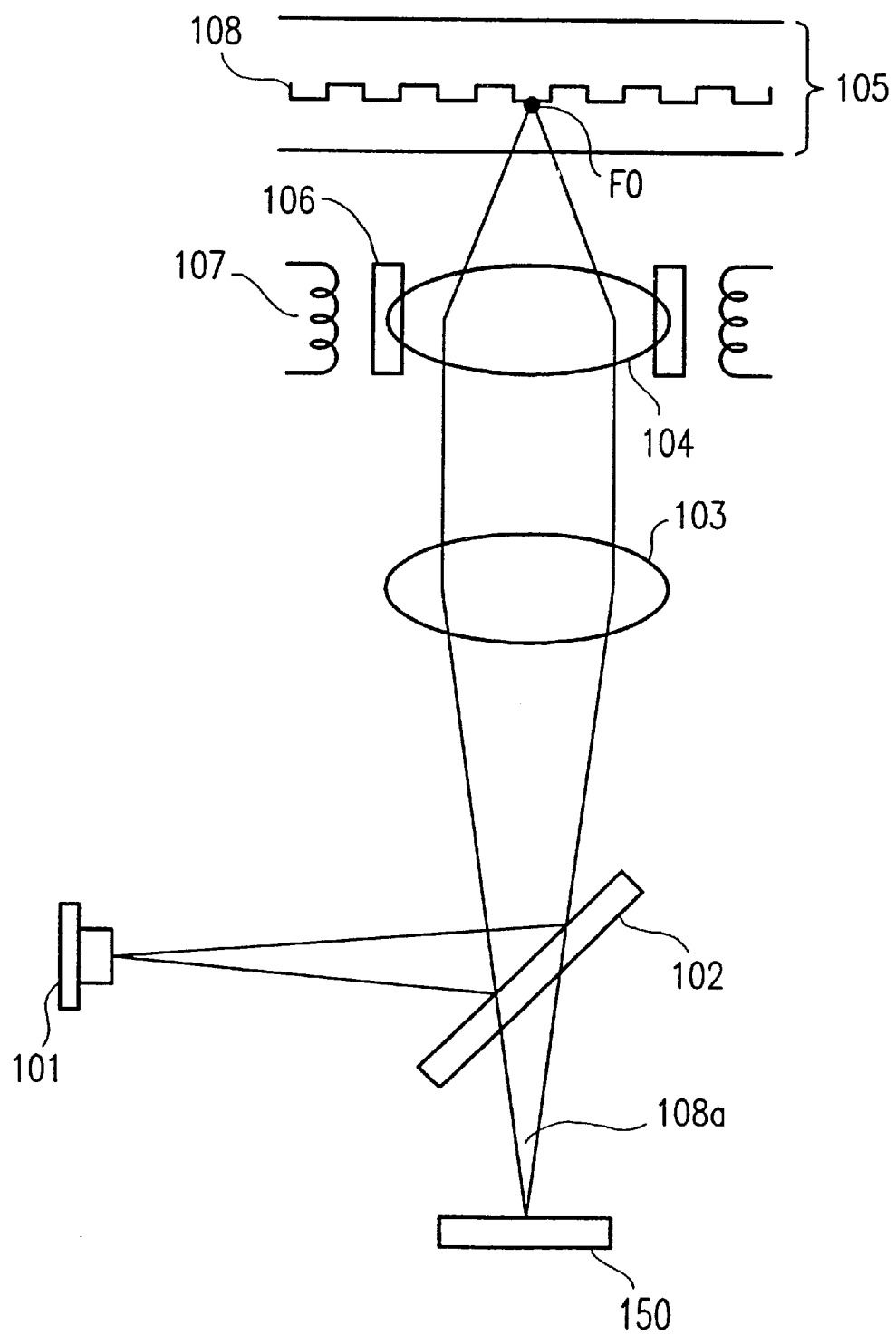
FIG. 42 is a schematic view of an optical system of a conventional optical head device.

FIG. 41 shows the relationship between the detection areas of the light detector 160 and the beams 70C through 70E. The light detector 160 has detection areas 160A through 160H. The beam 70C is received by the detection areas 160A and 160B, the beam 70D s received by the detection areas 160C through 160E, and the beam 70E is received by the detection areas 160F through 160H.

In the optical head device in this example, the signal processing section shown in the thirteenth example with reference to FIG. 38 can be used as it is. The signal output from the detection area 160A is sent to the current-voltage converter 852, the signal output from the detection area 160B is sent to the current-voltage converter 851, the signals output from the detection areas 160D, 160F and 160H are sent to the current-voltage converter 854, and the signals output from the detection areas 160C, 160E and 160G are sent to the current-voltage converter 853. The method for detecting the focusing error signal used in this example referred to as the spot size detection method is known as well as the non-point aberration.

In this example, the center of the objective lens 104 and the center of the polarization filter 137 always match each other by integrally driving the objective lens 104 an the polarization filter 137 by the actuator. At this point, the second beam is collected on the information memory medium 105 with little aberration, and thus a tracking error signal with less phase shift and less offset can be obtained even when the angle made by the beam 70 collected by the objective lens 104 and the information memory medium 105 is inclined.

Moreover, through use of the holographic element 138, the focusing error signal and the tracking error signal and the signal indicating the information stored in the information memory medium 105 can be detected by one light detector, and thus a low cost optical head device can be realized.

According to the present invention, the following effects, for example, are obtained.

(1) Even when a shift of the objective lens or a radial tilt occur, the difference between |TEmax−TE0| (difference between the absolute values of TEmax and TE0) and |TEmin−TE0| (difference between the absolute values of TEmin and TE0) is reduced. TE0 is the value of the tracking error signal obtained when the center of the track is irradiated by the light, TEmax is the maximum value of the tracking error signal obtained while the light crosses track in the radial direction, and TEmin is the minimum value thereof. Even when the off-track amount is corrected to zero, the degree of asymmetry of the upper and lower amplitudes of the tracking error signal can be restricted to a sufficiently low value. Thus, stable tracking control is performed.

(2) Even when the light collection point is off the track, the information stored in the track can be reproduced stably with a sufficiently low error ratio.

(3) The fluctuation of the gain of the focusing error signal is restricted to a sufficiently low level. Thus, stable focusing control is performed.

As described above, the present invention provides an optical head device realizing correct information reproduction and stable information recording and erasing with a sufficiently low error ratio. Such an optical head device has higher compatibility with different types of optical information processing apparatuses and different types information memory mediums.

An inclination detection apparatus according to the present invention correctly detects an inclination of the angle made by the beam collected by the collection optical system and the information memory medium even when the inclination is 1 degree or less.

An optical information processing apparatus according to the present invention realizes stable information recording to and reproduction from an information memory medium which is significantly curved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head device, comprising:

a light source for emitting at least one of a coherent beam and a quasi-monochromatic beam;

a collection optical system for collecting the beam emitted by the light source to an information memory medium having tracks having a mark and a space selectively arranged or tracks having prescribed grooves;

a diffraction element for receiving a beam diffracted by the information memory medium and generating a diffraction beam; and a light detector having a plurality of detection areas for receiving the beam diffracted by the diffraction element and outputting a signal in accordance with a light amount of the beam received, wherein:

the diffraction element includes a plurality of areas, a diffraction beam of a desired order generated by an area group A included in the plurality of areas form a first spherical wave, a diffraction beam of a desired order generated by an area group B included in the plurality of areas but excluded from the area group A form a second spherical wave, which has a light collection point farther than the light collection point of the first spherical wave with respect to the diffraction element, a focusing error signal generator is provided for generating a focusing error signal based on the difference between the cross sections of the first spherical wave and the second spherical wave on the light detector, the diffraction element has at least one division line perpendicular to the tangent to the tracks, and either one of portions sandwiching the at least one division line is included in the area group A and the other portion is included in the area group B.

2. An optical head device, comprising:

a light source for emitting at least one of a coherent beam and a quasi-monochromatic beam;

a collection optical system for collecting the beam emitted by the light source to an information memory medium having tracks having a mark and a space selectively arranged or tracks having prescribed grooves;

a diffraction element for receiving a beam diffracted by the information memory medium and generating a diffraction beam; and a light detector having a plurality of detection areas for receiving the beam diffracted by the diffraction element and outputting a signal in accordance with a light amount of the beam received, wherein:

the diffraction element includes a plurality of areas, a diffraction beam of a desired order generated by an area group A included in the plurality of areas form a first spherical wave, a diffraction beam of a desired order generated by an area group B included in the plurality of areas but excluded from the area group A form a second spherical wave, which has a light collection point farther than the light collection point of the first spherical wave with respect to the diffraction element, a focusing error signal generator is provided for generating a focusing error signal based on the difference between the cross sections of the first spherical wave and the second spherical wave on the light detector, the diffraction element has a diffraction area which is larger than the area corresponding to an aperture of the collection optical system, the diffraction element has a first division line and a second division line interposing the aperture, the first division line and the second division line being parallel to the tangent to the tracks and in contact with an outer periphery of the aperture, and either one of portions sandwiching the first division line or the second division line is included in the area group A and the other portion is included in the area group B.

* * * * *